US012752691B2

(12) United States Patent
Cho et al.

(10) Patent No.: US 12,752,691 B2

(45) Date of Patent: Oct. 6, 2026

(54) RAMP APPARATUS FOR VEHICLE

(71) Applicants: Kia Corporation, Seoul (KR); PHA Co., Ltd., Daegu (KR); Hyundai Motor Company, Seoul (KR)

(72) Inventors: Kyu Hoon Cho, Suwon-si (KR); Jae Seung Lee, Hwaseong-si (KR); Jin Pyung Park, Seoul (KR); Min Jae Lee, Hwaseong-si (KR)

(73) Assignees: Hyundai Motor Company, Seoul (KR); Kia Corporation, Seoul (KR); PHA Co., LTD., Daegu (KR)

(*) Notice: Subject to any disclaimer, the term of this patent is extended or adjusted under 35 U.S.C. 154(b) by 360 days.

(21) Appl. No.: 18/483,777

(22) Filed: Oct. 10, 2023

(65) Prior Publication Data

US 2024/0253553 A1 Aug. 1, 2024

(30) Foreign Application Priority Data

Jan. 30, 2023 (KR) ........................ 10-2023-0011816

(51) Int. Cl.

*B60R 3/02* (2006.01)
*B60P 1/43* (2006.01)
*A61G 3/06* (2006.01)

(52) U.S. Cl.

CPC .............. *B60P 1/431* (2013.01); *A61G 3/061* (2013.01)

(58) Field of Classification Search

CPC ........... B60P 1/431; B60P 1/433; B60P 1/435; B60P 1/438; A61G 3/061; A61G 3/067; A61G 3/068; B60R 3/02; B60R 3/002

USPC .............. 14/69.5, 71.1; 296/26.01, 26.09, 61

See application file for complete search history.

(56) References Cited

U.S. PATENT DOCUMENTS

| | | | |
|---|---|---|---|
| 3,268,932 | A | 8/1966 | Hartman |
| 3,516,103 | A | 6/1970 | Hecker, Jr. et al. |
| 3,756,433 | A | 9/1973 | Richins |
| 4,068,770 | A | 1/1978 | Boehringer |
| 4,078,678 | A | 3/1978 | Tordella |
| 4,670,928 | A | 6/1987 | Alten |
| 4,685,858 | A | 8/1987 | Manning et al. |
| 4,759,682 | A | 7/1988 | Hood |
| 4,827,548 | A | 5/1989 | Hood |
| 4,900,217 | A | 2/1990 | Nelson |

(Continued)

FOREIGN PATENT DOCUMENTS

| | | | |
|---|---|---|---|
| CN | 219192055 | U | 6/2023 |
| EP | 3156026 | A2 | 4/2017 |

(Continued)

OTHER PUBLICATIONS

Brazos Manufacturing and Welding Services, "Work All Night With A Brazos Safety Lighted Ramp", https://brazosmanufacturing.com/work-all-night-with-a-brazos-safety-lighted-ramp/, Aug. 13, 2016, Total pP. 04.

*Primary Examiner* — Saul Rodriguez
*Assistant Examiner* — Jaimin G Patel
(74) *Attorney, Agent, or Firm* — Slater Matsil, LLP

(57) ABSTRACT

In an embodiment a ramp apparatus for a vehicle includes a housing mounted on a vehicle body, a first ramp platform telescopically moving with respect to the housing, a second ramp platform telescopically moving with respect to the first ramp platform and an upper sub-platform pivotally mounted between the first ramp platform and the second ramp platform.

20 Claims, 42 Drawing Sheets

(56) References Cited

U.S. PATENT DOCUMENTS

| | | | | |
|---|---|---|---|---|
| 5,273,335 | A | 12/1993 | Belnap et al. | |
| 5,305,486 | A | 4/1994 | Smith et al. | |
| 5,380,144 | A | 1/1995 | Smith et al. | |
| 5,393,192 | A | 2/1995 | Hall et al. | |
| 5,676,515 | A * | 10/1997 | Haustein | B60P 1/431 414/921 |
| 5,775,232 | A * | 7/1998 | Golemis | B61D 23/025 105/458 |
| 5,795,125 | A | 8/1998 | Walkden | |
| 5,803,523 | A * | 9/1998 | Clark | B60P 1/435 296/61 |
| 5,816,767 | A | 10/1998 | Mann | |
| 5,832,555 | A * | 11/1998 | Saucier | B60P 1/431 14/71.1 |
| 6,409,458 | B1 | 6/2002 | Cohn et al. | |
| 6,431,815 | B1 | 8/2002 | Zarzecki et al. | |
| 6,484,344 | B1 | 11/2002 | Cooper | |
| 6,802,095 | B1 | 10/2004 | Whitmarsh et al. | |
| 7,451,512 | B2 | 11/2008 | Fullerton et al. | |
| 7,913,343 | B1 | 3/2011 | Cohn | |
| 8,122,553 | B1 | 2/2012 | Johnson et al. | |
| 8,327,485 | B1 | 12/2012 | Morris et al. | |
| 8,438,683 | B1 | 5/2013 | Morris et al. | |
| 8,533,884 | B1 * | 9/2013 | Johnson | A61G 3/067 14/71.3 |
| 8,631,528 | B1 * | 1/2014 | Johnson | B60P 1/433 14/71.1 |
| 8,926,254 | B2 | 1/2015 | Pocobello et al. | |
| 9,545,345 | B1 | 1/2017 | Akers, Jr. et al. | |
| 9,719,261 | B2 * | 8/2017 | Belman | F16H 19/04 |
| 9,764,674 | B2 * | 9/2017 | Friesen | B60P 1/438 |
| 9,994,263 | B1 | 6/2018 | Richter | |
| 10,040,385 | B2 | 8/2018 | Stevens et al. | |
| 12,336,939 | B2 | 6/2025 | Lee et al. | |
| 2004/0013507 | A1 | 1/2004 | Kiser | |
| 2004/0107520 | A1 | 6/2004 | Van Der Heiden | |
| 2004/0226116 | A1 | 11/2004 | O'Donnell et al. | |
| 2008/0106058 | A1 | 5/2008 | Demick | |
| 2009/0108614 | A1 | 4/2009 | Washington | |
| 2009/0274542 | A1 | 11/2009 | Pocobello et al. | |
| 2010/0332085 | A1 | 12/2010 | Song et al. | |
| 2011/0027054 | A1 * | 2/2011 | Hansen | A61G 3/061 414/523 |
| 2011/0135432 | A1 | 6/2011 | Budd et al. | |
| 2012/0233787 | A1 * | 9/2012 | Couto | B60P 1/431 14/71.1 |
| 2014/0044512 | A1 * | 2/2014 | Couto | A61G 3/067 414/537 |
| 2015/0052693 | A1 | 2/2015 | Allen | |
| 2018/0105091 | A1 | 4/2018 | Stevens et al. | |
| 2019/0106042 | A1 * | 4/2019 | Hill | B60P 1/431 |
| 2021/0000666 | A1 | 1/2021 | Smith et al. | |
| 2021/0361499 | A1 * | 11/2021 | Pujol Oller | A61G 3/061 |
| 2023/0257032 | A1 | 8/2023 | Harmon et al. | |
| 2024/0075864 | A1 | 3/2024 | Van Wiemeersch et al. | |
| 2024/0116424 | A1 | 4/2024 | Smith et al. | |

FOREIGN PATENT DOCUMENTS

| | | | |
|---|---|---|---|
| KR | 101157563 | B1 | 6/2012 |
| KR | 102422681 | B1 | 7/2022 |
| WO | 9626848 | | 9/1996 |
| WO | 20252 | | 4/2000 |
| WO | 02079018 | A1 | 10/2002 |
| WO | 3064208 | | 8/2003 |

* cited by examiner

RAMP APPARATUS FOR VEHICLE

CROSS-REFERENCE TO RELATED APPLICATIONS

This application claims the benefit of Korean Patent Application No. 10-2023-0011816, filed on Jan. 30, 2023, which application is hereby incorporated herein by reference.

TECHNICAL FIELD

The present disclosure relates to a ramp apparatus for a vehicle, and more particularly, to a ramp apparatus for a vehicle designed to move telescopically from a vehicle body to the ground or vice versa.

BACKGROUND

Vehicles such as buses or wheelchair accessible vehicles or mobility vans for handicapped people may include a ramp apparatus that assists in boarding or unboarding of people in wheelchairs. The ramp apparatus may have a ramp platform stowed on a floor of a vehicle body, and the ramp platform may be manually or automatically deployed by a user from the vehicle body to the ground. The deployed ramp platform may be inclined at a predetermined angle with respect to the ground.

Due to the slope (inclination) of the ramp platform, it may be difficult to apply the ramp apparatus to general passenger vehicles with a high step-in height, except for low floor buses/non-step buses.

Meanwhile, wheelchair accessible vehicles or mobility vans for handicapped people may be designed as follows: remove a portion of a rear chassis from a vehicle body; lower a rear floor; cut off a portion of a rear bumper to modify a rear portion of the vehicle body; and mount a ramp apparatus on the modified rear portion.

However, the existing ramp apparatus cannot increase a deployment length of the ramp platform due to the lack of storage space (stowage) on the rear floor, which makes it difficult to reduce the slope of the ramp platform. In particular, the deployment length of the ramp platform may be relatively short, which makes it difficult to meet a legal standard for slope (for example, 14°).

Some ramp apparatuses may be designed to allow the plurality of ramp platforms to be extended from the vehicle body to the ground so that the ramp platforms may meet the legal standard for slope. However, a system of operating the plurality of ramp platforms may be very complex, so a deployment speed thereof may be excessively slow. It may be difficult to use them for various purposes, causing an inconvenience in use.

The above information described in this background section is provided to assist in understanding the background of the inventive concept, and may include any technical concept which is not considered as the prior art that is already known to those skilled in the art.

SUMMARY

Embodiments provide a ramp apparatus for a vehicle designed to move telescopically from a vehicle body to the ground or vice versa.

According to an embodiment of the present disclosure, a ramp apparatus for a vehicle may include: a housing mounted on a vehicle body; a first ramp platform telescopically moving with respect to the housing; a second ramp platform telescopically moving with respect to the first ramp platform; and an upper sub-platform pivotally mounted between the first ramp platform and the second ramp platform.

The upper sub-platform may include an upper sub-plate, a bent portion provided on a leading end portion of the upper sub-plate, and a support edge extending from the bent portion, the second ramp platform may have a mounting hole in which the bent portion is received, the upper sub-plate may be located above the second ramp platform, and the support edge may be located below the second ramp platform.

The upper sub-platform may be movably connected to the first ramp platform through an upper link assembly.

The upper link assembly may include a guide shaft moving along guide slots of the first ramp platform, a rolling shaft parallel to the guide shaft, a pair of main links connecting the guide shaft and the rolling shaft, a sub-shaft rotatably mounted on the upper sub-platform, and a pair of sub-links connecting the rolling shaft and the sub-shaft.

The rolling shaft may roll along a top surface of the second ramp platform.

The upper sub-platform may have a front stop recess and a rear stop recess located behind the front stop recess, and the rolling shaft may be selectively received in any one of the front stop recess and the rear stop recess.

A depth of the front stop recess may be greater than a depth of the rear stop recess.

The upper sub-platform may be configured to move between an inclined position in which the upper sub-platform is inclined with respect to the second ramp platform at a predetermined angle and a parallel position in which the upper sub-platform is substantially parallel to the second ramp platform.

The ramp apparatus may further include a biasing member allowing the upper sub-platform to be biased toward the parallel position.

The ramp apparatus may further include a third ramp platform telescopically moving with respect to the second ramp platform.

The ramp apparatus may further include a lower sub-platform pivotally mounted between the second ramp platform and the third ramp platform.

The lower sub-platform may include a lower sub-plate, a bent portion provided on a leading end portion of the lower sub-plate, and a support edge extending from the bent portion, the third ramp platform may have a mounting hole in which the bent portion is received, the lower sub-plate may be located above the third ramp platform, and the support edge may be located below the third ramp platform.

The lower sub-platform may be movably connected to the second ramp platform through a lower link assembly.

The lower link assembly may include a guide shaft moving along guide slots of the second ramp platform, a rolling shaft parallel to the guide shaft, a pair of main links connecting the guide shaft and the rolling shaft, a sub-shaft rotatably mounted on the lower sub-platform, and a pair of sub-links connecting the rolling shaft and the sub-shaft.

The rolling shaft may roll along a top surface of the third ramp platform.

The lower sub-platform may have a front stop recess and a rear stop recess located behind the front stop recess, and the rolling shaft may be selectively received in any one of the front stop recess and the rear stop recess of the lower sub-platform.

A depth of the front stop recess may be greater than a depth of the rear stop recess.

The lower sub-platform may be configured to move between an inclined position in which the lower sub-platform is inclined with respect to the third ramp platform at a predetermined angle and a parallel position in which the lower sub-platform is substantially parallel to the third ramp platform.

The ramp apparatus may further include a biasing member allowing the lower sub-platform to be biased toward the parallel position.

The ramp apparatus may further include a hinge mechanism configured to move the first ramp platform between a stowed position and a deployed position, and allow the first ramp platform to pivot with respect to the housing when the first ramp platform is in the deployed position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
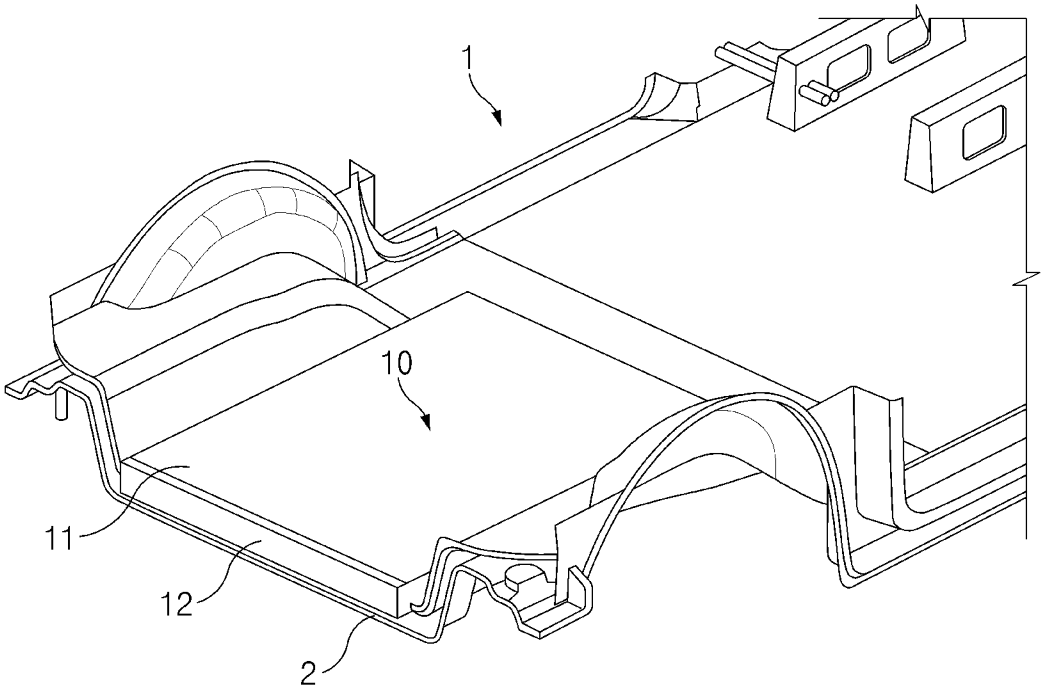
FIG. 1 illustrates a perspective view of a ramp apparatus for a vehicle according to an exemplary embodiment of the present disclosure, which is mounted on a rear floor of a vehicle body, in a state in which a ramp assembly is fully stowed in a housing.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A ramp apparatus 10 for a vehicle according to an exemplary embodiment of the present disclosure may be applied to various vehicles, and be disposed on a floor of a vehicle body. The ramp apparatus 10 may be designed to be deployed (extended out) from the floor of the vehicle body to the ground.

Referring to FIG. 1, the ramp apparatus 10 for a vehicle according to an exemplary embodiment of the present disclosure may be disposed on a rear floor 2 of a vehicle body 1. The ramp apparatus 10 for a vehicle may include a housing 11 fixedly mounted on the rear floor 2 of the vehicle body 1.

The housing 11 may have a trailing end portion facing the interior of the vehicle and a leading end portion facing the exterior of the vehicle, and the trailing end portion and the leading end portion may oppose each other. When the housing 11 is mounted on the rear floor 2, the leading end portion of the housing 11 may face the exterior of the vehicle, and the trailing end portion of the housing 11 may face the interior of the vehicle.

Figure 6:
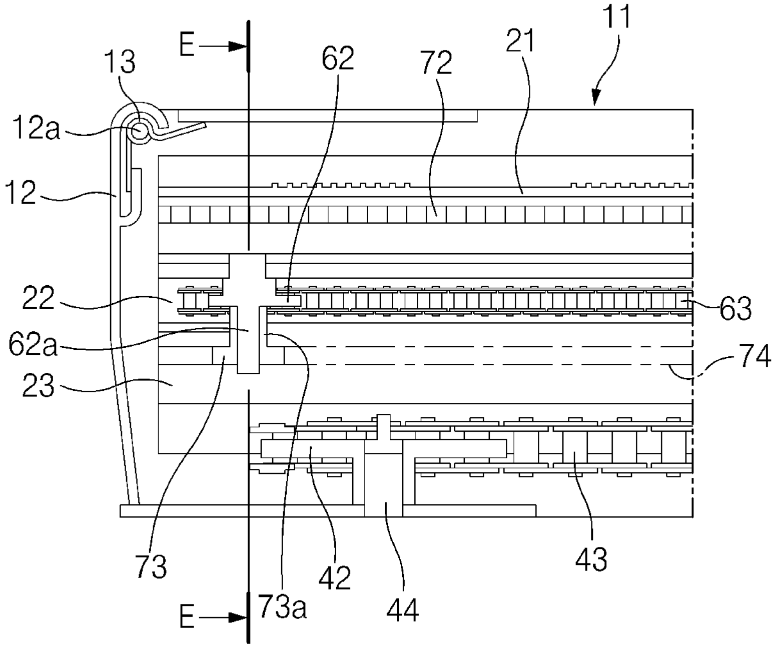
FIG. 6 illustrates an enlarged view of portion C of FIG. 4.

The housing 11 may have a cavity defined therein. The housing 11 may have a leading opening provided in the leading end portion thereof, and the housing 11 may be open to the exterior of the vehicle through the leading opening. Referring to FIG. 6, the housing 11 may include a front cover 12 pivotally connected to the leading opening through a pivot pin 12*a*, and the front cover 12 may move between an open position and a closed position. The front cover 12 may be biased toward the closed position by a biasing member 13 such as a torsion spring.

Figure 2:
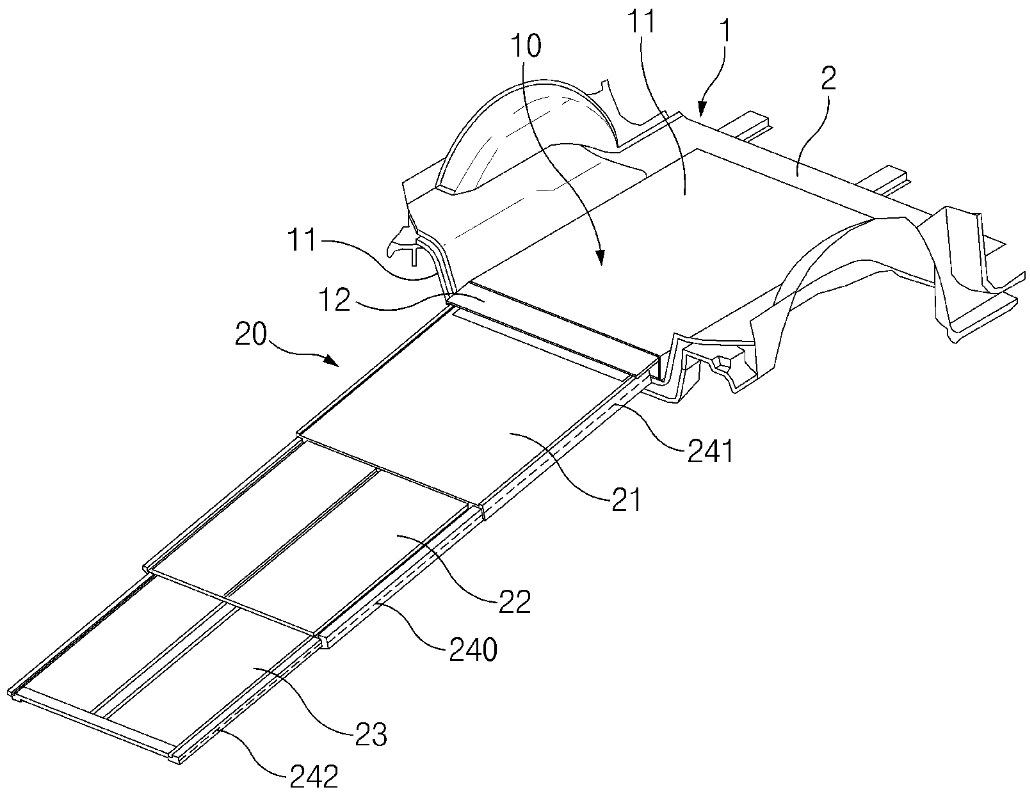
FIG. 2 illustrates a perspective view of a ramp apparatus for a vehicle according to an exemplary embodiment of the present disclosure, which is mounted on a rear floor of a vehicle body, in a state in which a ramp assembly is fully deployed/extended from a housing.
Figure 3:
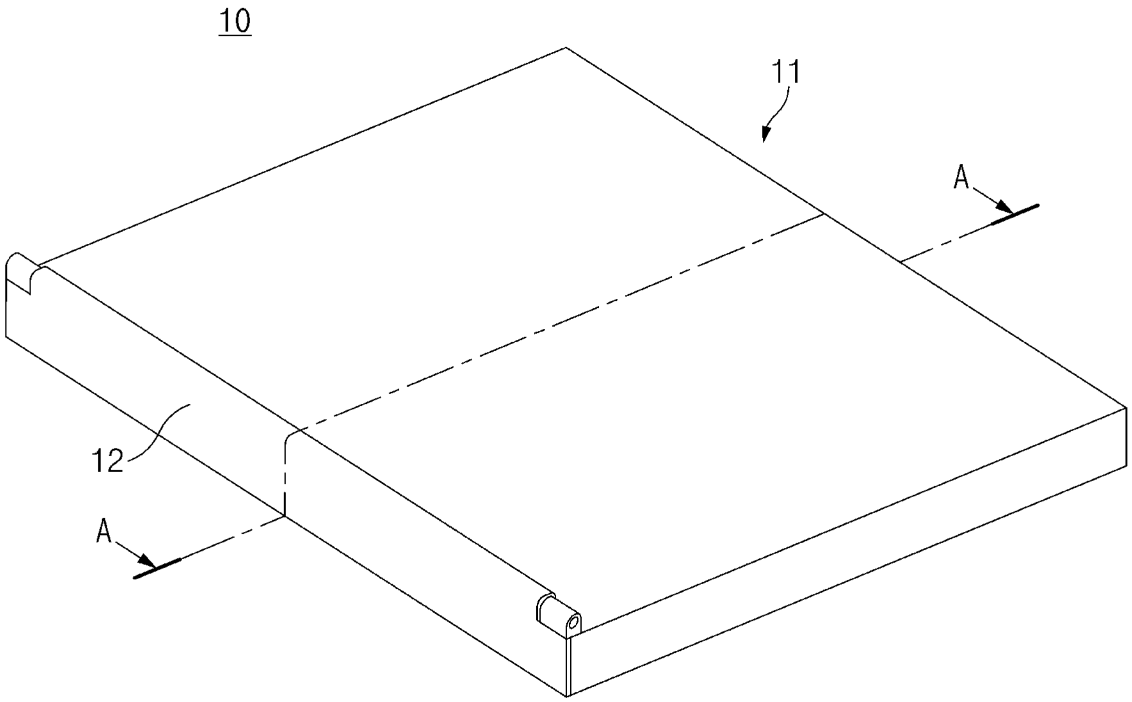
FIG. 3 illustrates a perspective view of a ramp apparatus for a vehicle according to an exemplary embodiment of the present disclosure, in a state in which a ramp assembly is stowed in a cavity of a housing.
Figure 9:
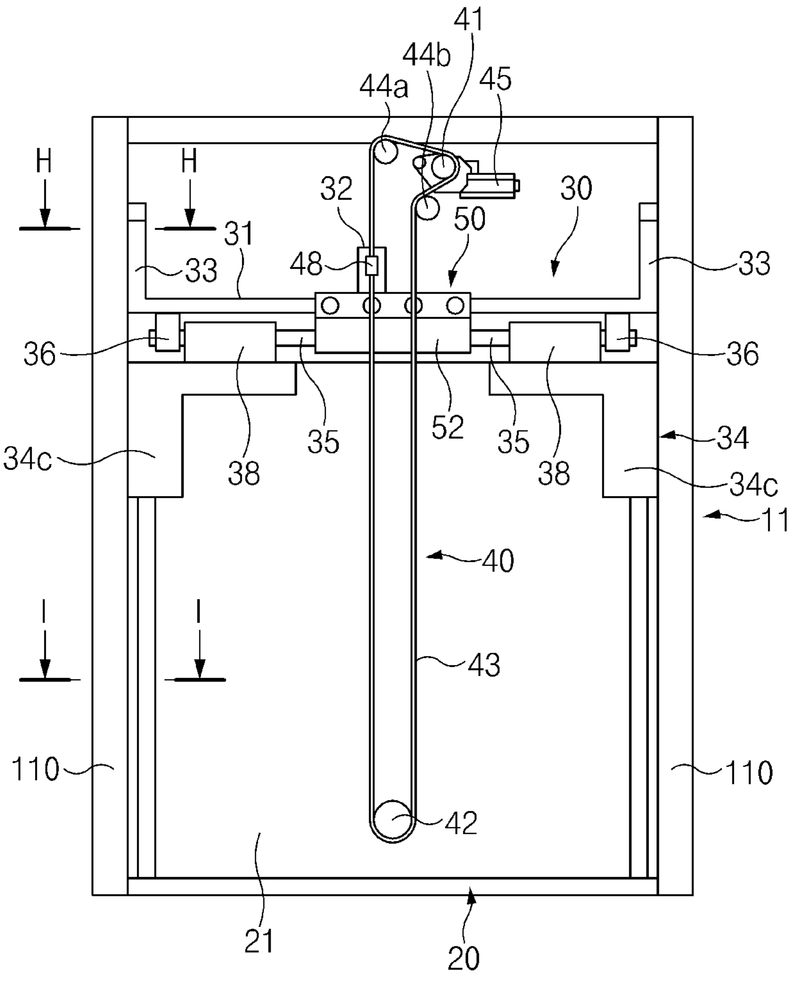
FIG. 9 illustrates a state in which the ramp assembly is stowed in the housing (as viewed in a direction indicated by arrow F of FIG. 4), from which a bottom wall of the housing is removed.
Figure 10:
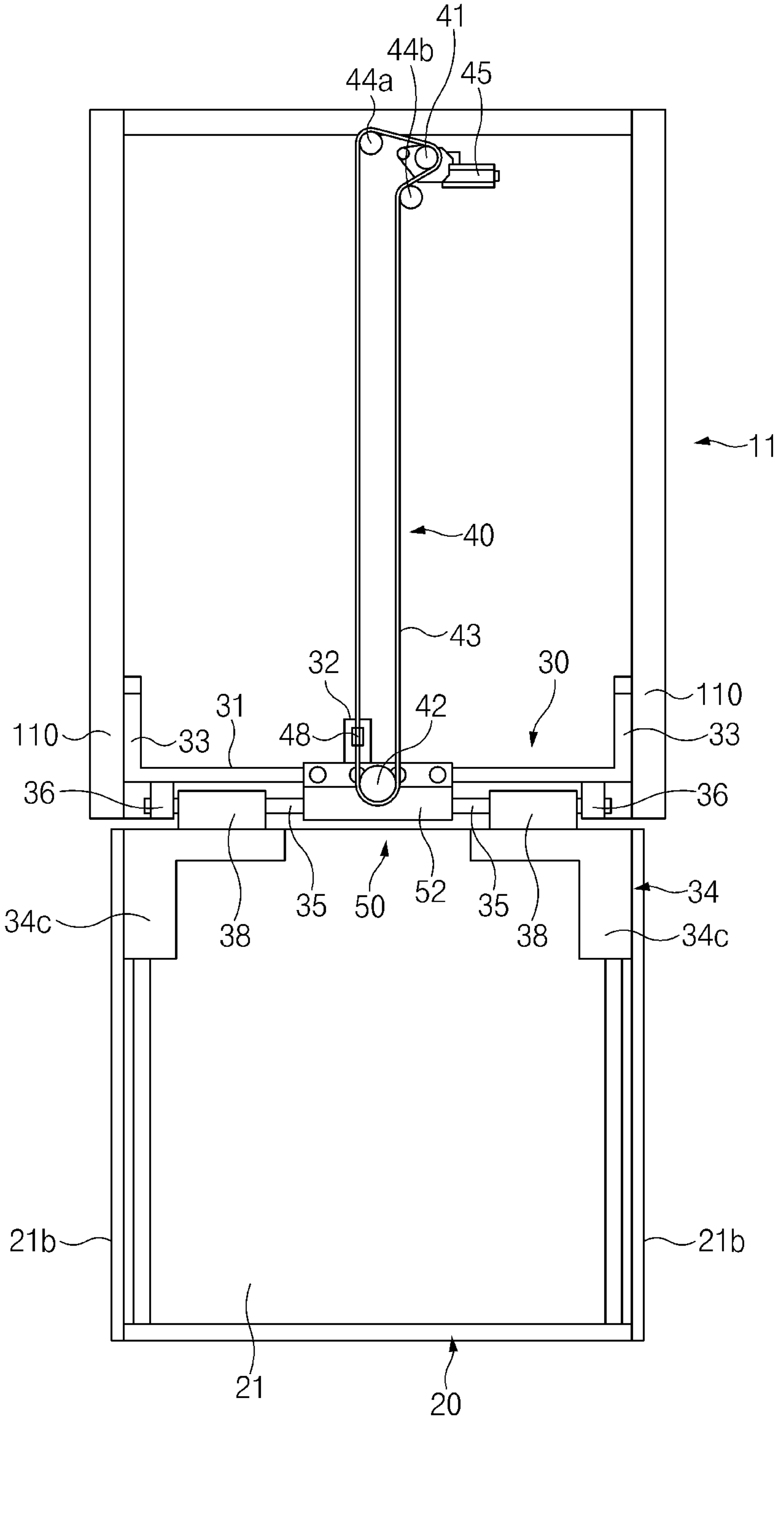
FIG. 10 illustrates a state in which the ramp assembly is deployed from the housing (as viewed in the direction indicated by arrow F of FIG. 4), from which the bottom wall of the housing is removed.

Referring to FIG. 2, the ramp apparatus 10 for a vehicle according to an exemplary embodiment of the present disclosure may include a ramp assembly 20 which is movable with respect to the housing 11. The ramp assembly 20 may be configured to move between a stowed position (see FIG. 9) and a deployed position (see FIG. 10) by a hinge mechanism 30. Referring to FIG. 9, the stowed position refers to a position in which the ramp assembly 20 is stowed in an internal space of the housing 11. Referring to FIG. 10, the deployed position refers to a position in which the ramp assembly 20 is deployed from the housing 11.

Figure 4:
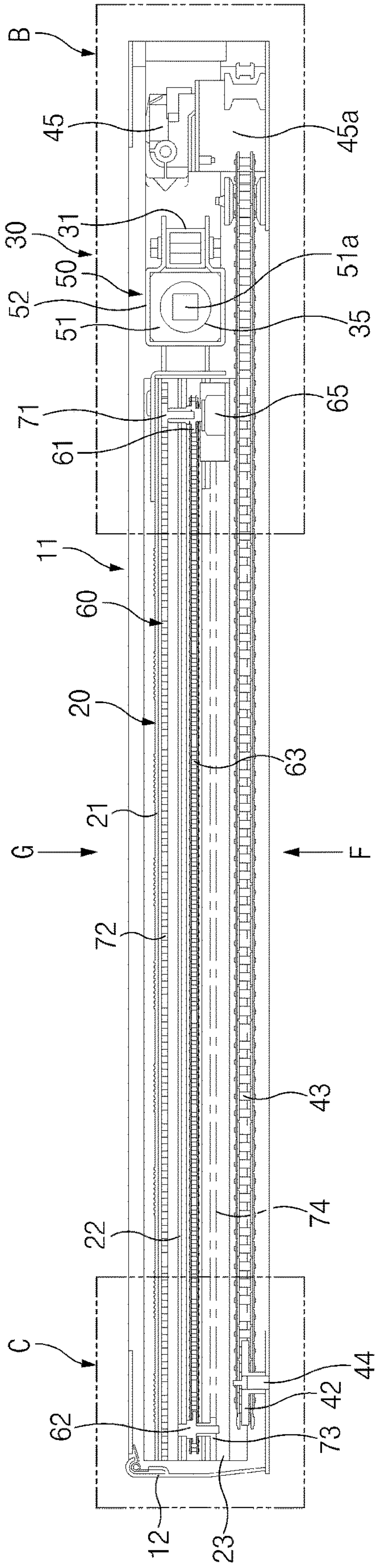
FIG. 4 illustrates a longitudinal cross-sectional view, taken along line A-A of FIG. 3.

Referring to FIG. 4, the ramp assembly 20 may include a plurality of ramp platforms 21, 22, and 23 telescopically connected to each other. Specifically, the plurality of ramp platforms 21, 22, and 23 may include a first ramp platform 21 telescopically and pivotally connected to the housing 11, a second ramp platform 22 telescopically connected to the first ramp platform 21, and a third ramp platform 23 telescopically connected to the second ramp platform 22.

The first ramp platform 21 may include a trailing end portion facing the interior of the vehicle and a leading end portion facing the exterior of the vehicle. The first ramp platform 21 may have a leading opening provided in the leading end portion thereof, and a trailing opening provided in the trailing end portion thereof. The first ramp platform 21 may have a cavity defined therein, and the second ramp platform 22 may be stowed in the cavity of the first ramp platform 21. The first ramp platform 21 may be movable between a stowed position in which the first ramp platform 21 is stowed in the cavity of the housing 11 and a deployed position in which the first ramp platform 21 is deployed from the housing 11. When the first ramp platform 21 is in the stowed position, the trailing end portion of the first ramp platform 21 may be close to the trailing end portion of the housing 11, and the leading end portion of the first ramp platform 21 may be close to the leading end portion of the housing 11. When the first ramp platform 21 is in the deployed position, the trailing end portion of the first ramp platform 21 may be close to the leading end portion of the housing 11, and the leading end portion of the first ramp platform 21 may be far from the leading end portion of the housing 11.

The second ramp platform 22 may include a trailing end portion facing the interior of the vehicle and a leading end portion facing the exterior of the vehicle. The second ramp platform 22 may have a leading opening provided in the leading end portion thereof, and a trailing opening provided in the trailing end portion thereof. The second ramp platform 22 may 22 may have a cavity defined therein, and the third ramp platform 23 may be stowed in the cavity of the second ramp platform 22. The second ramp platform 22 may be movable between a stowed position in which the second ramp platform 22 is stowed in the cavity of the first ramp platform 21 and an extended position in which the second ramp platform 22 is extended out from the first ramp platform 21. When the second ramp platform 22 is in the stowed position, the trailing end portion of the second ramp platform 22 may be close to the trailing end portion of the first ramp platform 21, and the leading end portion of the second ramp platform 22 may be close to the leading end portion of the first ramp platform 21. When the second ramp platform 22 is in the extended position, the trailing end portion of the second ramp platform 22 may be close to the leading end portion of the first ramp platform 21, and the leading end portion of the second ramp platform 22 may be far from the leading end portion of the first ramp platform 21.

The third ramp platform 23 may include a trailing end portion facing the interior of the vehicle and a leading end portion facing the exterior of the vehicle. The third ramp platform 23 may have a leading opening provided in the leading end portion thereof, and a trailing opening provided in the trailing end portion thereof. The third ramp platform 23 may have a cavity defined therein. The third ramp platform 23 may be movable between a stowed position in which the third ramp platform 23 is stowed in the cavity of the second ramp platform 22 and an extended position in which the third ramp platform 23 is extended out from the second ramp platform 22. When the third ramp platform 23 is in the stowed position, the trailing end portion of the third ramp platform 23 may be close to the trailing end portion of the second ramp platform 22, and the leading end portion of the third ramp platform 23 may be close to the leading end portion of the second ramp platform 22. When the third ramp platform 23 is in the extended position, the trailing end portion of the third ramp platform 23 may be close to the leading end portion of the second ramp platform 22, and the leading end portion of the third ramp platform 23 may be far from the leading end portion of the second ramp platform 22.

Figure 22:
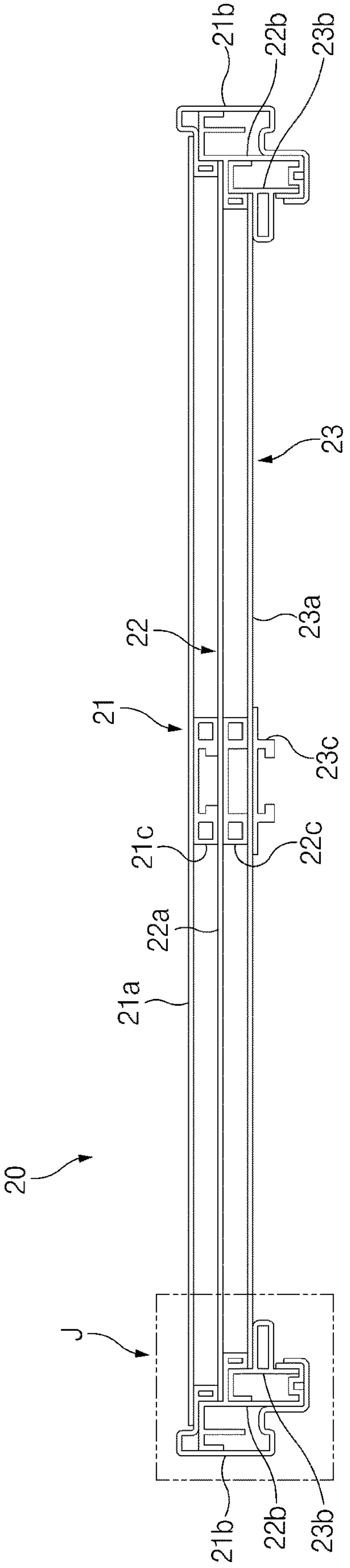
FIG. 22 illustrates a transverse cross-sectional view of a ramp assembly in a ramp apparatus for a vehicle according to an exemplary embodiment of the present disclosure.

Referring to FIG. 22, each of the first ramp platform 21, the second ramp platform 22, and the third ramp platform 23 may be an aluminum extruded product. Each of the first ramp platform 21, the second ramp platform 22, and the third ramp platform 23 may have the cavity defined therein. In particular, the first ramp platform 21 may have the largest size, and the size of the second ramp platform 22 may be less than the size of the first ramp platform 21. Specifically, the length, width, and thickness of the first ramp platform 21 may be greater than the length, width, and thickness of the second ramp platform 22, and the second ramp platform 22 may be fully stowed in the first ramp platform 21. The size of the third ramp platform 23 may 23 may be less than the size of the second ramp platform 22. Specifically, the length, width, and thickness of the second ramp platform 22 may be greater than the length, width, and thickness of the third ramp platform 23, and the third ramp platform 23 may be fully stowed in the second ramp platform 22.

Figure 21:
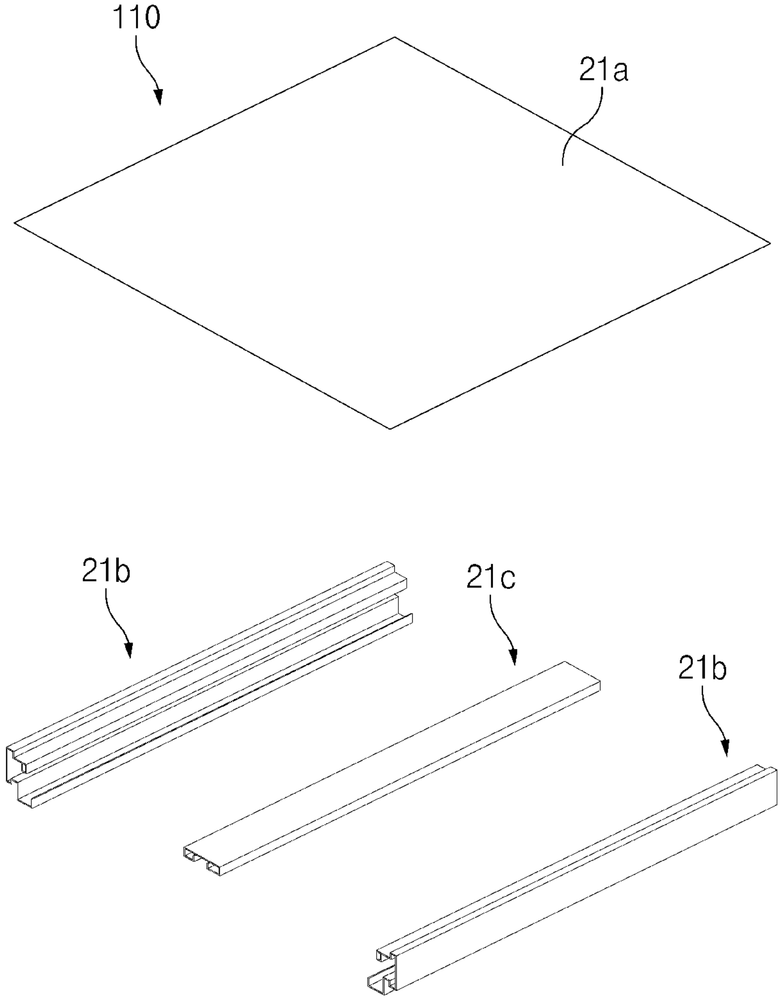
FIG. 21 illustrates an exploded perspective view of a first ramp platform in a ramp apparatus for a vehicle according to an exemplary embodiment of the present disclosure.

Referring to FIGS. 21 and 22, the first ramp platform 21 may include a first ramp plate 21*a*, a pair of first side rails 21*b* attached to both side edges of the first ramp plate 21*a*, respectively, and a first mounting portion 21*c* attached to a central portion of the first ramp plate 21*a*.

The first ramp plate 21*a* may be made of a metal material such as aluminum or steel. The first ramp plate 21*a* may be formed into a flat plate by cutting and/or the like. As the first ramp plate 21*a* is formed into a flat plate, various patterns such as unevenness or irregularities may be easily machined on a top surface of the first ramp plate 21*a*.

The first side rails 21*b* may extend along the corresponding side edges of the first ramp plate 21*a*, respectively. The first side rails 21*b* may be fixed to the corresponding side edges of the first ramp plate 21*a* using fasteners, welding, and/or the like, respectively.

Figure 23:
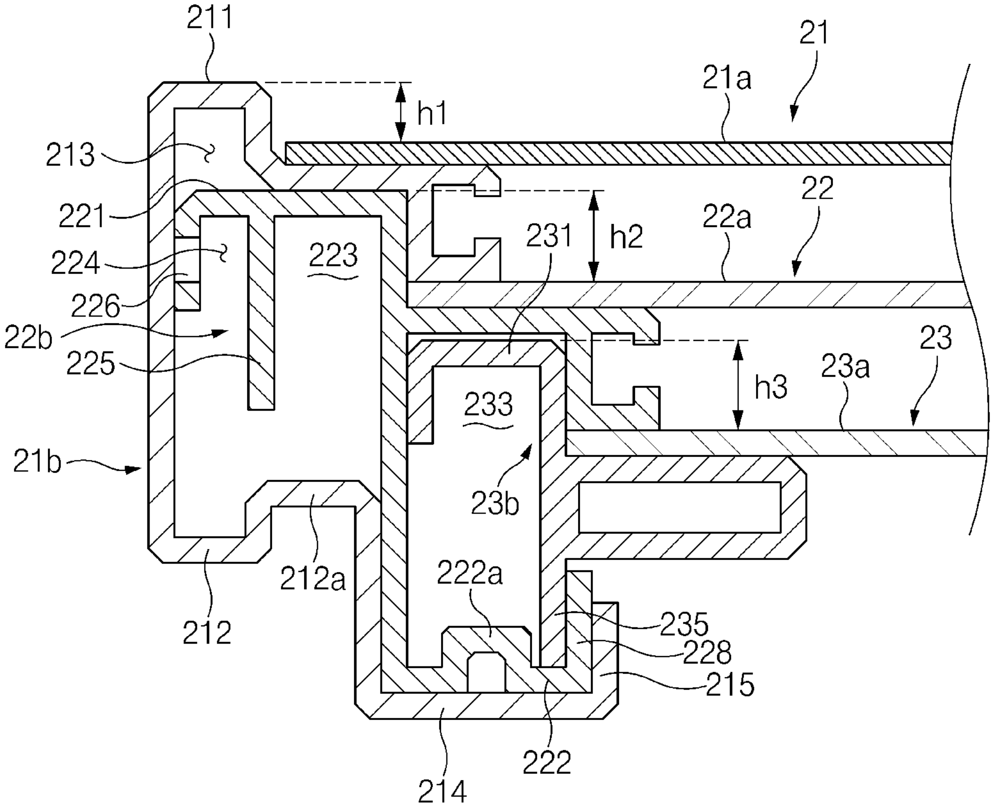
FIG. 23 illustrates an enlarged view of portion J of FIG. 22.

Each first side rail 21*b* may have a channel-shaped cross section which is open to the second ramp platform 22 and the third ramp platform 23. Referring to FIG. 23, each first side rail 21*b* may include an upper guide portion 211 protruding upwardly, a lower guide portion 212 protruding downwardly, an inner guide portion 214 connected to the lower guide portion 212, a contact portion 212*a* located between the lower guide portion 212 and the inner guide portion 214, and a vertical guide portion 215 connected to the inner guide portion 214. The inner guide portion 214 may be located lower than the lower guide portion 212, and the contact portion 212*a* may be located higher than the lower guide portion 212. The upper guide portion 211, the lower guide portion 212, the inner guide portion 214, the contact portion 212*a*, and the vertical guide portion 215 may define a cavity 213.

Figure 7:
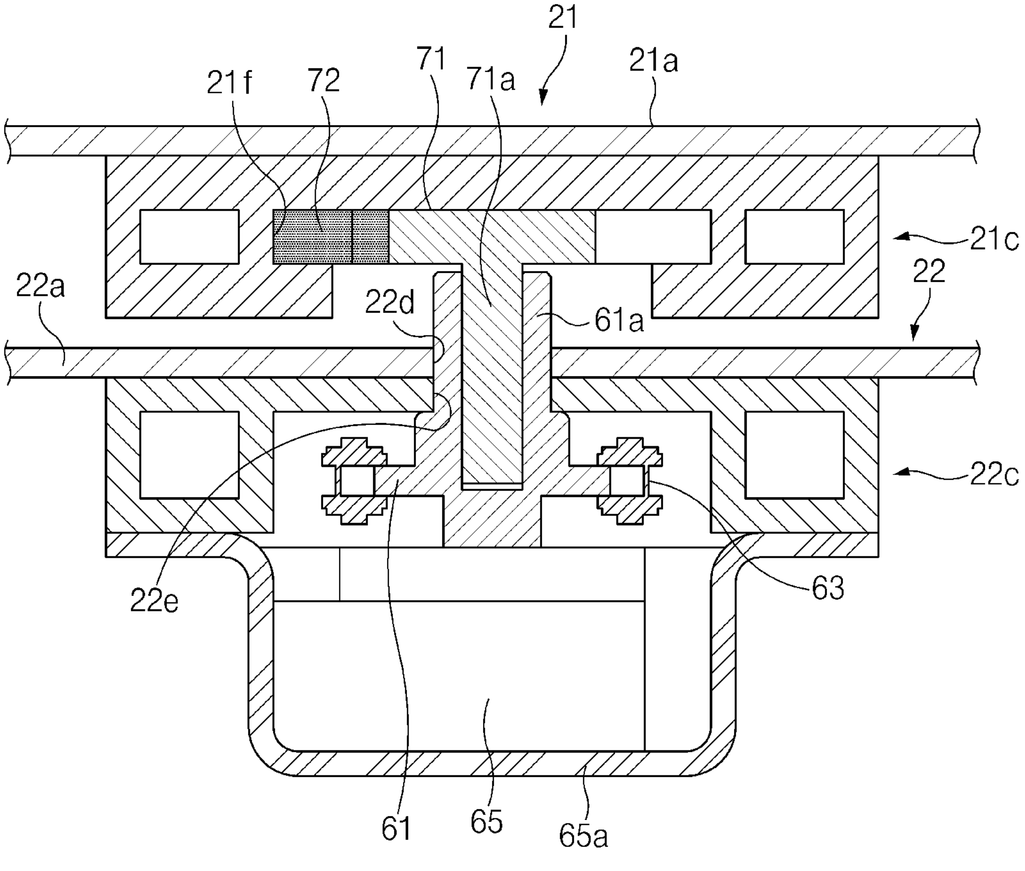
FIG. 7 illustrates a cross-sectional view, taken along line D-D of FIG. 5.

Referring to FIGS. 7 and 22, the first mounting portion 21*c* may extend along a central longitudinal axis of the first ramp plate 21*a*, and the first mounting portion 21*c* may be fixed to the central portion of the first ramp plate 21*a*. The first mounting portion 21*c* may have a U-shaped cross section which is open to the second ramp platform 22, and accordingly the first mounting portion 21*c* may have a cavity defined therein. The first mounting portion 21*c* may be made of a metal material such as aluminum, and the first mounting portion 21*c* may be formed by an extrusion process and/or the like.

The first ramp plate 21*a*, the pair of first side rails 21*b*, and the first mounting portion 21*c* may be individually made, and the pair of first side rails 21*b* and the first mounting portion 21*c* may be fixed to the first ramp plate 21*a* using fasteners, welding, and/or the like so that the first ramp platform 21 may be formed of various modular structures. For example, the width of the first ramp plate 21*a* may be varied depending on the specifications of the vehicle so that the first ramp platform 21 may be embodied as various modular structures without changing the structure of a drive mechanism 60.

Referring to FIG. 22, the second ramp platform 22 may include a second ramp plate 22*a*, a pair of second side rails 22*b* attached to both side edges of the second ramp plate 22*a*, respectively, and a second mounting portion 22*c* attached to a central portion of the second ramp plate 22*a*.

The second ramp plate 22*a* may be made of a metal material such as aluminum or steel. The second ramp plate 22*a* may be formed into a flat plate by cutting and/or the like. As the second ramp plate 22*a* is formed into a flat plate, various patterns such as unevenness or irregularities may be easily machined on a top surface of the second ramp plate 22*a*.

The second side rails 22*b* may extend along the corresponding side edges of the second ramp plate 22*a*, respectively. The second side rails 21*b* may be fixed to the corresponding side edges of the second ramp plate 22*a* using fasteners, welding, and/or the like, respectively.

Each second side rail 22*b* may have a channel-shaped cross section which is open to the third ramp platform 23. Each second side rail 22*b* may slide along the corresponding first side rail 21*b*. Referring to FIG. 23, each second side rail 22*b* may include an upper guide portion 221 protruding upwardly, an inner guide portion 222 connected to the upper guide portion 221, a contact portion 222*a* protruding from the inner guide portion 222, and a vertical guide portion 228 connected to the inner guide portion 222. Each second side rail 22*b* may include an inner cavity 223 and an outer cavity 224 located below the upper guide portion 221, and the inner cavity 223 and the outer cavity 224 may be partially partitioned by a vertical partition 225. The inner guide portion 222 may be located lower than the upper guide portion 221, and the contact portion 222*a* may protrude upwardly from the inner guide portion 222. The vertical guide portion 228 of the second side rail 22*b* may be guided with respect to the vertical guide portion 215 of the first side rail 21*b*.

Figure 8:
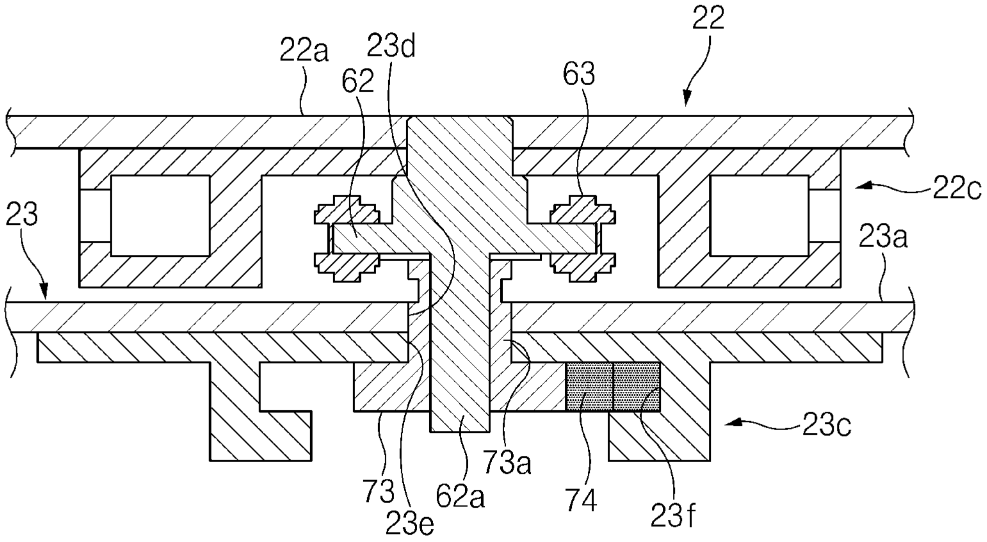
FIG. 8 illustrates a cross-sectional view, taken along line E-E of FIG. 6.

Referring to FIGS. 7, 8, and 22, the second mounting portion 22*c* may extend along a central longitudinal axis of the second ramp plate 22*a*, and the second mounting portion 22*c* may be fixed to the central portion of the second ramp plate 22*a*. The second mounting portion 22*c* may have a U-shaped cross section which is open to the third ramp platform 23, and accordingly the second mounting portion 22*c* may have a cavity defined therein. The second mounting portion 22*c* may be made of a metal material such as aluminum, and the second mounting portion 22*c* may be formed by an extrusion process and/or the like.

The second ramp plate 22*a*, the pair of second side rails 22*b*, and the second mounting portion 22*c* may be individually made, and the pair of second side rails 22*b* and the second mounting portion 22*c* may be fixed to the second ramp plate 22*a* using fasteners, welding, and/or the like so that the second ramp platform 22 may be formed of various modular structures. For example, the width of the second ramp plate 22*a* may be varied depending on the specifications of the vehicle so that the second ramp platform 22 may be embodied as various modular structures without changing the structure of the drive mechanism 60.

Referring to FIG. 22, the third ramp platform 23 may include a third ramp plate 23*a*, a pair of third side rails 23*b* attached to both side edges of the third ramp plate 23*a*, respectively, and a third mounting portion 23*c* attached to a central portion of the third ramp plate 23*a*.

The third ramp plate 23*a* may be made of a metal material such as aluminum or steel. The third ramp plate 23*a* may be formed into a flat plate by cutting and/or the like. As the third ramp plate 23*a* is formed into a flat plate, various patterns such as unevenness or irregularities may be easily machined on a top surface of the third ramp plate 23*a*.

The third side rails 23*b* may extend along the corresponding side edges of the third ramp plate 23*a*, respectively. The third side rails 23*b* may be fixed to the corresponding side edges of the third ramp plate 23*a* using fasteners, welding, and/or the like, respectively. Each third side rail 23*b* may slide along the corresponding second side rail 22*b*. Referring to FIG. 23, each third side rail 23*b* may include an upper guide portion 231 protruding upwardly, and a vertical guide portion 235 connected to the upper guide portion 231. Each third side rail 23*b* may include a cavity 233 located below the upper guide portion 231. The vertical guide portion 235 of the third side rail 23*b* may be guided with respect to the vertical guide portion 228 of the second side rail 22*b*.

Referring to FIGS. 8 and 22, the third mounting portion 23*c* may extend along a central longitudinal axis of the third ramp plate 23*a*. The third mounting portion 23*c* may have a U-shaped cross section which is open downwardly, and accordingly the third mounting portion 23*c* may have a cavity defined therein. The third mounting portion 23*c* may be made of a metal material such as aluminum, and the third mounting portion 23*c* may be formed by an extrusion process and/or the like.

Referring to FIGS. 22 to 25, each first side rail 21*b* may have the channel-shaped cross section which is open to the second ramp platform 22 and the third ramp platform 23, and each second side rail 22*b* may have the channel-shaped cross section which is open to the third ramp platform 23 so that a foreign object may be prevented from being stuck between the first side rail 21*b* of the first ramp platform 21, the second side rail 22*b* of the second ramp platform 22, and the third side rail 23*b* of the third ramp platform 23.

Referring to FIGS. 22 to 25, the first ramp plate 21*a* of the first ramp platform 21 and the second ramp plate 22*a* of the second ramp platform 22 may be spaced apart from each other by a predetermined gap (for example, 15.5 mm), and the second ramp plate 22*a* of the second ramp platform 22 and the third ramp plate 23*a* of the third ramp platform 23 may be spaced apart from each other by a predetermined gap (for example, 15.5 mm). Accordingly, even when at least one of the first ramp plate 21*a*, the second ramp plate 22*a*, and the third ramp plate 23*a* is deformed, the deformation may not affect the movement of the first ramp platform 21, the movement of the second ramp platform 22, and the movement of the third ramp platform 23.

The ramp apparatus 10 for a vehicle according to an exemplary embodiment of the present disclosure may include the hinge mechanism 30 configured to move the first ramp platform 21 of the ramp assembly 20 between the stowed position and the deployed position, and allow the first ramp platform 21 of the ramp assembly 20 to pivot with respect to the housing 11 when the first ramp platform 21 of the ramp assembly 20 is in the deployed position.

Figure 5:
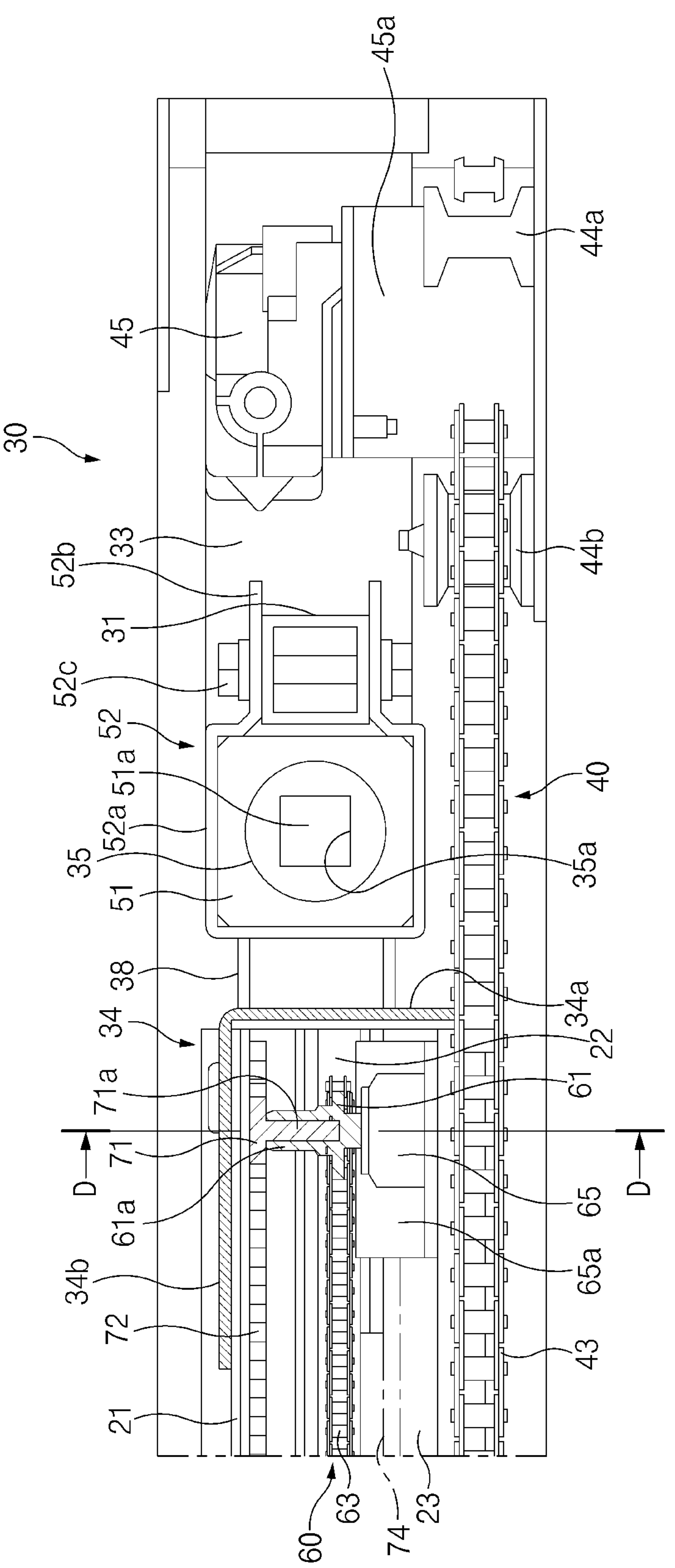
FIG. 5 illustrates an enlarged view of portion B of FIG. 4.

Referring to FIGS. 4 and 5, the hinge mechanism 30 may include a moving body 31 connected to the first ramp platform 21 of the ramp assembly 20 through a pair of hinge shafts 35, and a hinge drive unit 50 mounted on a central portion of the moving body 31.

Referring to FIGS. 9 and 10, the moving body 31 may extend along the width of the housing 11. The moving body 31 may include a central extension portion 32 extending from the central portion of the moving body 31 toward the trailing end portion of the housing 11, and a pair of side extension portions 33 extending from both ends of the moving body 31 toward the trailing end portion of the housing 11. The central extension portion 32 and each side extension portion 33 may extend along the length of the housing 11.

The moving body 31 may move along a longitudinal direction of the housing 11 in the internal space of the housing 11 by a moving mechanism 40. Referring to FIG. 9, when the moving body 31 moves close to the trailing end portion of the housing 11, the ramp assembly 20 may be fully stowed in the internal space of the housing 11. Referring to FIG. 10, when the moving body 31 moves close to the leading end portion of the housing 11, the ramp assembly 20 may be fully deployed (extended out) from the internal space of the housing 11.

Referring to FIGS. 9 and 10, the pair of side extension portions 33 of the moving body 31 may be guided along a pair of corresponding guide rails 110 so that the moving body 31 may move in the housing 11.

Figure 11:
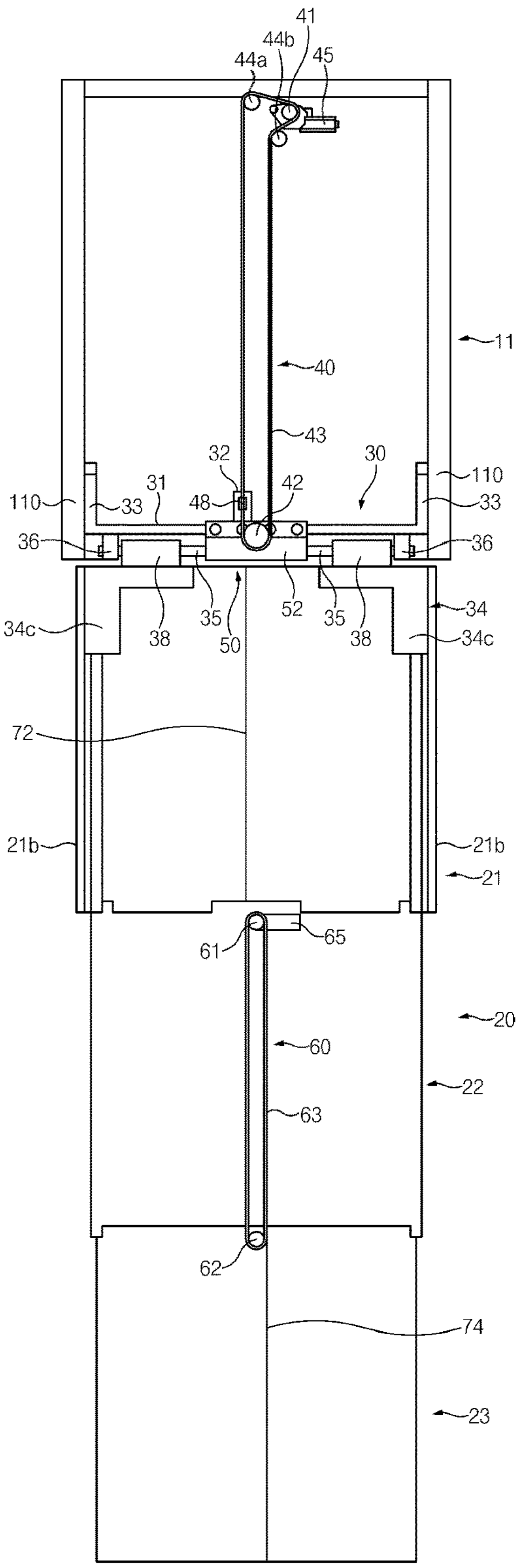
FIG. 11 illustrates a state in which a first ramp platform, a second ramp platform, and a third ramp platform of the ramp assembly are fully extended out from the housing (as viewed in the direction indicated by arrow F of FIG. 4), from which the bottom wall of the housing is removed.
Figure 12:
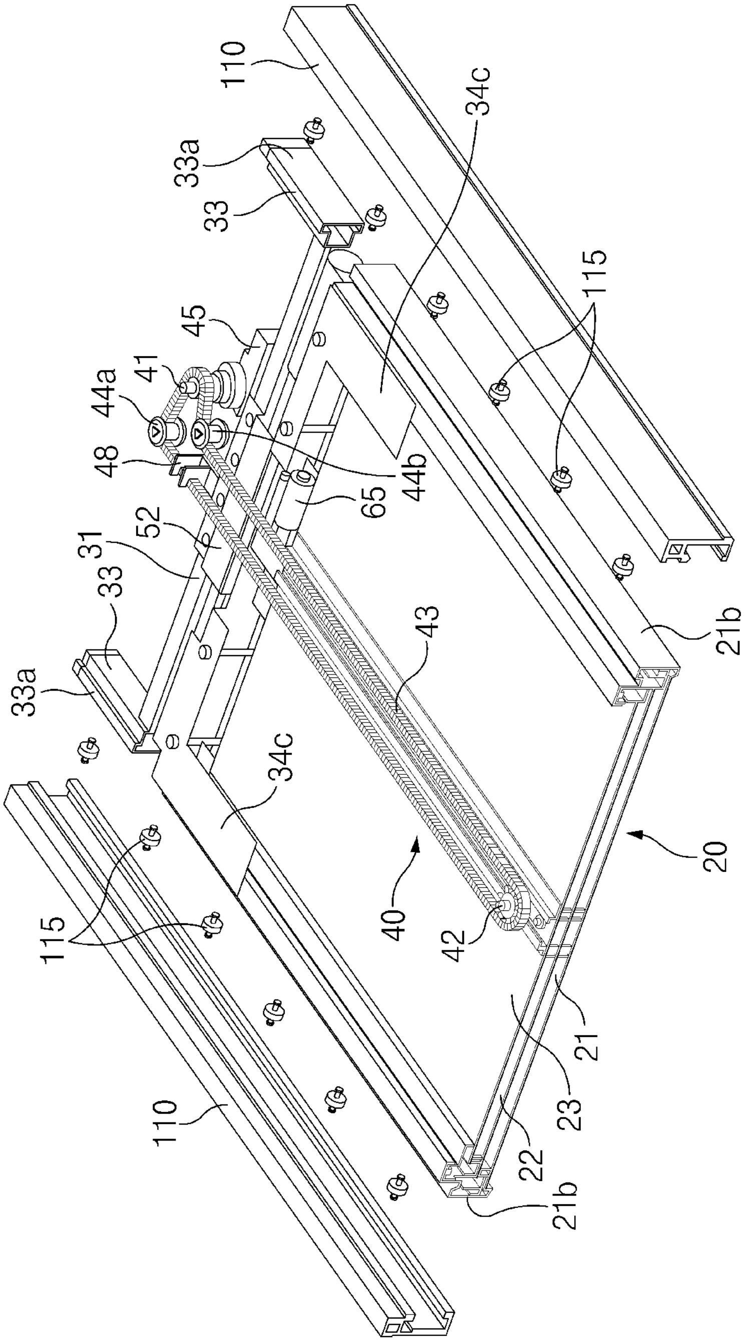
FIG. 12 illustrates an exploded perspective view of the ramp assembly, a hinge mechanism, and guide rails of the housing (as viewed in the direction indicated by arrow F of FIG. 4)

Referring to FIGS. 9, 10, and 11, the housing 11 may include the pair of guide rails 110 disposed on both sides thereof, and the pair of guide rails 110 may be spaced apart from each other in a width direction of the housing 11. The pair of guide rails 110 may be configured to guide the movement of the first ramp platform 21 of the ramp assembly 20 and the movement of the hinge mechanism 30.

Figure 13:
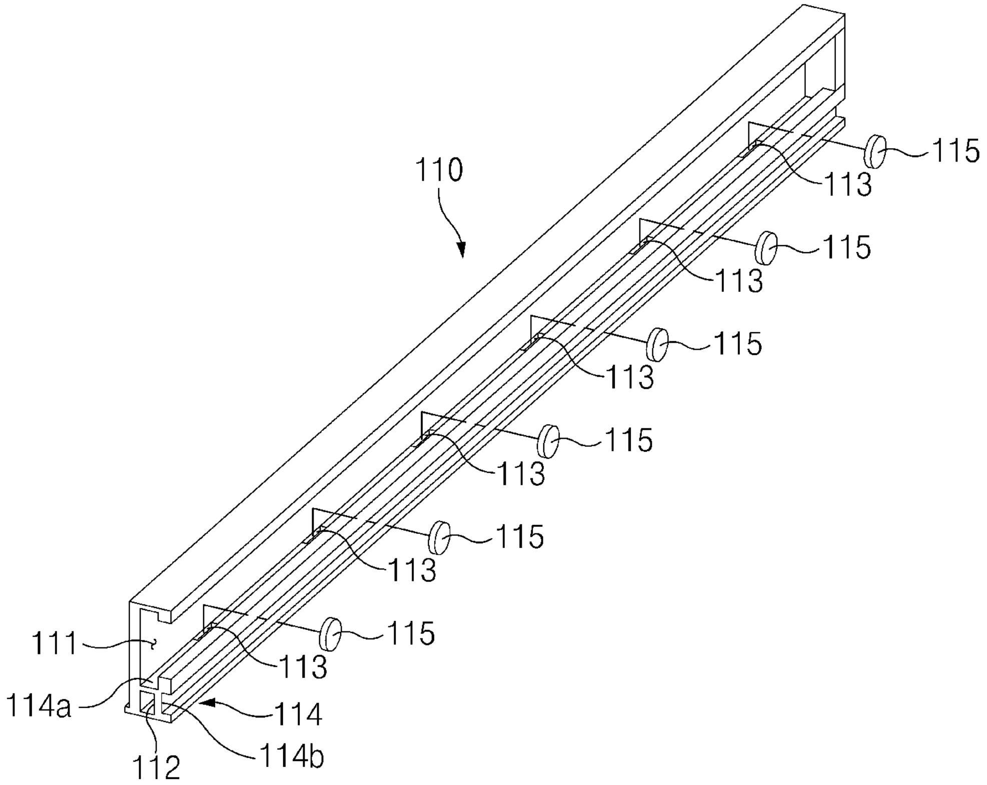
FIG. 13 illustrates a perspective view of the guide rails of the housing (as viewed in a direction indicated by arrow G of FIG. 4)

Referring to FIG. 13, each guide rail 110 may include a guide groove 111, a mounting portion 114 located below the guide groove 111, and a plurality of main rollers 115 rotatably mounted on the mounting portion 114. The guide groove 111 may extend along a longitudinal direction of the guide rail 110. The mounting portion 114 may be located below the guide groove 111, and the mounting portion 114 may extend along the longitudinal direction of the guide rail 110. According to an exemplary embodiment, the mounting portion 114 may include a top wall 114*a*, and a side wall 114*b* perpendicular to the top wall 114*a*. The mounting portion 114 may have a cavity 112 defined by the top wall 114*a* and the side wall 114*b*. A plurality of through holes 113 may be provided in the top wall 114*a* and be spaced apart from each other by a predetermined gap. The plurality of main rollers 115 may be rotatably mounted in the cavity 112 of the mounting portion 114, and a portion of each main roller 115 may protrude through the corresponding through hole 113 so that it may be located in the guide groove 111.

Figure 14:
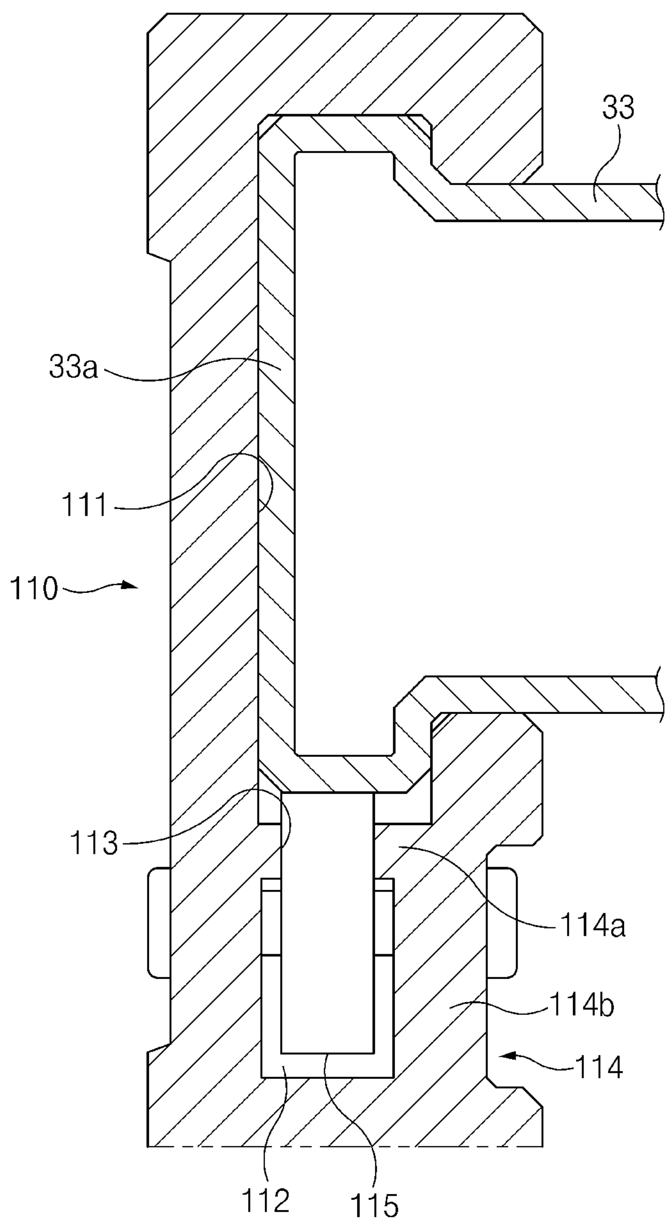
FIG. 14 illustrates a cross-sectional view, taken along line H-H of FIG. 9.

Referring to FIG. 14, each side extension portion 33 may have a guide portion 33*a* guided along the guide groove 111 of the corresponding guide rail 110, and the plurality of main rollers 115 may be in rolling contact with a bottom surface of the guide portion 33*a*.

Figure 15:
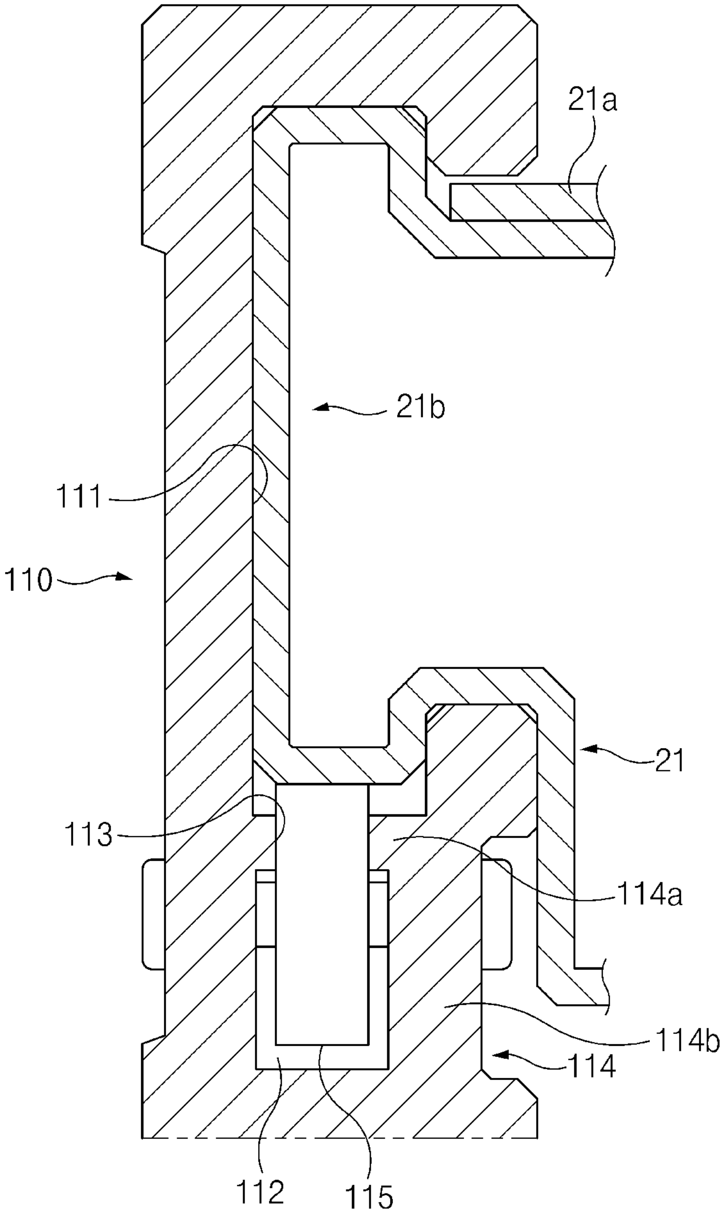
FIG. 15 illustrates a cross-sectional view, taken along line I-I of FIG. 9.

Referring to FIG. 15, each first side rail 21*b* of the first ramp platform 21 may slide along the corresponding guide rail 110 of the housing 11, and a bottom surface of the first side rail 21*b* may be in rolling contact with the main rollers 115 of the guide rail 110.

Figure 18:
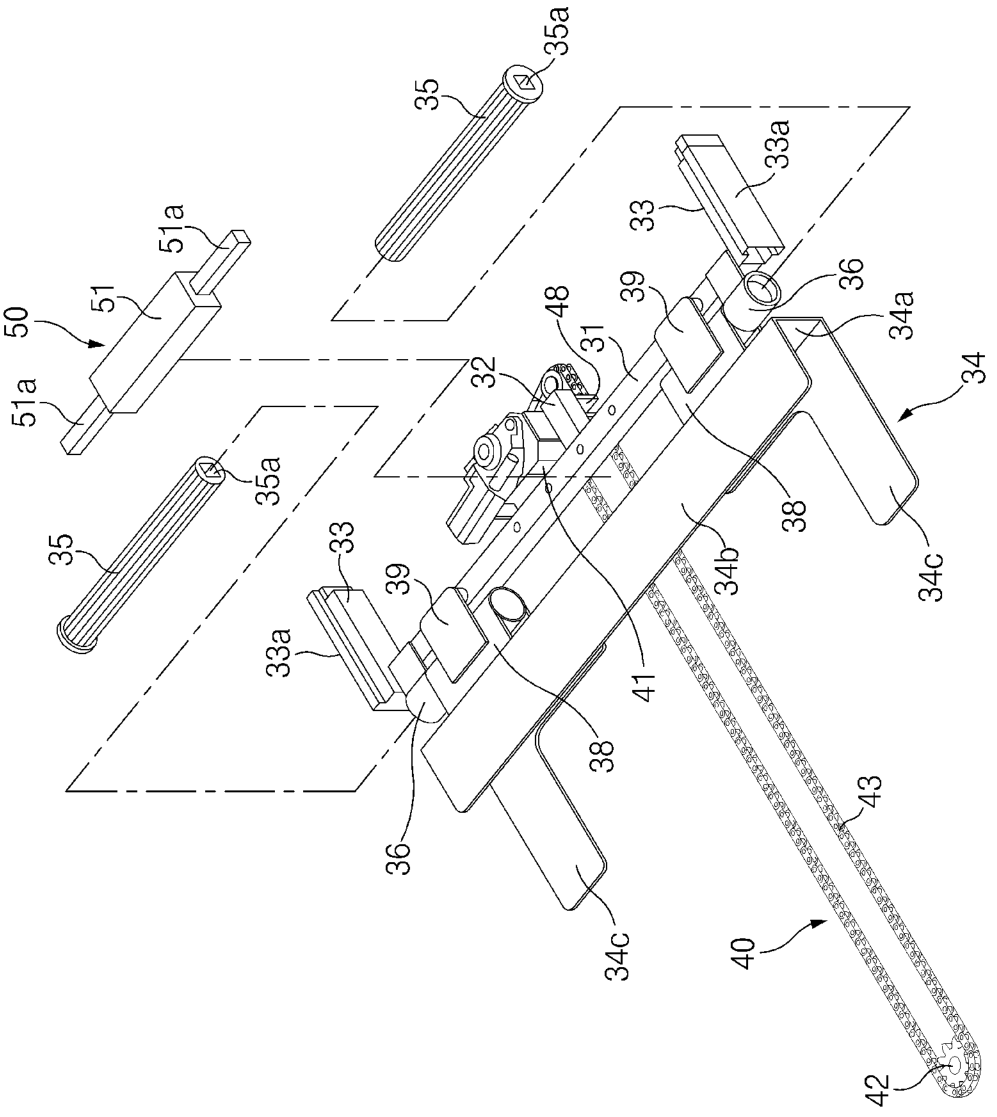
FIG. 18 illustrates an exploded perspective view of the hinge mechanism (as viewed in the direction indicated by arrow G of FIG. 4)

Referring to FIGS. 5 and 18, the hinge drive unit 50 may include a motor 51 mounted on the central portion of the moving body 31. The motor 51 may be a bidirectional motor operating clockwise and counterclockwise. The motor 51 may be a dual shaft motor having a pair of output shafts 51*a* facing each other, and the pair of output shafts 51*a* may extend from the motor 51 symmetrically. An axis of each output shaft 51*a* may be aligned with an axis of a motor housing of the motor 51. Each output shaft 51*a* may be a rectangular bar, and the motor 51 may have a rectangular shape.

Referring to FIG. 5, the motor 51 may be mounted on the central portion of the moving body 31 through a mounting bracket 52. The mounting bracket 52 may include a surround portion 52*a* surrounding the motor 51, and a fixed portion 52*b* fixed to the central portion of the moving body 31 using a fastener 52*c*.

Figure 16:
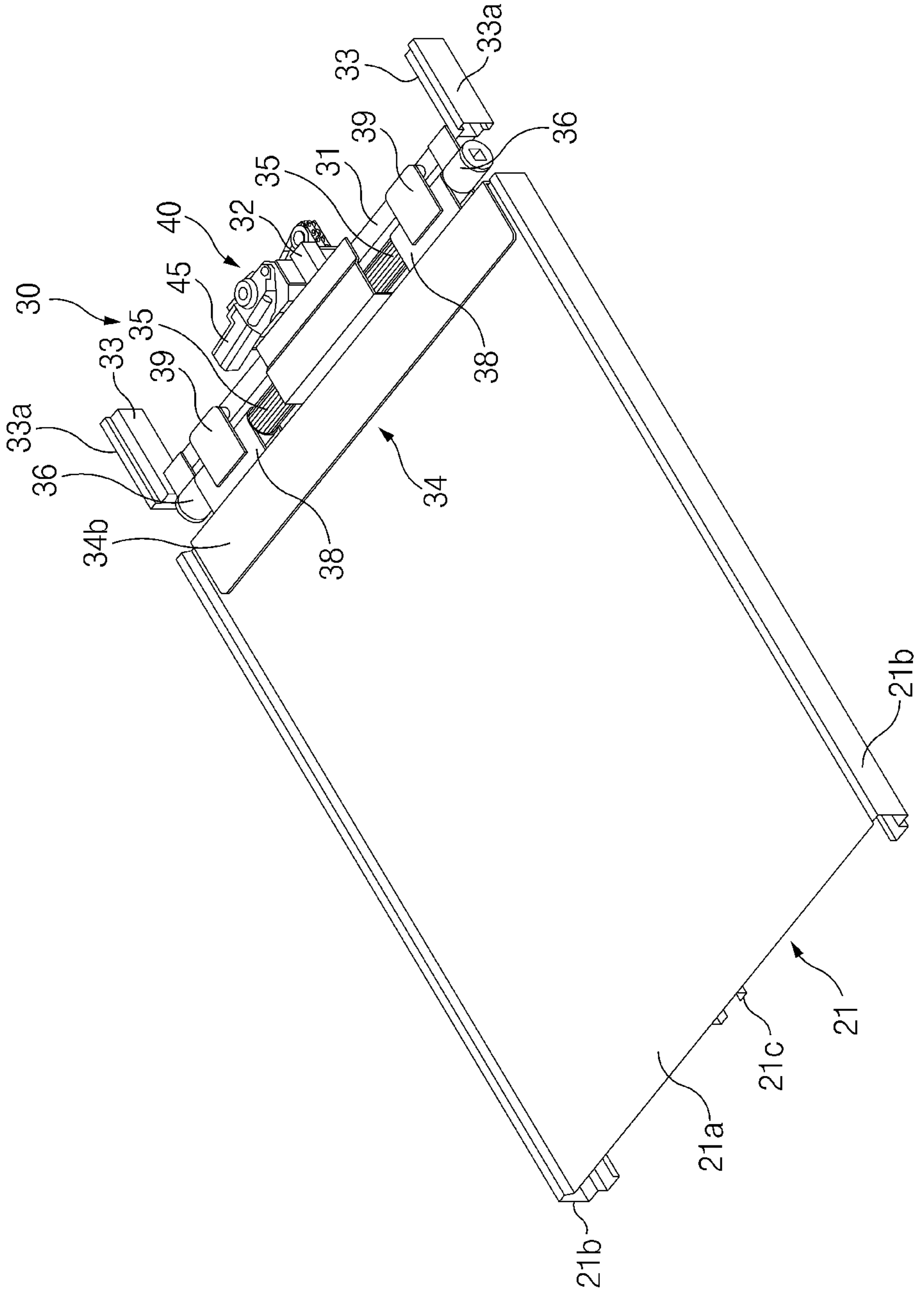
FIG. 16 illustrates a perspective view of the hinge mechanism and the ramp assembly (as viewed in the direction indicated by arrow G of FIG. 4)
Figure 17:
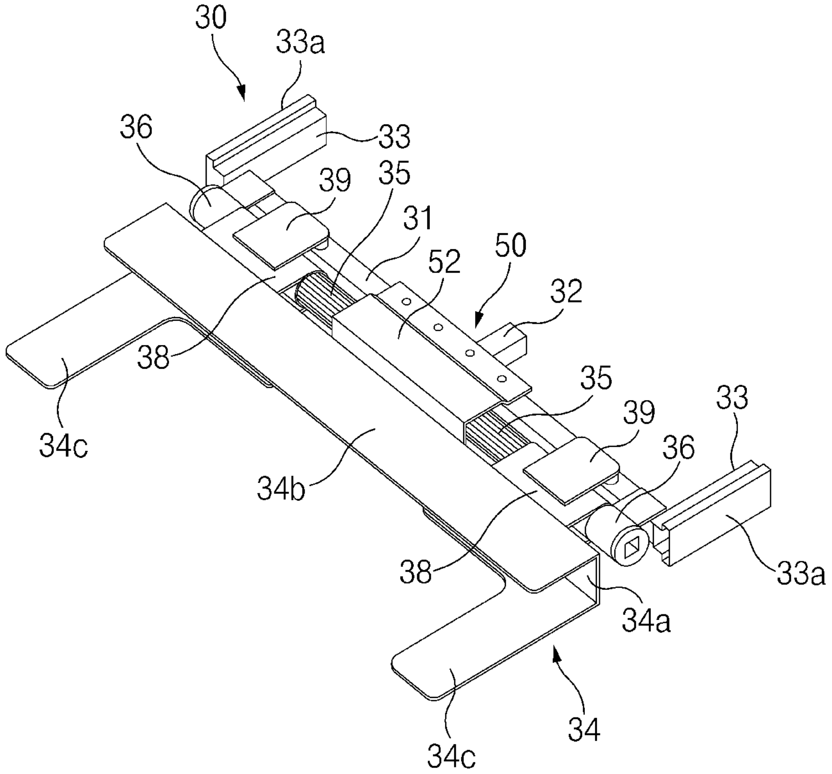
FIG. 17 illustrates a perspective view of the hinge mechanism (as viewed in the direction indicated by arrow G of FIG. 4)

Referring to FIGS. 16, 17, and 18, when the ramp assembly 20 is deployed from the housing 11, the motor 51 may allow the first ramp platform 21 to pivot through the pair of hinge shafts 35. The pair of output shafts 51*a* may be fixed to the pair of hinge shafts 35, respectively, and the pair of hinge shafts 35 may be rotated by the motor 51. As the motor 51 rotates the pair of hinge shafts 35, the first ramp platform 21 of the ramp assembly 20 may pivot around the hinge shafts 35. The pair of hinge shafts 35 may be fixedly connected to the first ramp platform 21 of the ramp assembly 20 through a pair of hinge lugs 38 and a bracket 34. The bracket 34 may be fixed to the trailing end portion of the first ramp platform 21 of the ramp assembly 20, and the pair of hinge lugs 38 may be integrally connected to the bracket 34 so that the pair of hinge lugs 38 may be fixedly connected to the first ramp platform 21 of the ramp assembly 20. Each hinge lug 38 may have a fitting hole, and each hinge shaft 35 may be fixed to the fitting hole of the corresponding hinge lug 38 through serration coupling. The bracket 34 may include a vertical wall 34*a*, a top wall 34*b* extending horizontally from a top end of the vertical wall 34*a*, and a bottom wall 34*c* extending horizontally from a bottom end of the vertical wall 34*a*. A pair of bushes 36 may be fixed to the moving body 31, and the hinge shafts 35 may be rotatably supported by the pair of corresponding bushes 36, respectively.

Each hinge shaft 35 may have a rectangular hole 35*a* corresponding to the output shaft 51*a* of the motor 51, and each output shaft 51*a* may be fitted into the hole 35*a* of the corresponding hinge shaft 35. The axis of the output shaft 51*a* may be aligned with an axis of the hinge shaft 35. Each output shaft 51*a* of the motor 51 may be fitted into the hole 35*a* of the corresponding hinge shaft 35 so that the output shaft 51*a* of the motor 51 may be fixedly connected to the corresponding hinge shaft 35. That is, the pair of hinge shafts 35 may be directly rotated by the motor 51. As the motor 51 operates, the hinge shafts 35 may rotate clockwise and counterclockwise, and the first ramp platform 21 of the ramp assembly 20 may 20 may pivot around the hinge shafts 35 clockwise and counterclockwise.

Referring to FIGS. 16, 17, and 18, a pair of hinge stoppers 39 may be fixed to the pair of hinge lugs 38, respectively, and each hinge stopper 39 may extend from the corresponding hinge lug 38 toward the moving body 31. As the motor 51 of the hinge drive unit 50 rotates the hinge shafts 35 and the hinge lugs 38 clockwise, the first ramp platform 21 of the ramp assembly 20 may move to a horizontal position so that the hinge stoppers 39 may come into contact with the moving body 31.

Figure 19:
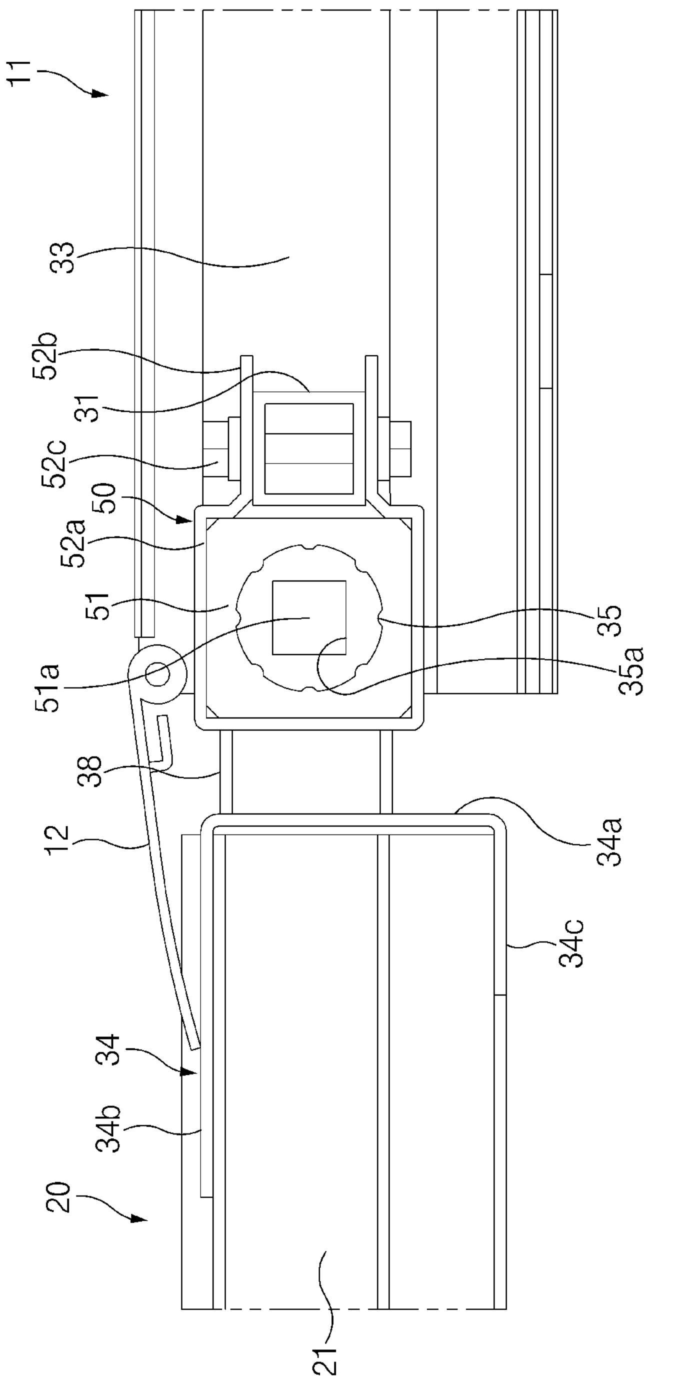
FIG. 19 illustrates a side sectional view of a ramp apparatus for a vehicle according to an exemplary embodiment of the present disclosure, in a state in which a ramp assembly is deployed from a housing.
Figure 20:
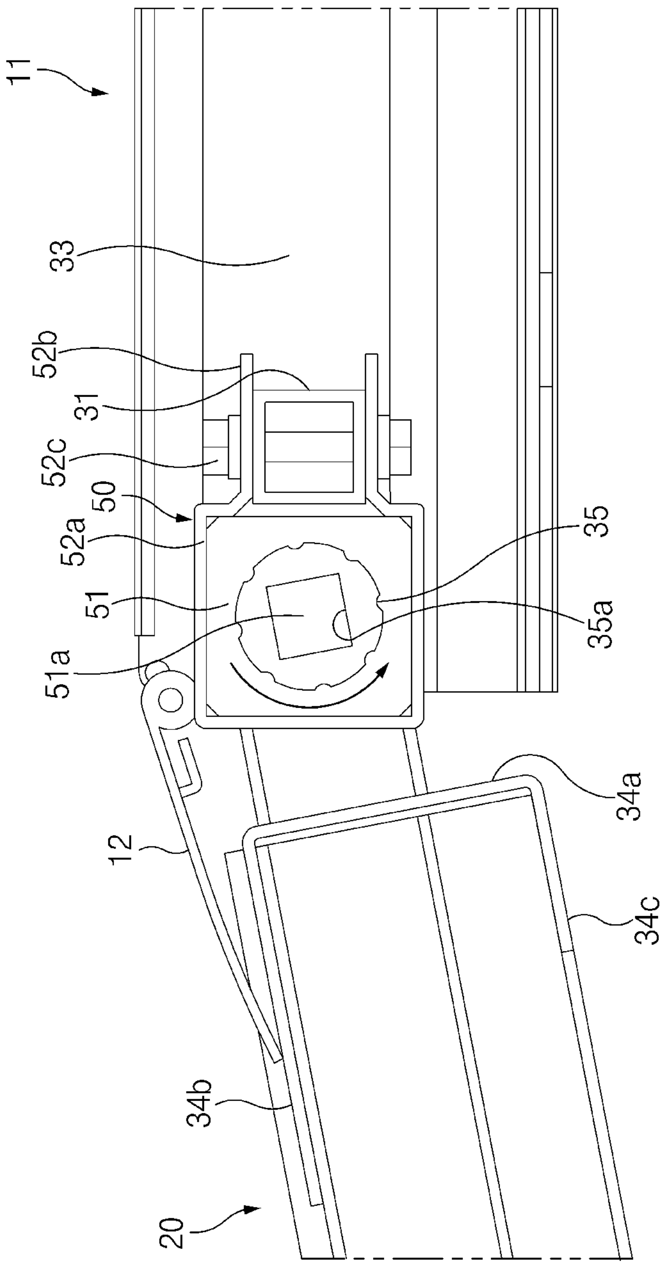
FIG. 20 illustrates a side sectional view of a state in which the ramp assembly illustrated in FIG. 19 pivots with respect to a hinge mechanism.

Specifically, after the ramp assembly 20 is fully deployed from the housing 11 by the moving body 31 and the moving mechanism 40, the motor 51 of the hinge drive unit 50 may rotate the hinge shafts 35 and the hinge lugs 38 clockwise and counterclockwise so that the ramp assembly 20 may move between the horizontal position (see FIG. 19) and an inclined position (see FIG. 20). Referring to FIG. 19, the horizontal position refers to a position in which the ramp assembly 20 is substantially parallel to the housing 11 as the motor 51 of the hinge drive unit 50 rotates the hinge shafts 35 and the hinge lugs 38 clockwise. Referring to FIG. 20, the inclined position refers to a position in which the ramp assembly 20 is inclined at a predetermined angle with respect to the housing 11 as the motor 51 of the hinge drive unit 50 rotates the hinge shafts 35 and the hinge lugs 38 counterclockwise.

In a state in which the ramp assembly 20 is fully deployed from the housing 11 by the moving body 31 and the moving mechanism 40, as the motor 51 of the hinge drive unit 50 rotates the hinge shafts 35 and the hinge lugs 38, the hinge stoppers 39 may come into contact with or be spaced apart from the moving body 31 of the hinge mechanism 30. That is, the hinge stoppers 39 may come into contact with or be spaced apart from the moving body 31 of the hinge mechanism 30 according to the rotation directions of the hinge shafts 35. In a state in which the ramp assembly 20 is fully deployed from the housing 11 by the moving body 31 and the moving mechanism 40, as the motor 51 of the hinge drive unit 50 rotates the hinge shafts 35 clockwise, the ramp assembly 20 may be moved to the horizontal position by the hinge drive unit 50, and the hinge stoppers 39 may come into contact with the moving body 31. In a state in which the ramp assembly 20 is fully deployed from the housing 11, as the motor 51 of the hinge drive unit 50 rotates the hinge shafts 35 counterclockwise, the ramp assembly 20 may be moved to the inclined position by the hinge drive unit 50, and the hinge stoppers 39 may be spaced apart from the moving body 31.

Referring to FIGS. 4, 9, and 10, the ramp apparatus 10 for a vehicle according to an exemplary embodiment of the present disclosure may include the moving mechanism 40 allowing the moving body 31 of the hinge mechanism 30 and the ramp assembly 20 to move. In particular, the moving mechanism 40 may be configured to allow the ramp assembly 20 to move between the stowed position (see FIG. 9) and the deployed position (see FIG. 10).

The moving mechanism 40 may be a chain drive mechanism including a drive sprocket 41 adjacent to the trailing end portion of the housing 11, a driven sprocket 42 adjacent to the leading end portion of the housing 11, a chain 43 connecting the drive sprocket 41 and the driven sprocket 42, a chain attachment 48 mounted on the chain 43, and a motor 45 driving the drive sprocket 41.

The drive sprocket 41 may be located adjacent to the trailing end portion of the housing 11. The drive sprocket 41 may be rotatably mounted on a bottom wall of the housing 11 through a shaft. The drive sprocket 41 may be rotated by the motor 45. The motor 45 may be a bidirectional motor operating clockwise and counterclockwise, and the drive sprocket 41 may rotate clockwise and counterclockwise by the operation of the motor 45. An output shaft of the motor 45 may be directly fixed to the drive sprocket 41 so that the motor 45 may directly rotate the drive sprocket 41. The motor 45 may be mounted on the bottom wall of the housing 11 through a mounting bracket 45*a*.

The moving mechanism 40 may further include tension pulleys 44*a* and 44*b* guiding the movement of the chain 43 and tensioning the chain 43. The two tension pulleys 44*a* and 44*b* may be additionally mounted on the mounting bracket 45*a*. The two tension pulleys 44*a* and 44*b* may be disposed adjacent to the drive sprocket 41 and the motor 45 in a cavity of the mounting bracket 45*a*. As the tension pulleys 44*a* and 44*b* maintain the tension of the chain 43, the degree of freedom in position of the motor 45 and sizes of the sprockets 41 and 42 may be given.

The driven sprocket 42 may be disposed adjacent to the leading end portion of the housing 11. The driven sprocket 42 may be rotatably mounted on the bottom wall of the housing 11 through a shaft 44 (see FIG. 6).

The chain 43 may engage the drive sprocket 41 and the driven sprocket 42, and wrap the drive sprocket 41 and the driven sprocket 42 so that a movement path of the chain 43 may be defined by the drive sprocket 41 and the driven sprocket 42. The tension pulleys 44*a* and 44*b* may be disposed adjacent to the drive sprocket 41 to thereby guide the movement path of the chain 43 and subject the chain 43 to tension.

The chain attachment 48 may be mounted between chain elements of the chain 43. Referring to FIGS. 9 and 10, when the chain 43 moves, the chain attachment 48 may move in the same direction as a movement direction of the chain 43. The chain attachment 48 may be fixed to the moving body 31 of the hinge mechanism 30 using fasteners, welding, and/or the like. Accordingly, the chain attachment 48 may be connected to the ramp assembly 20 through the moving body 31. As the chain 43 is moved by the motor 45, the moving body 31 and the ramp assembly 20 may move in the same direction as the movement direction of the chain attachment 48.

When the drive sprocket 41 is rotated clockwise by the motor 45, the chain 43 may move according to the clockwise rotation of the drive sprocket 41. As illustrated in FIG. 9, the chain attachment 48 and the moving body 31 may move close to the drive sprocket 41, and accordingly the ramp assembly 20 may be fully stowed in the housing 11.

When the drive sprocket 41 is rotated counterclockwise by the motor 45, the chain 43 may move according to the counterclockwise rotation of the drive sprocket 41. As illustrated in FIG. 10, the chain attachment 48 and the moving body 31 may move close to the driven sprocket 42, and accordingly the ramp assembly 20 may be fully deployed from the housing 11.

The ramp apparatus 10 according to an exemplary embodiment of the present disclosure may include the drive mechanism 60 configured to drive the ramp platforms of the ramp assembly 20 telescopically. Specifically, the drive mechanism 60 may be configured to move the second ramp platform 22 telescopically with respect to the first ramp platform 21, and move the third ramp platform 23 telescopically with respect to the second ramp platform 22.

Referring to FIG. 4, the drive mechanism 60 may be disposed at the central portion of the first ramp platform 21, the central portion of the second ramp platform 22, and the central portion of the third ramp platform 23. The drive mechanism 60 may include a drive sprocket 61, a driven sprocket 62 spaced apart from the drive sprocket 61, a chain 63 connecting the drive sprocket 61 and the driven sprocket 62, and a motor 65 driving the drive sprocket 61.

The drive sprocket 61 and the driven sprocket 62 may be rotatably mounted on the second ramp platform 22, and the drive sprocket 61 and the driven sprocket 62 may be spaced apart from each other in a longitudinal direction of the second ramp platform 22 on the second mounting portion 22*c* of the second ramp platform 22.

Referring to FIG. 5, the drive sprocket 61 may be rotatably mounted on the trailing end portion of the second ramp platform 22. Referring to FIG. 7, the drive sprocket 61 may be located at the central portion of the second ramp platform 22, and the drive sprocket 61 may have a mounting boss 61*a* extending upwardly. The drive sprocket 61 may be located in the cavity of the second mounting portion 22*c* of the second ramp platform 22. The second ramp plate 22*a* of the second ramp platform 22 may have a through hole 22*d*, and the second mounting portion 22*c* of the second ramp platform 22 may have a through hole 22*e* aligned with the through hole 22*d* of the second ramp plate 22*a*. The mounting boss 61*a* may extend through the through hole 22*d* of the second ramp plate 22*a* and the through hole 22*e* of the second mounting portion 22*c*.

Referring to FIG. 6, the driven sprocket 62 may be rotatably mounted on the leading end portion of the second ramp platform 22. Referring to FIG. 8, the driven sprocket 62 may be located at the central portion of the second ramp platform 22, and the driven sprocket 62 may have a shaft 62*a* extending downwardly. The driven sprocket 62 may be located in the cavity of the second mounting portion 22*c* of the second ramp platform 22.

The chain 63 may engage the drive sprocket 61 and the driven sprocket 62, and wrap the drive sprocket 61 and the driven sprocket 62 so that a movement path of the chain 63 may be defined by the drive sprocket 61 and the driven sprocket 62.

Referring to FIGS. 5 and 7, the motor 65 may be mounted on the trailing end portion of the second ramp platform 22 through a mounting bracket 65*a*. The motor 65 may be directly connected to the drive sprocket 61, and a central axis of the motor 65 may be aligned with a central axis of the drive sprocket 61. The motor 65 may be a bidirectional motor operating clockwise and counterclockwise, and the motor 65 may directly rotate the drive sprocket 61 clockwise and counterclockwise.

The drive sprocket 61, the driven sprocket 62, and the chain 63 may be disposed in the cavity of the second mounting portion 22*c* of the second ramp platform 22. As the motor 65 rotates the drive sprocket 61, and the chain 63 moves according to the rotation of the drive sprocket 61, the driven sprocket 62 may be rotated in the same direction as the rotation direction of the drive sprocket 61.

The drive mechanism 60 may move the second ramp platform 22 with respect to the first ramp platform 21 by the rotation of the drive sprocket 61. The drive mechanism 60 may further include a first pinion 71 coupled to the drive sprocket 61, and a first rack gear 72 meshing with the first pinion 71.

Referring to FIG. 5, the first pinion 71 may have a shaft 71*a* extending toward the drive sprocket 61. The shaft 71*a* of the first pinion 71 may be fitted into a hole of the mounting boss 61*a* of the drive sprocket 61 so that the shaft 71*a* of the first pinion 71 may be coupled to the mounting boss 61*a* of the drive sprocket 61. As the drive sprocket 61 rotates clockwise or counterclockwise, the first pinion 71 may rotate in the same direction as the rotation direction of the drive sprocket 61. Referring to FIG. 7, the first pinion 71 may be rotatably received in the cavity of the first mounting portion 21*c* of the first ramp platform 21.

The first rack gear 72 may be fixed to the first mounting portion 21*c* of the first ramp platform 21, and the first rack gear 72 may extend along the central longitudinal axis of the first ramp platform 21. Referring to FIG. 7, the first mounting portion 21*c* of the first ramp platform 21 may have a groove 21*f* into which the first rack gear 72 is fitted.

The first ramp platform 21 may be connected to the hinge mechanism 30, the first pinion 71 may be coupled to the drive sprocket 61, the first rack gear 72 may be fixed to the first ramp platform 21, and the first pinion 71 may mesh with the first rack gear 72. Since the first ramp platform 21 is connected to the hinge mechanism 30, the first ramp platform 21 cannot move relative to the second ramp platform 22. In this state, as the drive sprocket 61 rotates, the first pinion 71 may rotate in the same direction as the rotation direction of the drive sprocket 61 so that the first pinion 71 may move along a longitudinal direction of the first rack gear 72. As the first pinion 71 moves along the longitudinal direction of the first rack gear 72, the second ramp platform 22 may move relative to the first ramp platform 21. Accordingly, the second ramp platform 22 may be extended out from the cavity of the first ramp platform 21 or be stowed in the cavity of the first ramp platform 21.

The drive mechanism 60 may move the third ramp platform 23 with respect to the second ramp platform 22 by the rotation of the driven sprocket 62. The drive mechanism 60 may further include a second pinion 73 coupled to the driven sprocket 62, and a second rack gear 74 meshing with the second pinion 73.

Referring to FIG. 6, the second pinion 73 may have a mounting boss 73*a* extending toward the driven sprocket 62. The shaft 62*a* of the driven sprocket 62 may be fitted into a hole of the mounting boss 73*a* of the second pinion 73 so that the shaft 62*a* of the driven sprocket 62 may be coupled to the mounting boss 73*a* of the second pinion 73. As the driven sprocket 62 is rotated clockwise or counterclockwise, the second pinion 73 may rotate in the same direction as the rotation direction of the driven sprocket 62. Referring to FIG. 8, the second pinion 73 may be rotatably received in the cavity of the third mounting portion 23*c* of the third ramp platform 23.

Referring to FIG. 8, the third ramp plate 23*a* of the third ramp platform 23 may have a through hole 23*d*, and the third mounting portion 23*c* of the third ramp platform 23 may have a through hole 23*e* aligned with the through hole 23*d* of the third ramp plate 23*a*. The mounting boss 73*a* of the second pinion 73 may extend through the through hole 23*d* of the third ramp plate 23*a* and the through hole 23*e* of the third mounting portion 23*c*.

The second rack gear 74 may be fixed to the third mounting portion 23*c* of the third ramp platform 23, and the second rack gear 74 may extend along the central longitudinal axis of the third ramp platform 23. Referring to FIG. 8, the third mounting portion 23*c* of the third ramp platform 23 may have a groove 23*f* into which the second rack gear 74 is fitted.

The second pinion 73 may be rotatably mounted on the leading end portion of the second ramp platform 22, the second pinion 73 may be coupled to the driven sprocket 62, the second rack gear 74 may be fixed to the third ramp platform 23, and the second pinion 73 may mesh with the second rack gear 74. As the driven sprocket 62 is rotated, the second pinion 73 may rotate in the same direction as the rotation direction of the driven sprocket 62 so that the second rack gear 74 may move along the longitudinal direction of the second ramp platform 22 by the rotation of the second pinion 73. As the second rack gear 74 moves along the longitudinal direction of the second ramp platform 22, the third ramp platform 23 may move relative to the second ramp platform 22. Accordingly, the third ramp platform 23 may be extended out from the cavity of the second ramp platform 22 or be stowed in the cavity of the second ramp platform 22.

Referring to FIG. 23, the upper guide portion 211 of each first side rail 21*b* may protrude upwardly from the first ramp plate 21*a* by a predetermined height h1, the upper guide portion 221 of each second side rail 22*b* may protrude upwardly from the second ramp plate 22*a* by a predetermined height h2, and the upper guide portion 231 of each third side rail 23*b* may protrude upwardly form the third ramp plate 23*a* by a predetermined height h3. In a state in which the first ramp platform 21, the second ramp platform 22, and the third ramp platform 23 are fully extended, when a wheelchair moves along the first ramp platform 21, the second ramp platform 22, and the third ramp platform 23 fully extended out from the housing 11, the upper guide portion 211 of each first side rail 21*b*, the upper guide portion 221 of each second side rail 22*b*, and the upper guide portion 231 of each third side rail 23*b* may prevent the wheelchair from falling.

Figure 24:
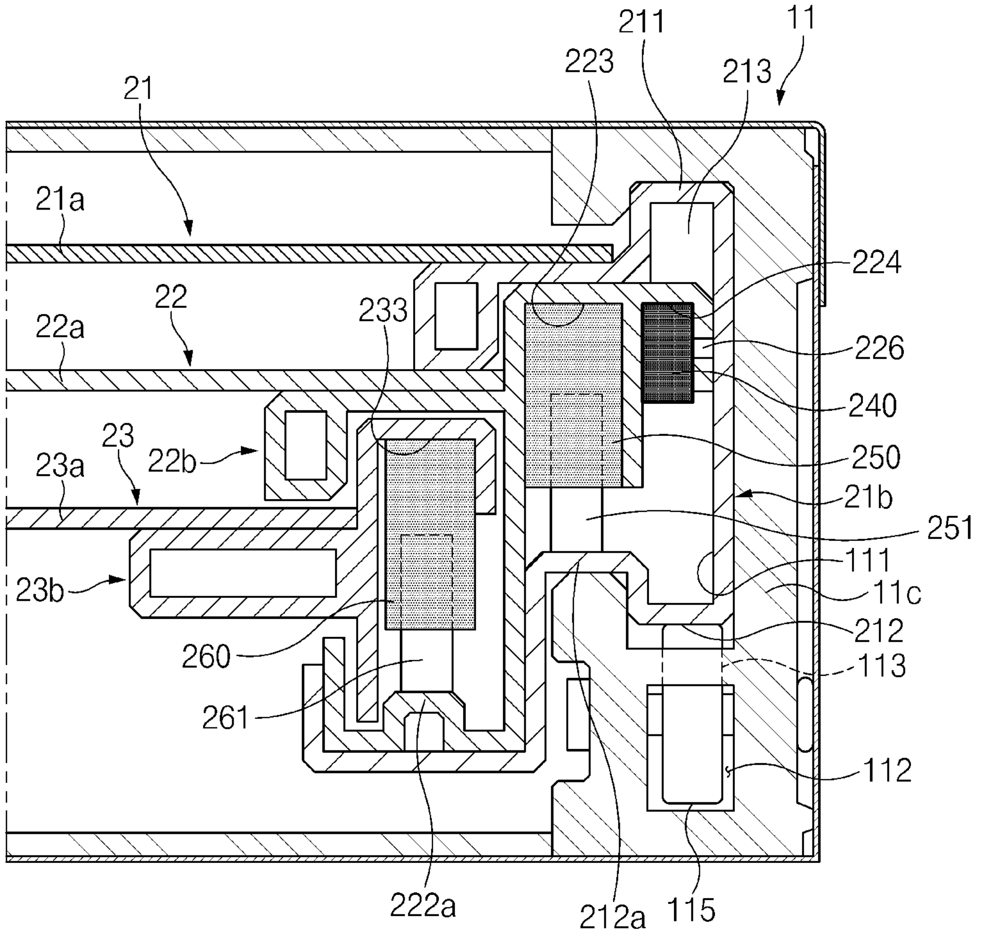
FIG. 24 illustrates a cross-sectional view of the side of a ramp assembly in a ramp apparatus for a vehicle according to an exemplary embodiment of the present disclosure.
Figure 25:
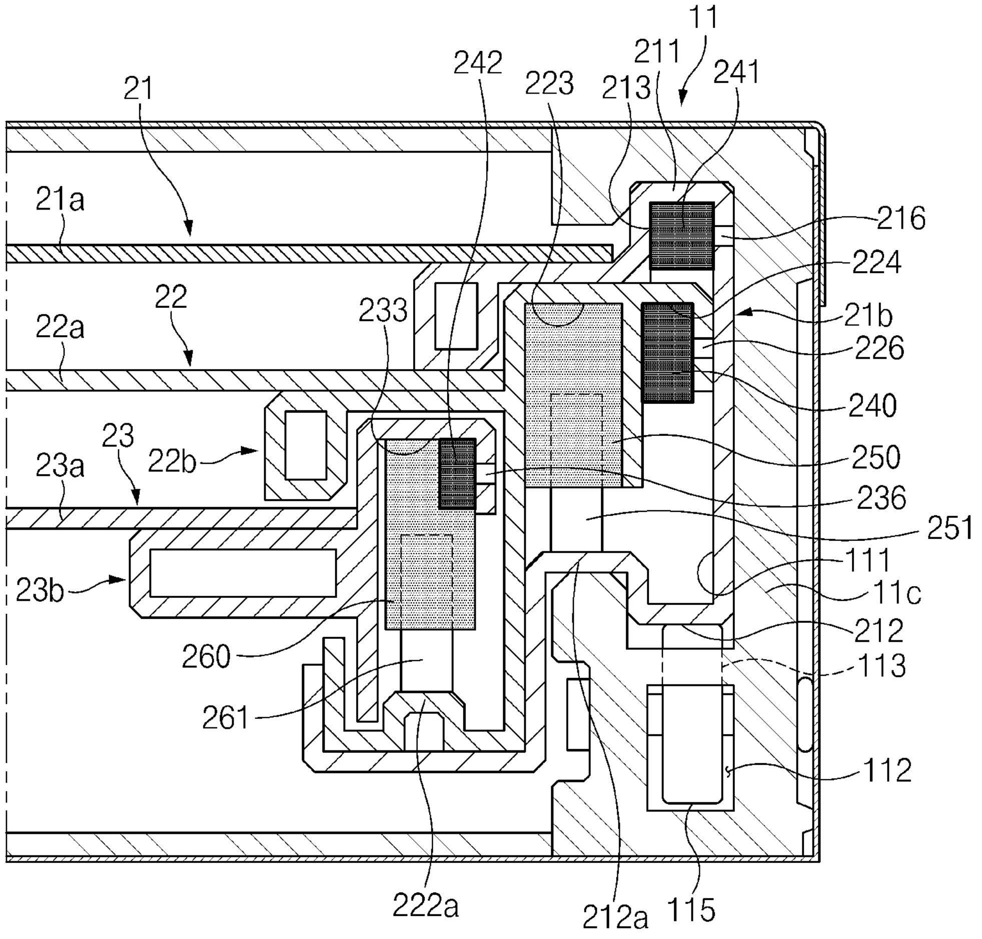
FIG. 25 illustrates a cross-sectional view of the side of a ramp assembly in a ramp apparatus for a vehicle according to another exemplary embodiment of the present disclosure.

Referring to FIGS. 24 and 25, the ramp apparatus 10 according to an exemplary embodiment of the present disclosure may further include an upper roller mechanism 250 mounted on the second ramp platform 22, and a lower roller mechanism 260 mounted on the third ramp platform 23.

The upper roller mechanism 250 may be fixedly mounted in the inner cavity 223 of each second side rail 22*b* of the second ramp platform 22. The upper roller mechanism 250 may include an upper roller case, and at least one roller 251 rotatably mounted in the upper roller case. The roller 251 of the upper roller mechanism 250 may be in rolling contact with the contact portion 212*a* of each first side rail 21*b* of the first ramp platform 21. Accordingly, each second side rail 22*b* of the second ramp platform 22 may slide along the corresponding first side rail 21*b* of the first ramp platform 21 through the upper roller mechanism 250.

The lower roller mechanism 260 may be fixedly mounted in the cavity 233 of each third side rail 23*b* of the third ramp platform 23. The lower roller mechanism 260 may include a lower roller case, and at least one roller 266 rotatably mounted in the lower roller case. The roller 266 of the lower roller mechanism 260 may be in rolling contact with the contact portion 222*a* of each second side rail 22*b* of the second ramp platform 22. Accordingly, each third side rail 23*b* of the third ramp platform 23 may slide along the corresponding second side rail 22*b* of the second ramp platform 22 through the lower roller mechanism 260.

Referring to FIG. 24, the ramp apparatus 10 according to an exemplary embodiment of the present disclosure may further include a linear light indicator 240 mounted on each second side rail 22*b* of the second ramp platform 22, and the linear light indicator 240 may produce light. The linear light indicator 240 may extend along the length of each second side rail 22*b* of the second ramp platform 22. The linear light indicator 240 may be fixedly mounted in the outer cavity 224 of each second side rail 22*b*. Each second side rail 22*b* of the second ramp platform 22 may have a through hole 226 communicating with the outer cavity 224. The light may be transmitted from the linear light indicator 240 to the outside through the through hole 226, thereby easily indicating that the second ramp platform 22 is extended out from the first ramp platform 21. According to an exemplary embodiment, the linear light indicator 240 may include a light source such as LED, and a light guide guiding light of the light source. The light guide may extend along a longitudinal direction of the second side rail 22*b*. According to another exemplary embodiment, the linear light indicator 240 may include a plurality of light sources spaced apart from each other along the longitudinal direction of the second side rail 22*b*, and each light source may be LED or the like.

Referring to FIG. 25, the ramp apparatus 10 according to an exemplary embodiment of the present disclosure may further include a linear light indicator 241 mounted on each first side rail 21*b* of the first ramp platform 21, and the linear light indicator 241 may produce light. The linear light indicator 241 may extend along the length of each first side rail 21*b* of the first ramp platform 21. The linear light indicator 241 may be fixedly mounted in the cavity 213 of each first side rail 21*b*, and the linear light indicator 241 may be located below the upper guide portion 211 of each first side rail 21*b*. Each first side rail 21*b* of the first ramp platform 21 may have a through hole 216 communicating with the cavity 213. The light may be transmitted from the linear light indicator 241 to the outside through the through hole 216, thereby easily indicating that the first ramp platform 21 is deployed from the housing 11. According to an exemplary embodiment, the linear light indicator 241 may include a light source such as LED, and a light guide guiding light of the light source. The light guide may extend along a longitudinal direction of the first side rail 21*b*. According to another exemplary embodiment, the linear light indicator 241 may include a plurality of light sources spaced apart from each other along the longitudinal direction of the first side rail 21*b*, and each light source may be LED or the like.

Referring to FIG. 25, the ramp apparatus 10 according to an exemplary embodiment of the present disclosure may further include a linear light indicator 242 mounted on each third side rail 23*b* of the third ramp platform 23, and the linear light indicator 242 may produce light. The linear light indicator 242 may extend along the length of each third side rail 23*b* of the third ramp platform 23. The linear light indicator 242 may be fixedly mounted in the cavity 233 of each third side rail 23*b*, and the linear light indicator 242 together with the lower roller mechanism 260 may be disposed in the cavity 233 of the third side rail 23*b*. Each third side rail 23*b* of the third ramp platform 23 may have a through hole 236 communicating with the cavity 233. The light may be transmitted from the linear light indicator 242 to the outside through the through hole 236, thereby easily indicating that the third ramp platform 23 is extended out from the second ramp platform 22. According to an exemplary embodiment, the linear light indicator 242 may include a light source such as LED, and a light guide guiding light of the light source. The light guide may extend along a longitudinal direction of the third side rail 23*b*. According to another exemplary embodiment, the linear light indicator 242 may include a plurality of light sources spaced apart from each other along the longitudinal direction of the third side rail 23*b*, and each light source may be LED or the like.

When the first ramp platform 21, the second ramp platform 22, and the third ramp platform 23 are extended out from the housing 11, a height difference between the first ramp platform 21 and the second ramp platform 22 and a height difference between the second ramp platform 22 and the third ramp platform 23 may allow a foreign object/substance such as dust and moisture to enter the gap between the first ramp platform 21 and the second ramp platform 22 and the gap between the second ramp platform 22 and the third ramp platform 23, which may cause a failure of the ramp assembly 20.

Figure 26:
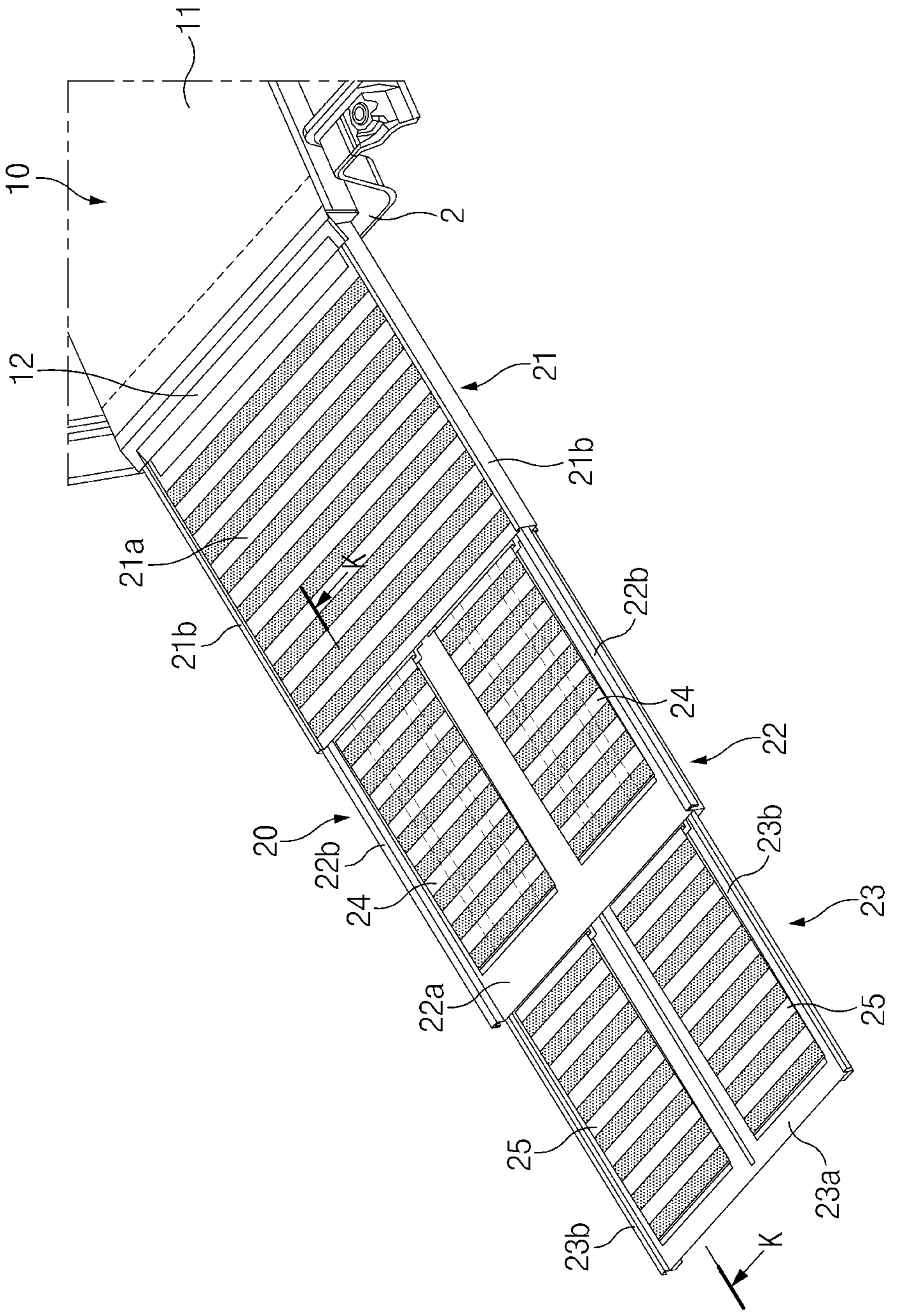
FIG. 26 illustrates a state in which an upper sub-platform is mounted on a second ramp platform, and a lower sub-platform is mounted on a third ramp platform in a ramp apparatus for a vehicle according to exemplary embodiments of the present disclosure.
Figure 27:
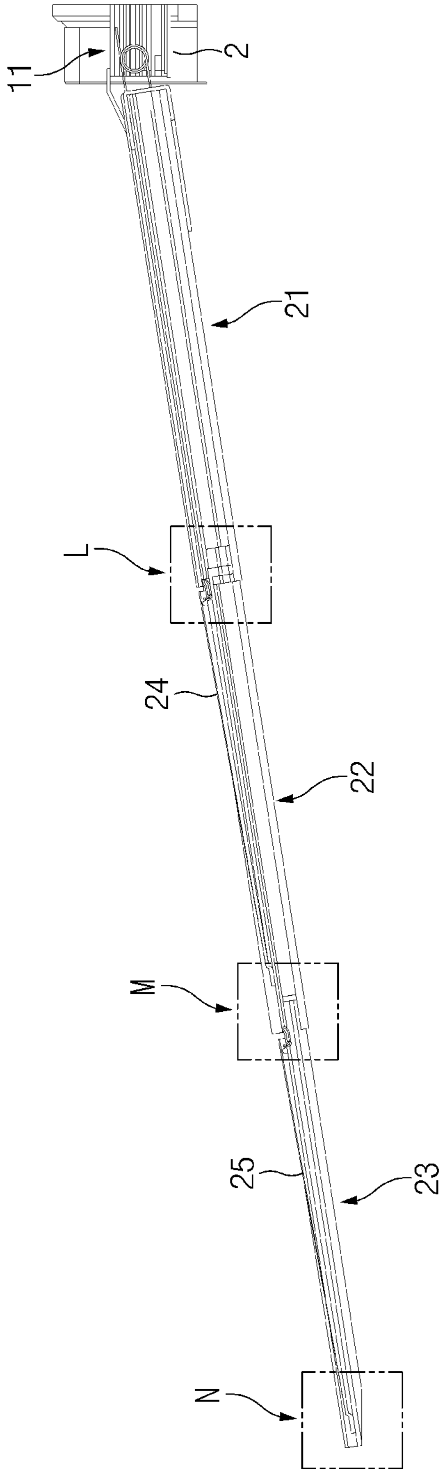
FIG. 27 illustrates a cross-sectional view, taken along line K-K of FIG. 26.

Referring to FIGS. 26 and 27, the ramp apparatus 10 for a vehicle according to an exemplary embodiment of the present disclosure may include an upper sub-platform 24 pivotally mounted between the first ramp platform 21 and the second ramp platform 22.

Referring to FIG. 26, two upper sub-platforms 24 may be disposed on the top surface of the second ramp plate 22*a* of the second ramp platform 22. Each upper sub-platform 24 may be pivotally mounted on the top surface of the second ramp plate 22*a* of the second ramp platform 22. When the second ramp platform 22 moves, the upper sub-platform 24 may be movably connected to the first ramp platform 21 through an upper link assembly 26. The upper link assembly 26 may be connected between the first ramp platform 21 and the upper sub-platform 24.

Referring to FIGS. 32 to 35, the upper sub-platform 24 may include an upper sub-plate 24*a*, and a pair of side walls 24*b* provided on both side edges of the upper sub-plate 24*a*. The upper sub-plate 24*a* may have a leading end portion corresponding to the leading end portion of the second ramp platform 22 and a trailing end portion corresponding to the trailing end portion of the second ramp platform 22. A bent portion 24*c* may be provided on the leading end portion of the upper sub-plate 24*a*. The bent portion 24*c* may extend downwardly from the leading end portion of the upper sub-plate 24*a*, and a support edge 24*d* may extend flat from the bent portion 24*c*. A length of the support edge 24*d* may be less than a length of the upper sub-plate 24*a*. The support edge 24*d* may be offset with respect to the upper sub-plate 24*a* through the bent portion 24*c* by a predetermined distance, and a flat surface of the support edge 24*d* may be substantially parallel to a flat surface of the upper sub-plate 24*a*.

Figure 29:
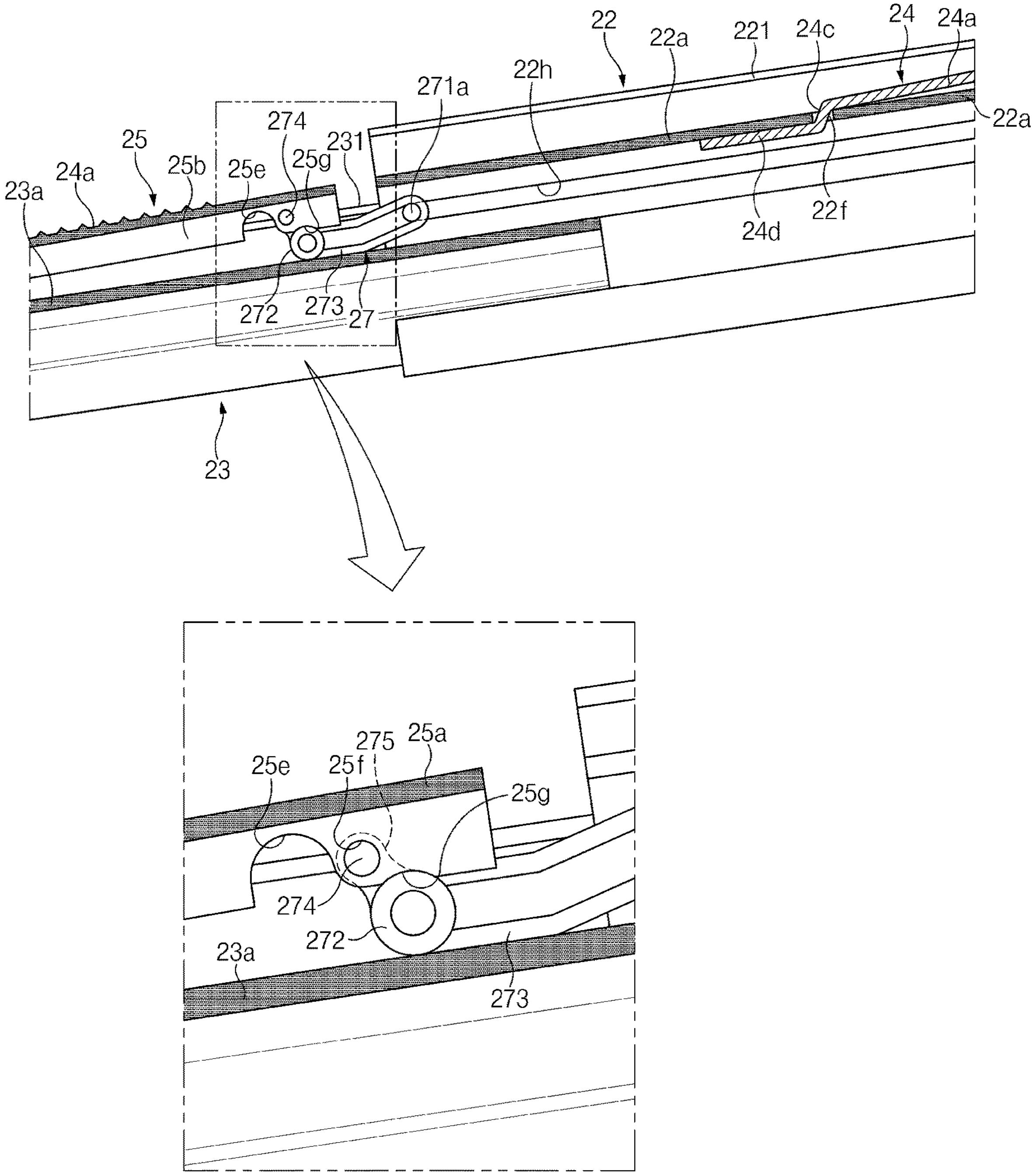
FIG. 29 illustrates an enlarged view of portion M of FIG. 27.

Referring to FIG. 29, the second ramp platform 22 may have a mounting hole 22*f* provided in the leading end portion of the second ramp plate 22*a*. The upper sub-plate 24*a* of the upper sub-platform 24 may be located above the second ramp plate 22*a*, the bent portion 24*c* of the upper sub-platform 24 may be received in the mounting hole 22*f* of the second ramp plate 22*a*, and the support edge 24*d* of the upper sub-platform 24 may be located below the second ramp plate 22*a*. Accordingly, the upper sub-platform 24 may be configured to pivot upwardly and downwardly on the bent portion 24*c*.

Figure 32:
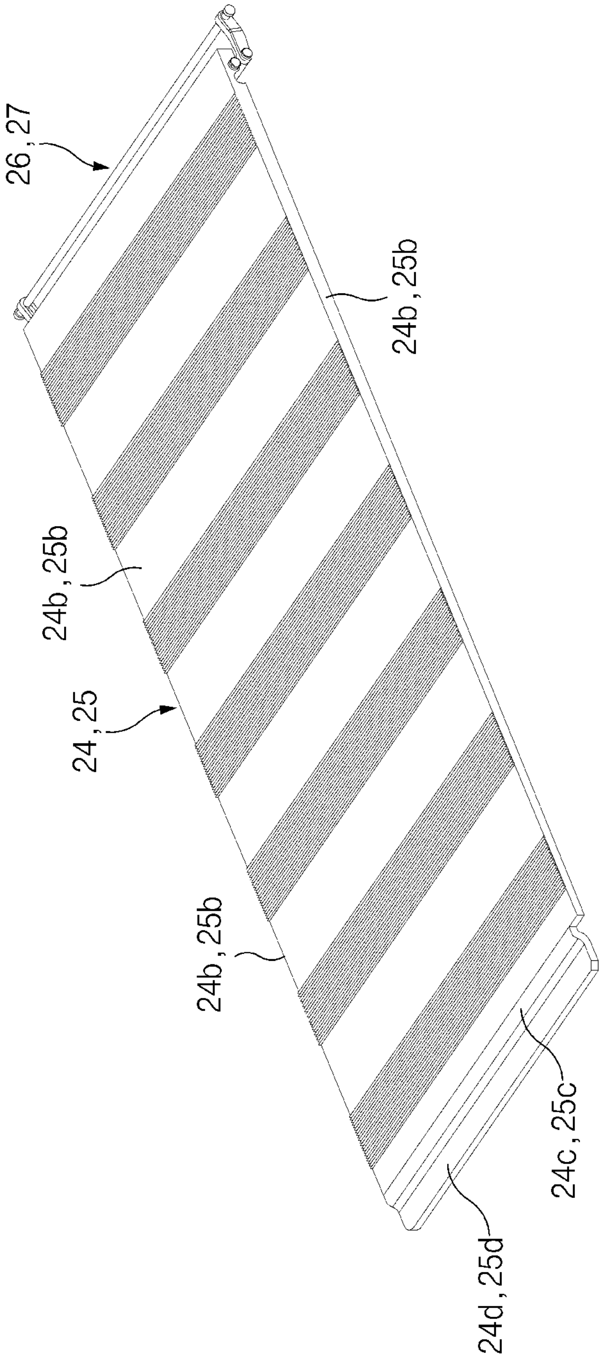
FIG. 32 illustrates a top perspective view of an upper link assembly mounted on an upper sub-platform and a lower link assembly mounted on a lower sub-platform in a ramp apparatus for a vehicle according to exemplary embodiments of the present disclosure.
Figure 33:
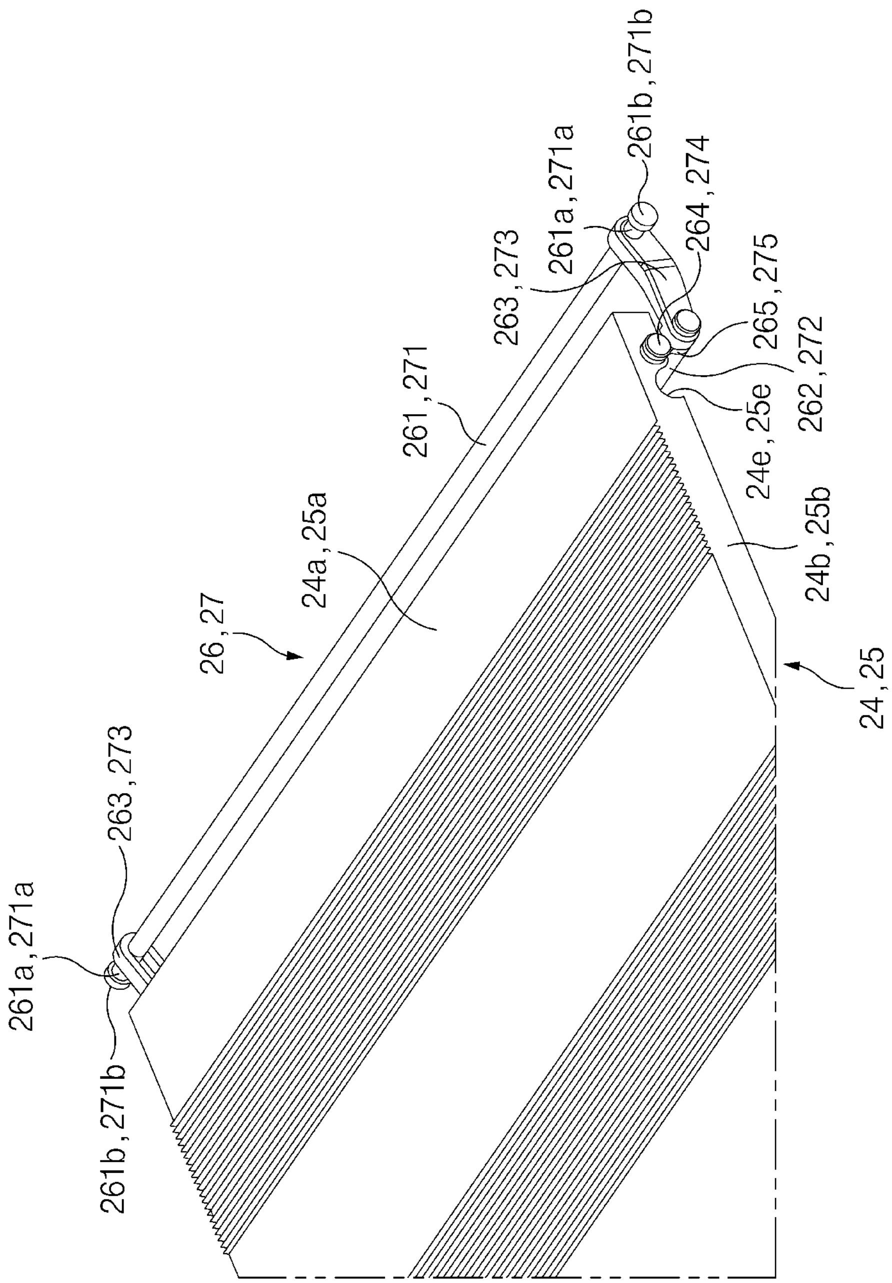
FIG. 33 illustrates an enlarged view of a trailing end portion of the upper sub-platform and a trailing end portion of the lower sub-platform illustrated in FIG. 32.
Figure 34:
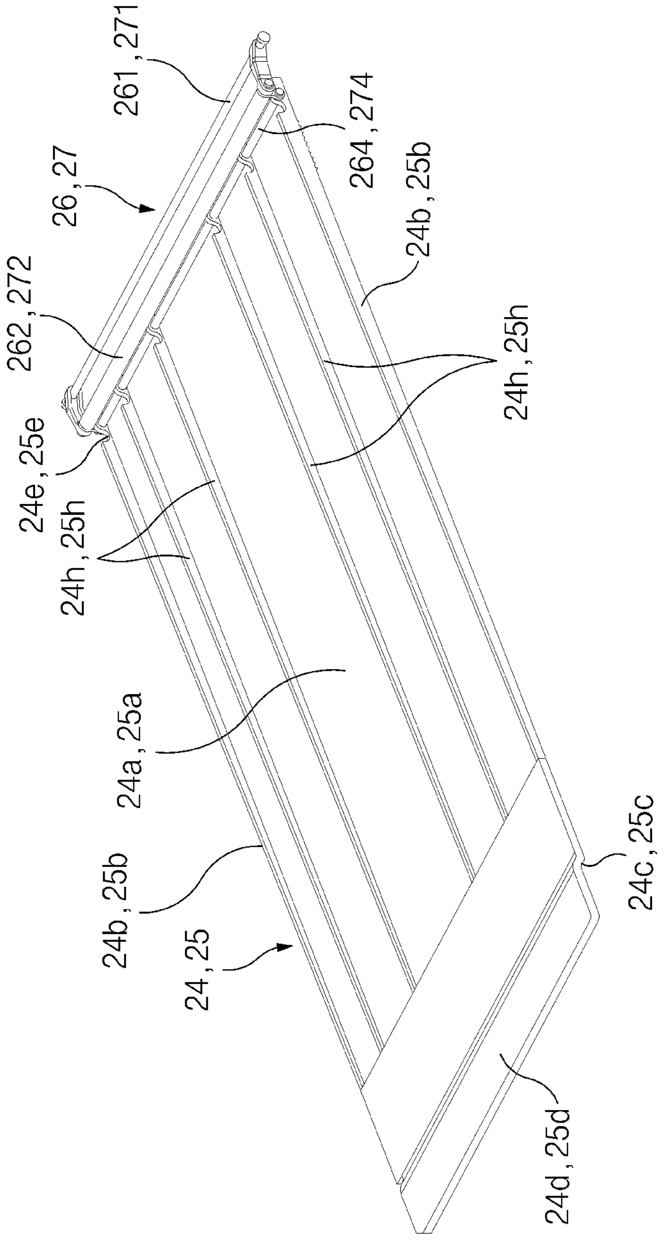
FIG. 34 illustrates a bottom perspective view of an upper link assembly mounted on an upper sub-platform and a lower link assembly mounted on a lower sub-platform in a ramp apparatus for a vehicle according to exemplary embodiments of the present disclosure.
Figure 35:
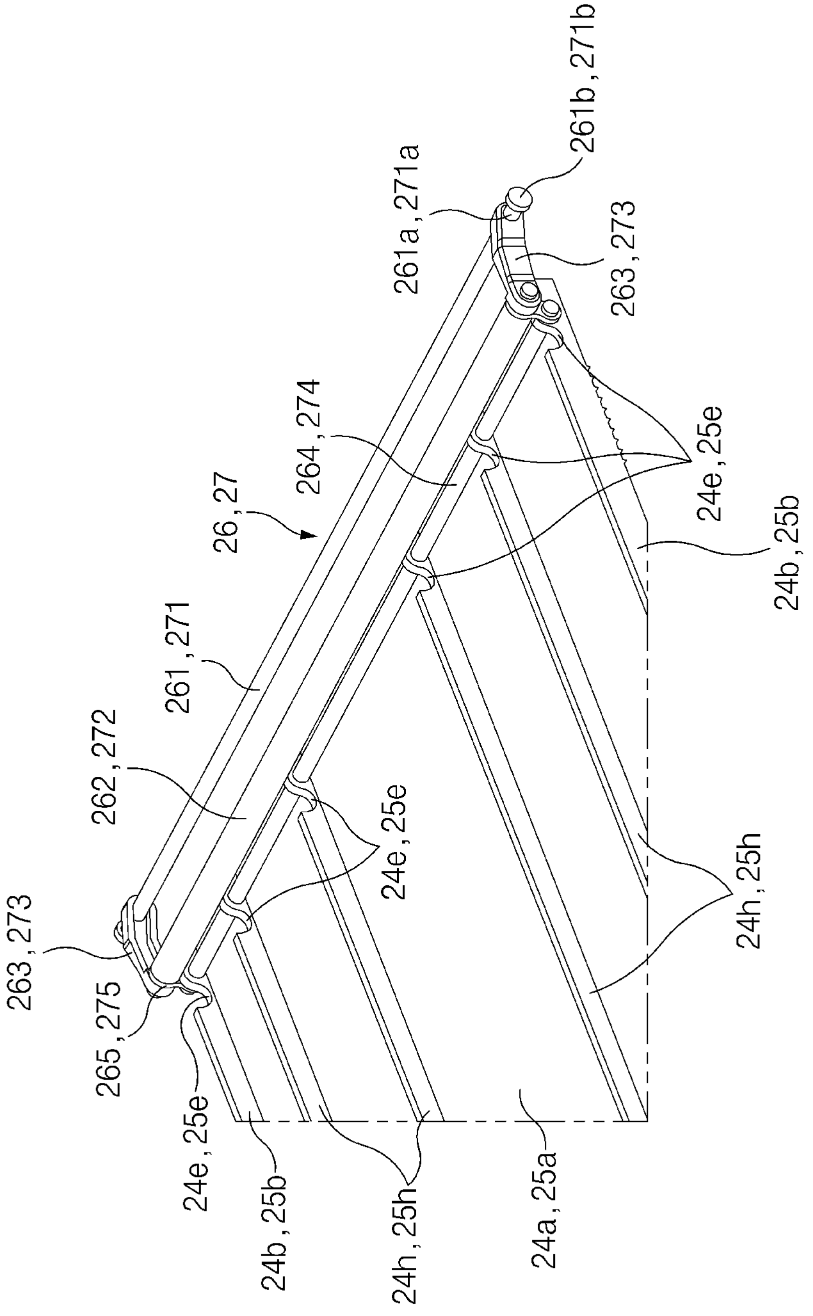
FIG. 35 illustrates an enlarged view of a trailing end portion of the upper sub-platform and a trailing end portion of the lower sub-platform illustrated in FIG. 34.

Referring to FIGS. 32 and 34, the side walls 24*b* may extend vertically from both side edges of the upper sub-plate 24*a*, respectively, and accordingly the upper sub-platform 24 may have a cavity defined by the upper sub-plate 24*a* and the pair of side walls 24*b*. A height of each side wall 24*b* may be gradually reduced from the trailing end portion of the upper sub-plate 24*a* to the leading end portion of the upper sub-plate 24*a*. Specifically, each side wall 24*b* may be triangular, and accordingly the upper sub-plate 24*a* may be inclined with respect to the second ramp plate 22*a* at a predetermined angle. Referring to FIGS. 34 and 35, the upper sub-plate 24*a* may have a plurality of reinforcing ribs 24*h* provided on a bottom surface thereof, and the plurality of reinforcing ribs 24*h* may be located between the pair of side walls 24*b*. Stiffness of the upper sub-plate 24*a* may be improved by the plurality of reinforcing ribs 24*h*.

Figure 28:
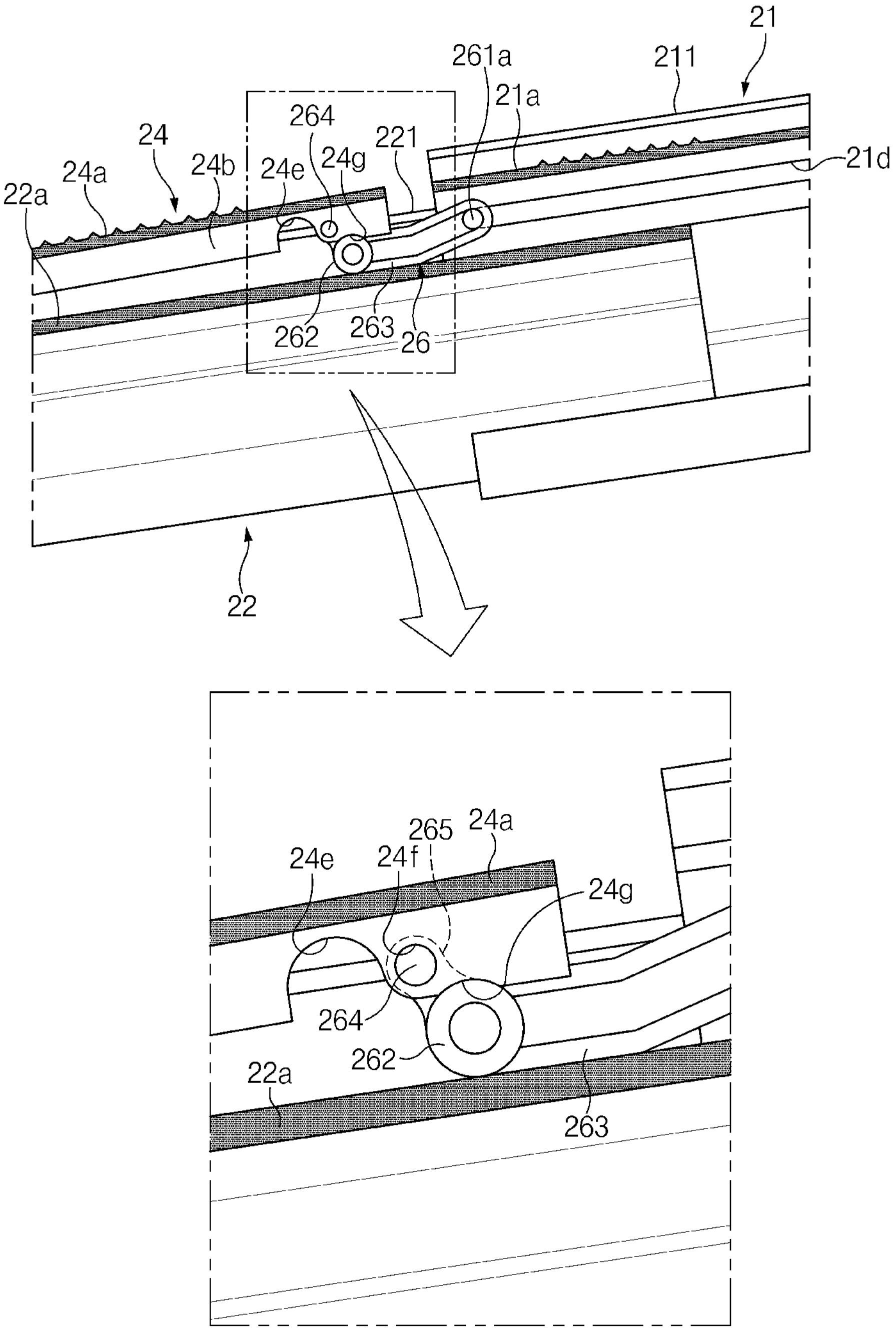
FIG. 28 illustrates an enlarged view of portion L of FIG. 27.
Figure 42:
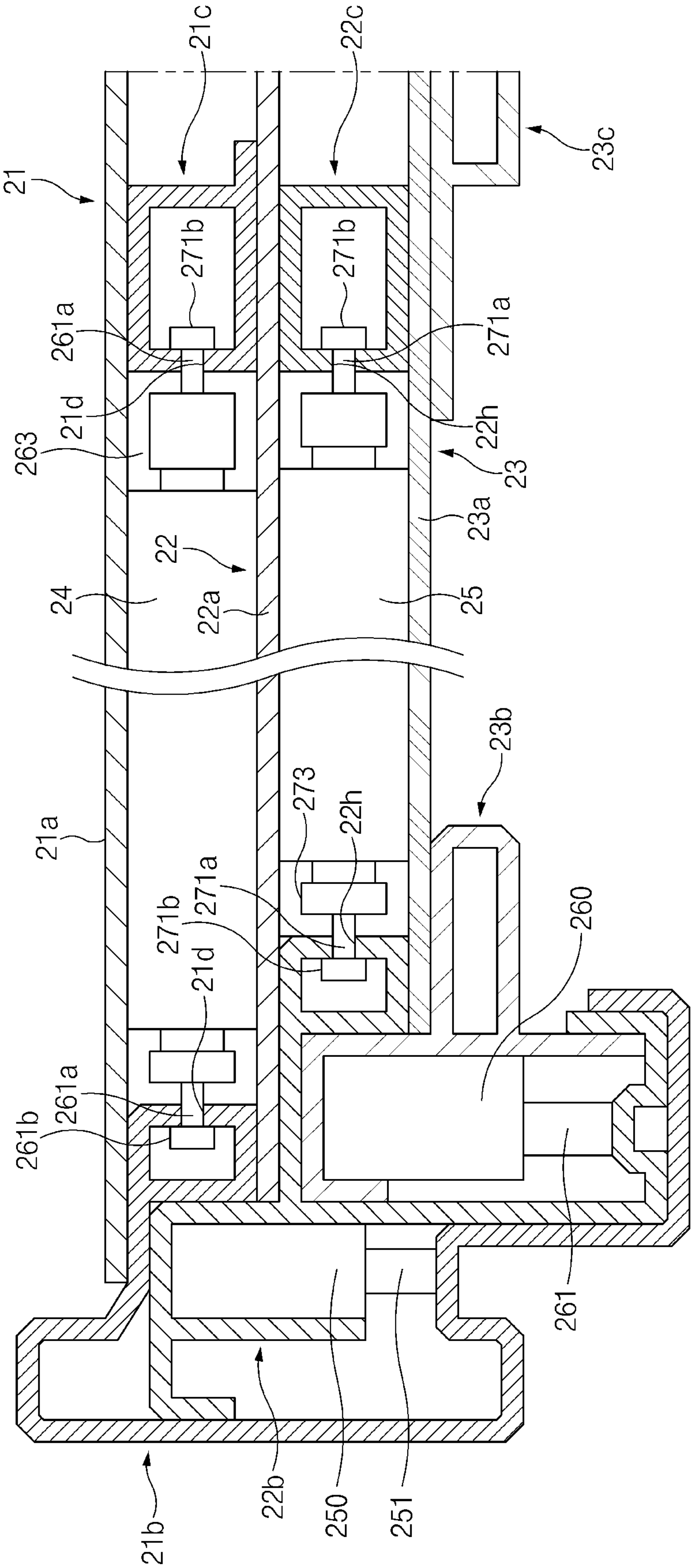
FIG. 42 illustrates a transverse cross-sectional view of a ramp assembly in a ramp apparatus for a vehicle according to exemplary embodiments of the present disclosure.

Referring to FIG. 42, the first ramp platform 21 may have a plurality of guide slots 21*d* formed in the first side rails 21*b* and the first mounting portion 21*c*. Each guide slot 21*d* may extend along a longitudinal direction of the first ramp platform 21. Referring to FIG. 28, the upper link assembly 26 may be configured to move along the guide slots 21*d* of the first ramp platform 21. The guide slot 21*d* may have a leading end portion corresponding to the leading end portion of the first ramp platform 21 and a trailing end portion corresponding to the trailing end portion of the first ramp platform 21.

When the second ramp platform 22 moves with respect to the first ramp platform 21, the upper sub-platform 24 may move in the same direction as the movement direction of the second ramp platform 22, and the upper sub-platform 24 may pivot with respect to the second ramp platform 22 through the bent portion 24*c* and the upper link assembly 26. Specifically, when the second ramp platform 22 is extended out from the first ramp platform 21, the upper sub-platform 24 may move in the same direction as the movement direction of the second ramp platform 22 so that the upper sub-platform 24 may be extended out from the first ramp platform 21. The upper link assembly 26 may move along the guide slots 21*d* of the first ramp platform 21, and the upper sub-platform 24 may pivot upwardly toward the first ramp plate 21*a* of the first ramp platform 21 by the bent portion 24*c* and the upper link assembly 26 so that an angle of inclination of the upper sub-plate 24*a* of the upper sub-platform 24 may be equal to an angle of inclination of the first ramp plate 21*a*, and the upper sub-platform 24 may be aligned with the first ramp plate 21*a* of the first ramp platform 21. Accordingly, the upper sub-platform 24 may remove a height difference between the first ramp plate 21*a* of the first ramp platform 21 and the second ramp plate 22*a* of the second ramp platform 22.

When the second ramp platform 22 is stowed in the cavity of the first ramp platform 21, the upper sub-platform 24 may pivot downwardly toward the second ramp platform 22 and move in the same direction as the movement direction of the second ramp platform 22, and accordingly the upper sub-platform 24 together with the second ramp platform 22 may be stowed in the cavity of the first ramp platform 21. The upper link assembly 26 may move along the guide slots 21*d* of the first ramp platform 21, and the upper sub-platform 24 may be located between the first ramp plate 21*a* of the first ramp platform 21 and the second ramp plate 22*a* of the second ramp platform 22.

Figure 36:
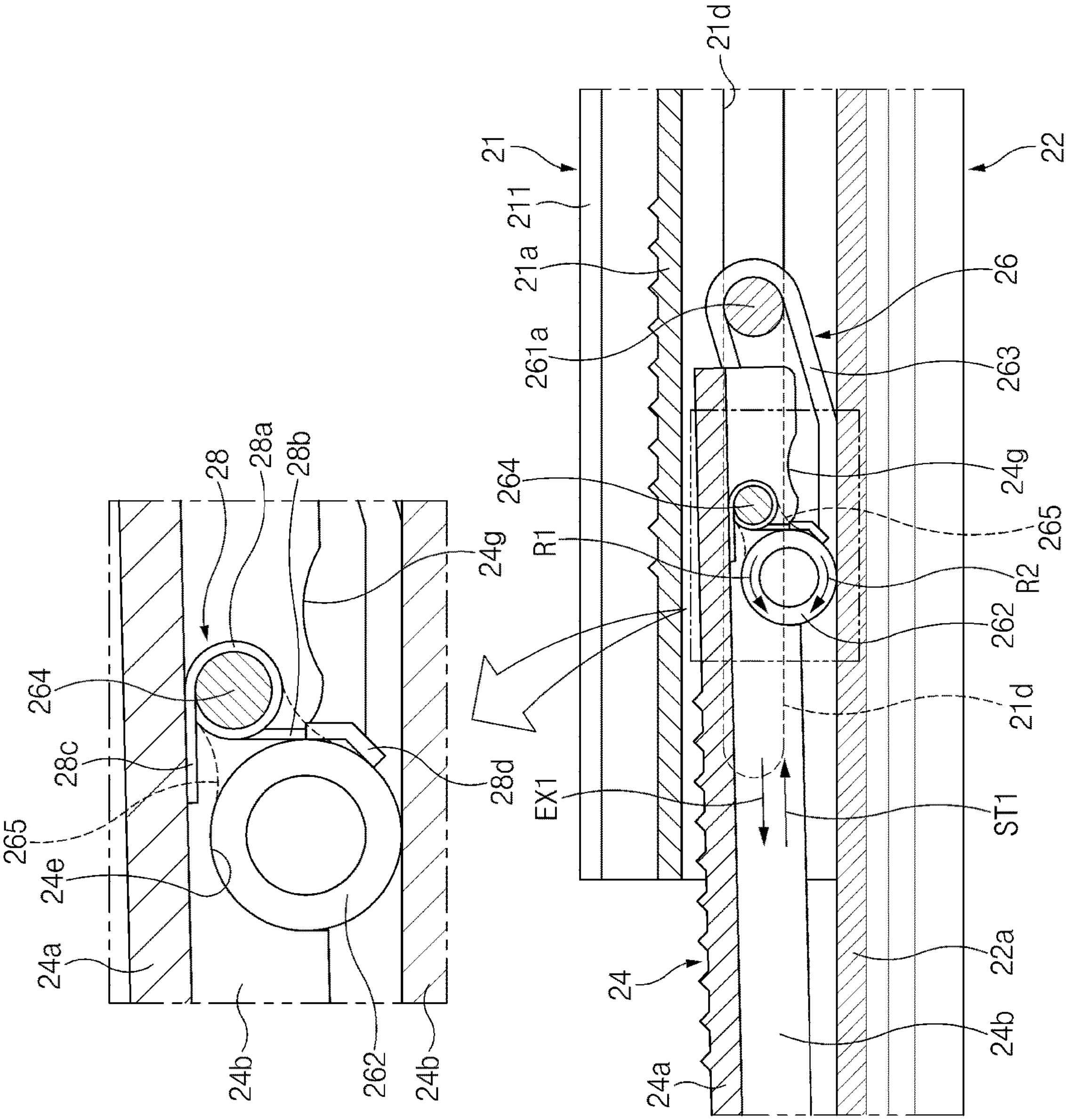
FIG. 36 illustrates a state in which a trailing end portion of an upper sub-platform is located in a cavity of a first ramp platform in a ramp apparatus for a vehicle according to exemplary embodiments of the present disclosure.
Figure 37:
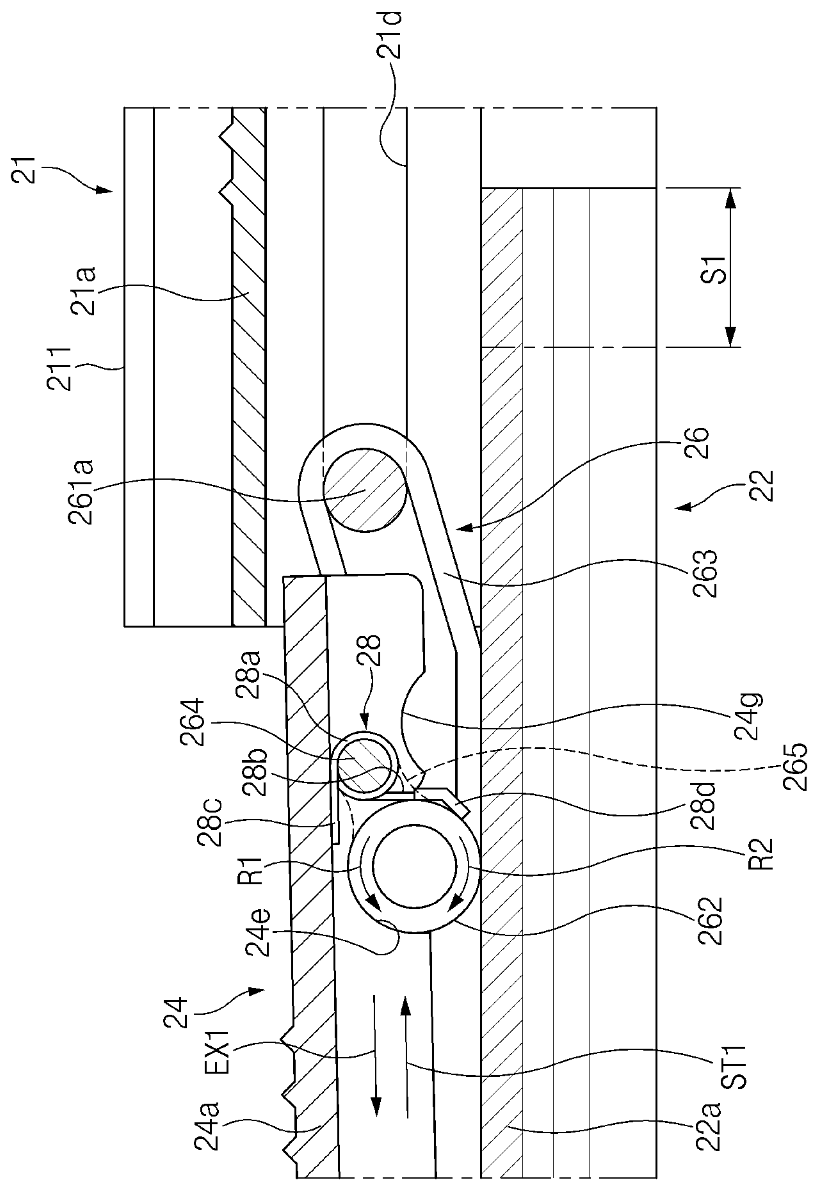
FIG. 37 illustrates a state in which a trailing end portion of an upper sub-platform is close to a leading end portion of a first ramp platform in a ramp apparatus for a vehicle according to exemplary embodiments of the present disclosure.
Figure 38:
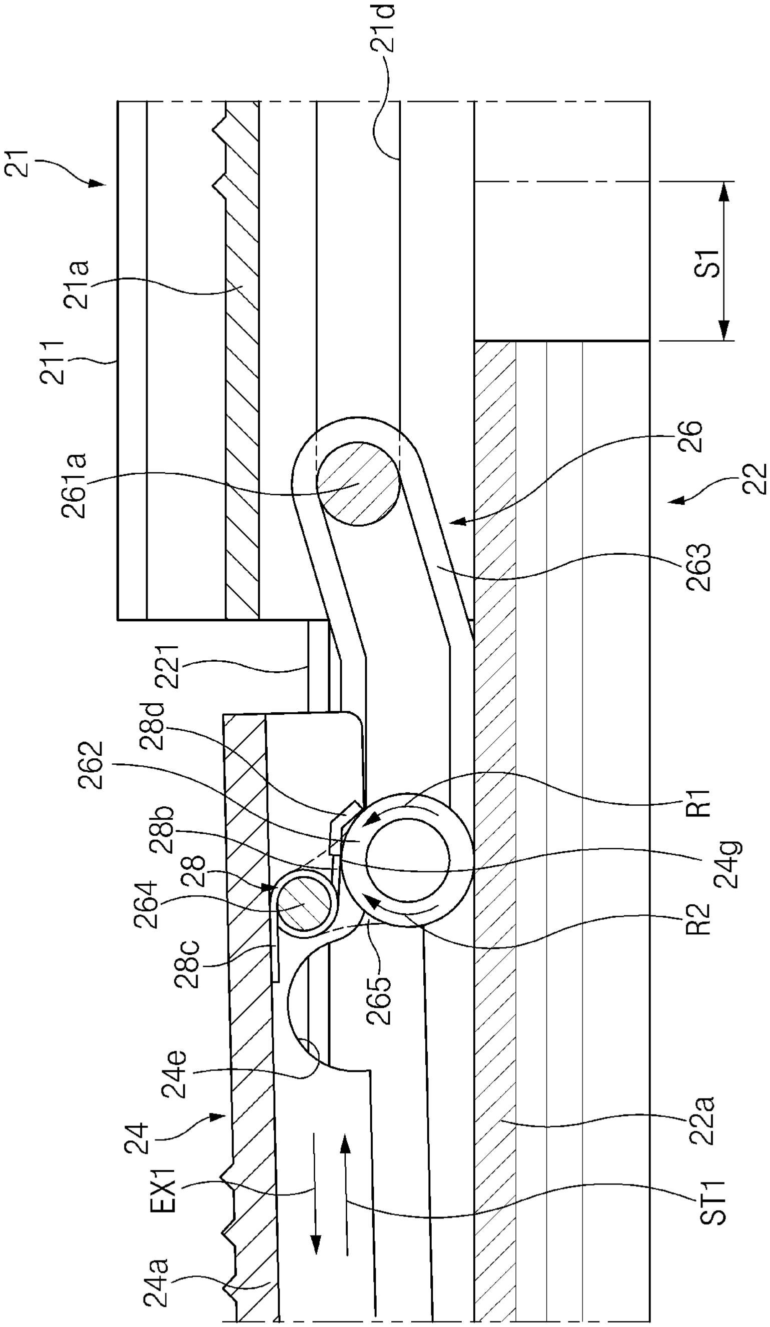
FIG. 38 illustrates a state in which an upper sub-platform is extended out from a first ramp platform and the upper sub-platform is in an inclined position in a ramp apparatus for a vehicle according to exemplary embodiments of the present disclosure.

Referring to FIGS. 36 to 38, the upper sub-platform 24 may pivot upwardly and downwardly on the bent portion 24*c* with respect to the second ramp plate 22*a* of the second ramp platform 22 by the upper link assembly 26 so that the upper sub-platform 24 may pivot between an inclined position and a parallel position. The inclined position refers to a position in which the upper sub-platform 24 is inclined with respect to the second ramp plate 22*a* of the second ramp platform 22 at a predetermined angle so that the upper sub-platform 24 may be aligned with the first ramp plate 21*a* of the first ramp platform 21. The parallel position refers to a position in which the upper sub-platform 24 is substantially parallel to the second ramp plate 22*a* of the second ramp platform 22.

Figure 31:
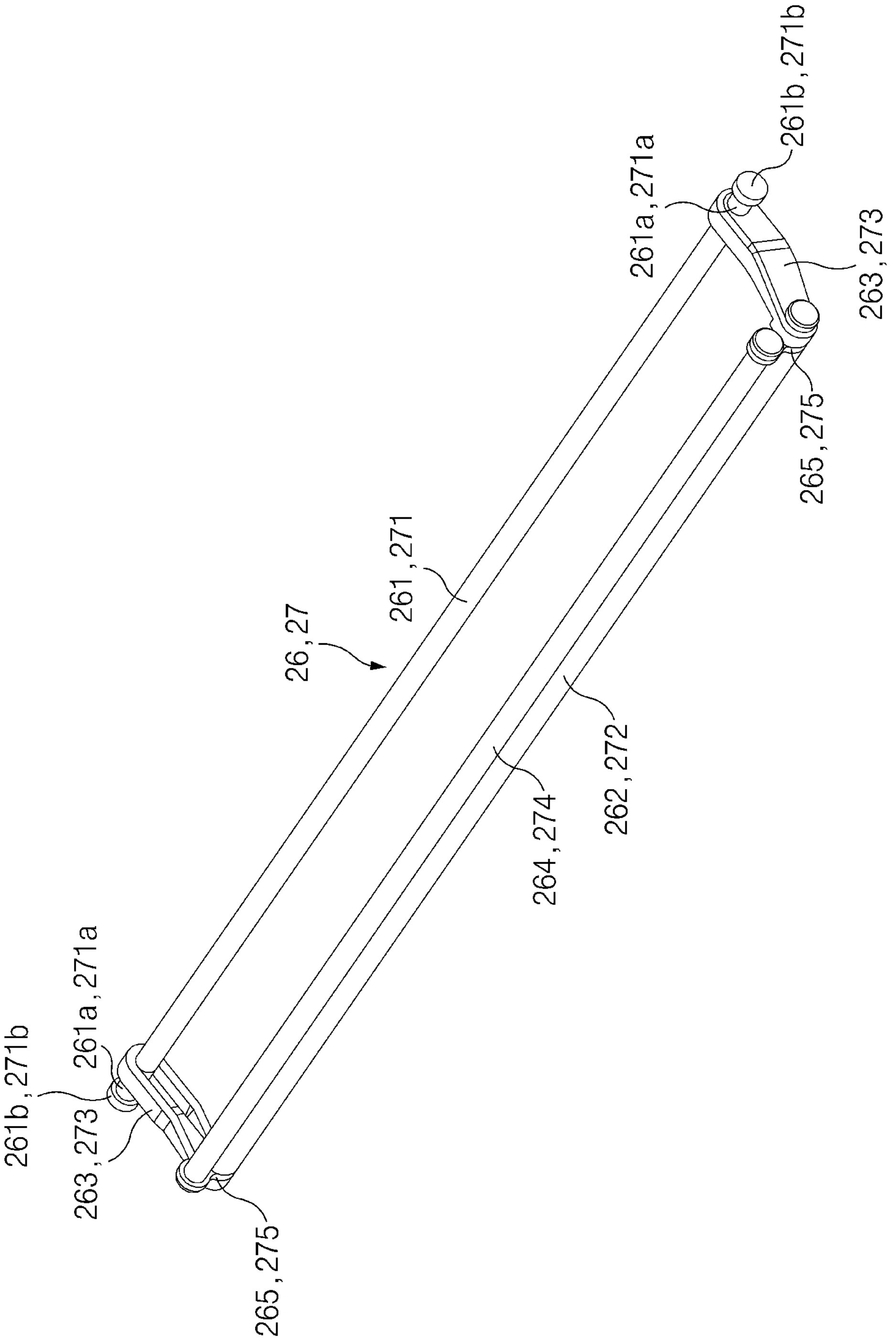
FIG. 31 illustrates a perspective view of an upper link assembly and a lower link assembly in a ramp apparatus for a vehicle according to exemplary embodiments of the present disclosure.

Referring to FIG. 31, the upper link assembly 26 may include a guide shaft 261, a rolling shaft 262 parallel to the guide shaft 261, a pair of main links 263 connecting the guide shaft 261 and the rolling shaft 262, a sub-shaft 264 parallel to the rolling shaft 262, and a pair of sub-links 265 connecting the rolling shaft 262 and the sub-shaft 264.

The guide shaft 261 may extend along a width direction of the first ramp platform 21, and the guide shaft 261 may include a pair of opposing guide end portions 261*a* and a pair of opposing guide heads 261*b*. Referring to FIG. 29, the guide shaft 261 may be configured to move along the guide slots 21*d* of the first ramp platform 21. Each guide end portion 261*a* of the guide shaft 261 may be guided along the corresponding guide slot 21*d* of the first ramp platform 21.

Referring to FIG. 42, each first side rail 21*b* may have a cavity communicating with the guide slot 21*d*, and the guide head 261*b* may be received in the cavity of the first side rail 21*b*. The guide head 261*b* may prevent the guide end portion 261*a* of the guide shaft 261 from being released from the guide slot 21*d*.

The rolling shaft 262 may extend along a width direction of the upper sub-platform 24, and an axis of the rolling shaft 262 may be parallel to an axis of the guide shaft 261. Referring to FIG. 28, the rolling shaft 262 may be rotatably mounted on the pair of main links 263, and accordingly the rolling shaft 262 may be configured to roll along the top surface of the second ramp platform 22.

The pair of main links 263 may be configured to connect the guide shaft 261 and the rolling shaft 262. Referring to FIG. 28, each main link 263 may connect each guide end portion 261*a* of the guide shaft 261 and a corresponding end portion of the rolling shaft 262. Each end portion of the rolling shaft 262 may be rotatably mounted on a leading end portion of the corresponding main link 263, and each guide end portion 261*a* of the guide shaft 261 may be mounted on a trailing end portion of the corresponding main link 263.

The sub-shaft 264 may extend along the width direction of the upper sub-platform 24, and an axis of the sub-shaft 264 may be parallel to the axis of the rolling shaft 262. Referring to FIG. 28, the sub-shaft 264 may be rotatably mounted on the side walls 24*b* of the upper sub-platform 24. Each side wall 24*b* of the upper sub-platform 24 may have a through hole 24*f*, and each end portion of the sub-shaft 264 may be rotatably mounted in the corresponding through hole 24*f* of the upper sub-platform 24.

The pair of sub-links 265 may be configured to connect the rolling shaft 262 and the sub-shaft 264. Each sub-link 265 may connect the corresponding rolling shaft 262 and the corresponding sub-shaft 264. As the rolling shaft 262 rolls along the top surface of the second ramp platform 22, each sub-link 265 may pivot around the axis of the rolling shaft 262. As the sub-link 265 pivots around the axis of the rolling shaft 262, the upper sub-platform 24 may 24 may pivot on the bent portion 24*c*, and the sub-shaft 264 may move forward or rearward of the rolling shaft 262.

The upper sub-platform 24 may have a front stop recess 24*e* and a rear stop recess 24*g* formed in each side wall 24*b* and each reinforcing rib 24*h*. The rear stop recess 24*g* may be close to the trailing end portion of the upper sub-platform 24, and the front stop recess 24*e* may be located in front of the rear stop recess 24*g*. The front stop recess 24*e* may be a semicircular recess having the same radius as that of the rolling shaft 262, and the rear stop recess 24*g* may be an arc-shaped recess having the same radius as that of the rolling shaft 262. A depth of the front stop recess 24*e* may be greater than a depth of the rear stop recess 24*g*. As the sub-link 265 pivots, the rolling shaft 262 may be selectively received in any one of the front stop recess 24*e* and the rear stop recess 24*g*. When the sub-link 265 pivots toward the leading end portion of the first ramp platform 21, the rolling shaft 262 may be received in the front stop recess 24*e*, and accordingly the upper sub-platform 24 may be in the parallel position (see FIGS. 36 and 37). When the sub-link 265 pivots toward the second ramp platform 22, the rolling shaft 262 may be received in the rear stop recess 24*g*, and accordingly the upper sub-platform 24 may be in the inclined position (see FIG. 38).

Referring to FIGS. 36 to 38, the upper sub-platform 24 may be biased toward the parallel position by a biasing member 28. That is, the biasing member 28 may provide a biasing force to the upper sub-platform 24 so that the upper sub-platform 24 may move to the parallel position. According to an exemplary embodiment, the biasing member 28 may include a coil portion 28*a* disposed around the sub-shaft 264, a first leg 28*b* extending from the coil portion 28*a* and supported to the rolling shaft 262, and a second leg 28*c* extending from the coil portion 28*a* and supported to the upper sub-plate 24*a* of the upper sub-platform 24. A rubber member 28*d* may be mounted on the first leg 28*b*, and the rubber member 28*d* may be directly supported to the rolling shaft 262. The second leg 28*c* may be supported to the upper sub-plate 24*a*, and the first leg 28*b* may be supported to the rolling shaft 262 through the rubber member 28*d* so that the second leg 28*c* of the biasing member 28 may transmit a torque to allow the upper sub-platform 24 to move toward the trailing end portion of the second ramp platform 22. Accordingly, the upper sub-platform 24 may pivot downwardly on the bent portion 24*c* so that the upper sub-platform 24 may be biased toward the parallel position.

FIGS. 36 to 38 illustrate the operation of the upper sub-platform 24 when the second ramp platform 22 moves with respect to the first ramp platform 21. FIG. 36 illustrates a state in which the trailing end portion of the upper sub-platform 24 is located in the cavity of the first ramp platform 21, FIG. 37 illustrates a state in which the trailing end portion of the upper sub-platform 24 is close to the leading end portion of the first ramp platform 21 within the cavity of the first ramp platform 21, and FIG. 38 illustrates a state in which the upper sub-platform 24 is extended out from the first ramp platform 21, and the upper sub-platform 24 is in the inclined position.

Referring to FIG. 36, when the second ramp platform 22 moves from the stowed position in which the second ramp platform 22 is stowed in the cavity of the first ramp platform 21 to the extended position in which the second ramp platform 22 is extended out from the cavity of the first ramp platform 21, the second ramp platform 22 and the upper sub-platform 24 may move along an extended direction (see direction indicated by arrow EX1). The rolling shaft 262 of the upper link assembly 26 may be received in the front stop recess 24*e* of the upper sub-platform 24 and rotate in a first rotation direction R1. Referring to FIG. 37, when the upper sub-platform 24 moves along the extended direction (see the direction indicated by arrow EX1), the guide end portion 261*a* of the guide shaft 261 of the upper link assembly 26 may be caught in the leading end portion of the corresponding guide slot 21*d* of the first ramp platform 21 so that the movement of the guide shaft 261 may be stopped. Referring to FIG. 38, after the guide end portion 261*a* of the guide shaft 261 of the upper link assembly 26 is stopped by the leading end portion of the corresponding guide slot 21*d* of the first ramp platform 21, the second ramp platform 22 may move further by a predetermined stroke S1 (for example, 10 mm) in the extended direction (see the direction indicated by arrow EX1) so that the second ramp platform 22 may pull the bent portion 24*c* of the upper sub-platform 24 in the extended direction (see the direction indicated by arrow EX1). Accordingly, the upper sub-platform 24 together with the second ramp platform 22 may move along the extended direction (see the direction indicated by arrow EX1), and the upper sub-platform 24 may pull the sub-link 265 of the upper link assembly 26 toward the leading end portion of the upper sub-platform 24 so that the sub-link 265 may pivot toward the leading end portion of the upper sub-platform 24. Here, since an external force (pulling force) acting on the upper sub-platform 24 overcomes the biasing force provided by the biasing member 28, the upper sub-platform 24 may be fully extended out from the cavity of the first ramp platform 21, and at the same time, the upper sub-platform 24 may pivot upwardly on the bent portion 24*c*. The rolling shaft 262 may be received in the rear stop recess 24*g* of the upper sub-platform 24, and accordingly the upper sub-platform 24 may be in the inclined position. As the rear stop recess 24*g* of the upper sub-platform 24 is supported to the rolling shaft 262, the upper sub-platform 24 may be stably kept in the inclined position.

Referring to FIG. 38, when the second ramp platform 22 moves from the extended position in which the second ramp platform 22 is extended out from the cavity of the first ramp platform 21 to the stowed position in which the second ramp platform 22 is stowed in the cavity of the first ramp platform 21, the second ramp platform 22 and the upper sub-platform 24 may 24 may move along a stowed direction (see direction indicated by arrow ST1), and the rolling shaft 262 may rotate in a second rotation direction R2. Referring to FIG. 37, as the rolling shaft 262 rotates in the second rotation direction R2, the sub-link 265 may pivot toward the trailing end portion of the upper sub-platform 24, the upper sub-platform 24 may be biased toward the parallel position by the biasing member 28, and the rolling shaft 262 may be received in the front stop recess 24*e* of the upper sub-platform 24. As illustrated in FIG. 36, as the upper sub-platform 24 moves along the stowed direction (see the direction indicated by arrow ST1), the upper sub-platform 24 may be easily stowed in the cavity of the first ramp platform 21.

Referring to FIGS. 26 and 27, the ramp apparatus 10 for a vehicle according to an exemplary embodiment of the present disclosure may include a lower sub-platform 25 pivotally mounted between the second ramp platform 22 and the third ramp platform 23.

Referring to FIG. 26, two lower sub-platforms 25 may be disposed on the top surface of the third ramp plate 23*a* of the third ramp platform 23. Each lower sub-platform 25 may be pivotally mounted on the top surface of the third ramp plate 23*a* of the third ramp platform 23. When the third ramp platform 23 moves, the lower sub-platform 25 may be movably connected to the second ramp platform 22 through a lower link assembly 27. The lower link assembly 27 may be connected between the second ramp platform 22 and the lower sub-platform 25.

Referring to FIGS. 32 to 35, the lower sub-platform 25 may include a lower sub-plate 25*a*, and a pair of side walls 25*b* provided on both side edges of the lower sub-plate 25*a*. The lower sub-plate 25*a* may have a leading end portion corresponding to the leading end portion of the third ramp platform 23 and a trailing end portion corresponding to the trailing end portion of the third ramp platform 23. A bent portion 25*c* may be provided on the leading end portion of the lower sub-plate 25*a*. The bent portion 25*c* may extend downwardly from the leading end portion of the lower sub-plate 25*a*, and a support edge 25*d* may extend flat from the bent portion 25*c*. A length of the support edge 25*d* may be less than a length of the lower sub-plate 25*a*. The support edge 25*d* may be offset with respect to the lower sub-plate 25*a* through the bent portion 25*c* by a predetermined distance, and a flat surface of the support edge 25*d* may be substantially parallel to a flat surface of the lower sub-plate 25*a*.

Figure 30:
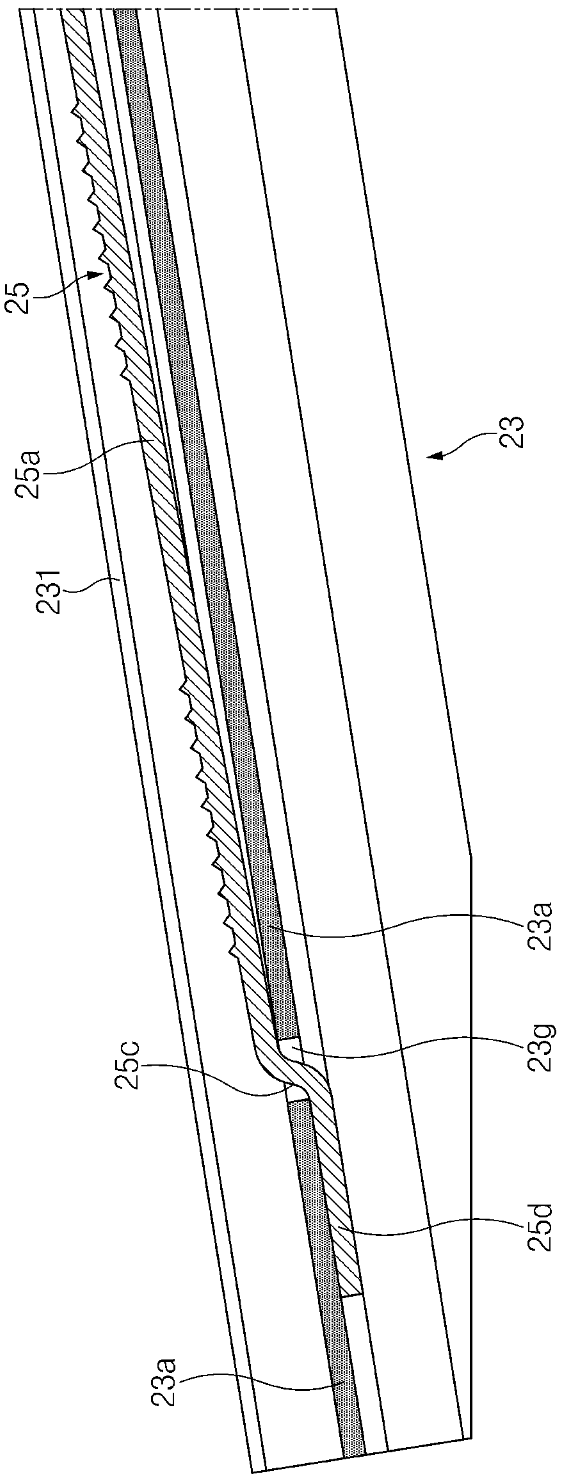
FIG. 30 illustrates an enlarged view of portion N of FIG. 27.

Referring to FIG. 30, the third ramp plate 23*a* of the third ramp platform 23 may 23 may have a mounting hole 23*g* provided in the leading end portion thereof. The lower sub-plate 25*a* of the lower sub-platform 25 may be located above the third ramp plate 23*a* of the third ramp platform 23, the bent portion 25*c* of the lower sub-platform 25 may be received in the mounting hole 23*g* of the third ramp plate 23*a*, and the support edge 25*d* of the lower sub-platform 25 may be located below the third ramp plate 23*a* of the third ramp platform 23. Accordingly, the lower sub-platform 25 may be configured to pivot upwardly and downwardly on the bent portion 25*c*.

Referring to FIGS. 32 and 34, the side walls 25*b* may extend vertically from both side edges of the lower sub-plate 25*a*, respectively, and accordingly the lower sub-platform 25 may have a cavity defined by the lower sub-plate 25*a* and the pair of side walls 25*b*. A height of each side wall 25*b* may be gradually reduced from the trailing end portion of the lower sub-plate 25*a* to the leading end portion of the lower sub-plate 25*a*. Specifically, each side wall 25*b* may be triangular, and accordingly the lower sub-plate 25*a* may be inclined with respect to the third ramp plate 23*a* at a predetermined angle. Referring to FIGS. 34 and 35, the lower sub-plate 25*a* may have a plurality of reinforcing ribs 25*h* provided on a bottom surface thereof, and the plurality of reinforcing ribs 25*h* may be located between the pair of side walls 25*b*. Stiffness of the lower sub-plate 25*a* may be improved by the plurality of reinforcing ribs 25*h*.

Referring to FIG. 42, the second ramp platform 22 may have a plurality of guide slots 22*h* formed in the second side rails 22*b* and the second mounting portion 22*c*. Each guide slot 22*h* may extend along the longitudinal direction of the second ramp platform 22. Referring to FIG. 29, the lower link assembly 27 may be configured to move along the guide slots 22*h* of the second ramp platform 22. The guide slot 22*h* may have a leading end portion corresponding to the leading end portion of the second ramp platform 22 and a trailing end portion corresponding to the trailing end portion of the second ramp platform 22.

When the third ramp platform 23 moves with respect to the second ramp platform 22, the lower sub-platform 25 may move in the same direction as the movement direction of the third ramp platform 23, and the lower sub-platform 25 may pivot with respect to the third ramp platform 23 through the bent portion 25*c* and the lower link assembly 27. Specifically, when the third ramp platform 23 is extended out from the second ramp platform 22, the lower sub-platform 25 may move in the same direction as the movement direction of the third ramp platform 23 so that the lower sub-platform 25 may be extended out from the second ramp platform 22. The lower link assembly 27 may move along the guide slots 22*h* of the second ramp platform 22, and the lower sub-platform 25 may pivot upwardly toward the second ramp plate 22*a* of the second ramp platform 22 by the bent portion 25*c* and the lower link assembly 27 so that an angle of inclination of the lower sub-plate 25*a* of the lower sub-platform 25 may be equal to an angle of inclination of the second ramp plate 22*a*, and the lower sub-platform 25 may be aligned with the second ramp plate 22*a* of the second ramp platform 22. Accordingly, the lower sub-platform 25 may remove a height difference between the second ramp plate 22*a* of the second ramp platform 22 and the third ramp plate 23*a* of the third ramp platform 23.

When the third ramp platform 23 is stowed in the cavity of the second ramp platform 22, the lower sub-platform 25 may pivot downwardly toward the third ramp platform 23 and move in the same direction as the movement direction of the third ramp platform 23, and accordingly the lower sub-platform 25 together with the third ramp platform 23 may be stowed in the cavity of the second ramp platform 22. The lower link assembly 27 may move along the guide slots 22*h* of the second ramp platform 22, and the lower sub-platform 25 may be located between the second ramp plate 22*a* of the second ramp platform 22 and the third ramp plate 23*a* of the third ramp platform 23.

Figure 39:
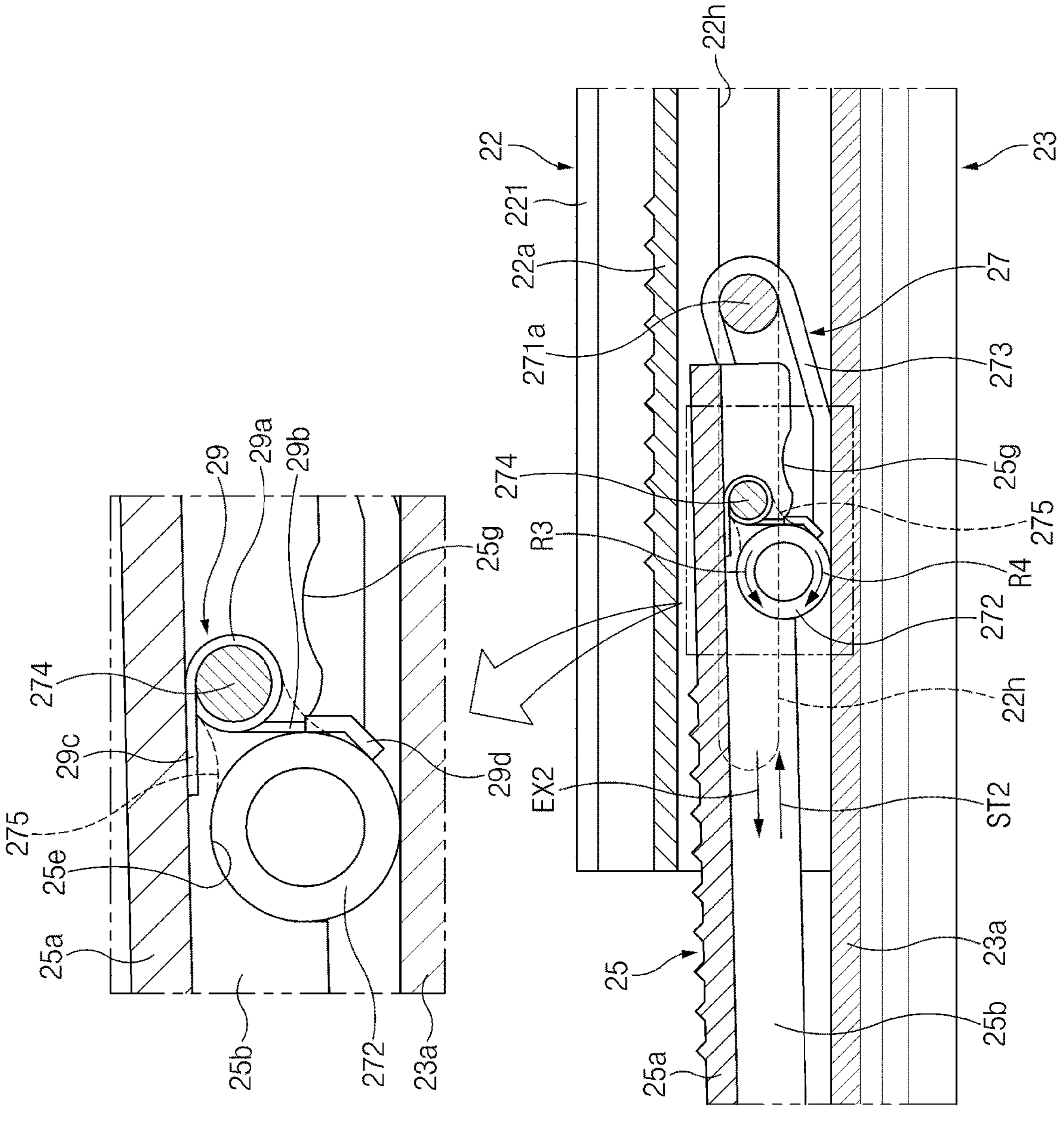
FIG. 39 illustrates a state in which a trailing end portion of a lower sub-platform is located in a cavity of a second ramp platform in a ramp apparatus for a vehicle according to exemplary embodiments of the present disclosure.
Figure 40:
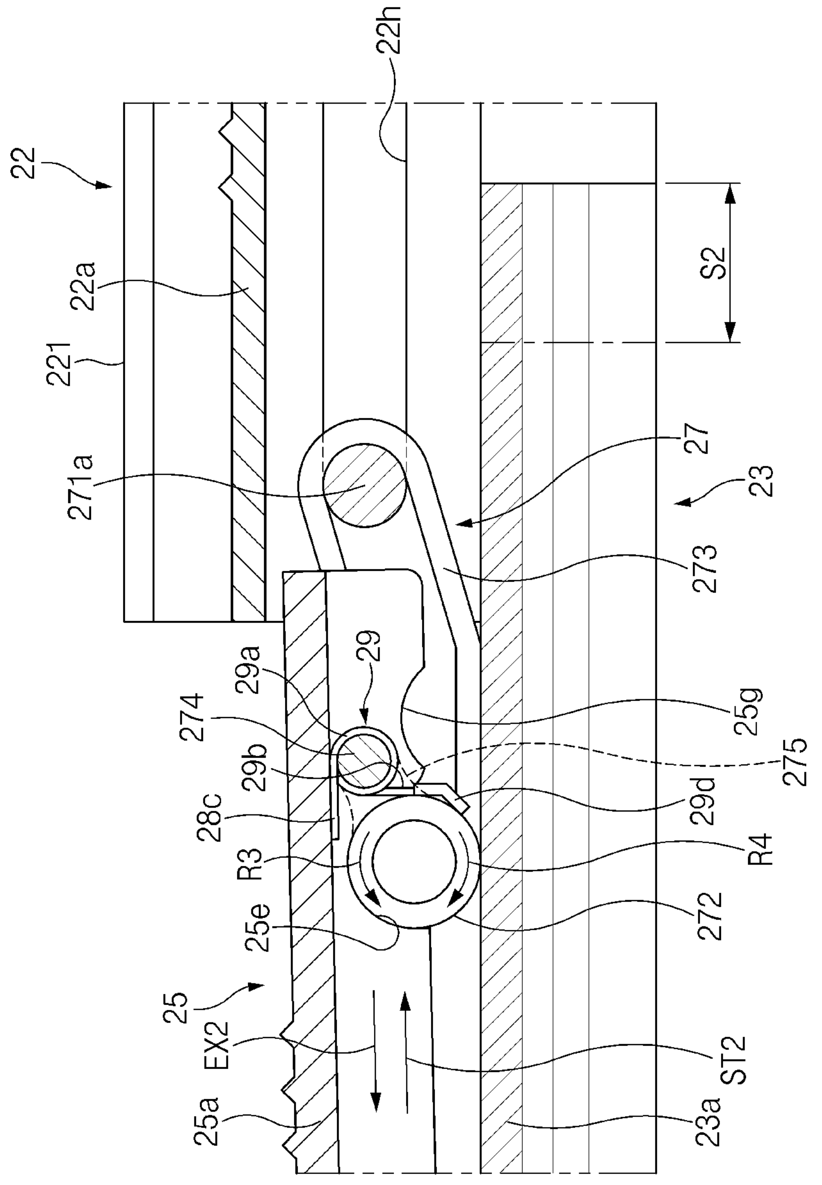
FIG. 40 illustrates a state in which a trailing end portion of a lower sub-platform is close to a leading end portion of a second ramp platform in a ramp apparatus for a vehicle according to exemplary embodiments of the present disclosure.
Figure 41:
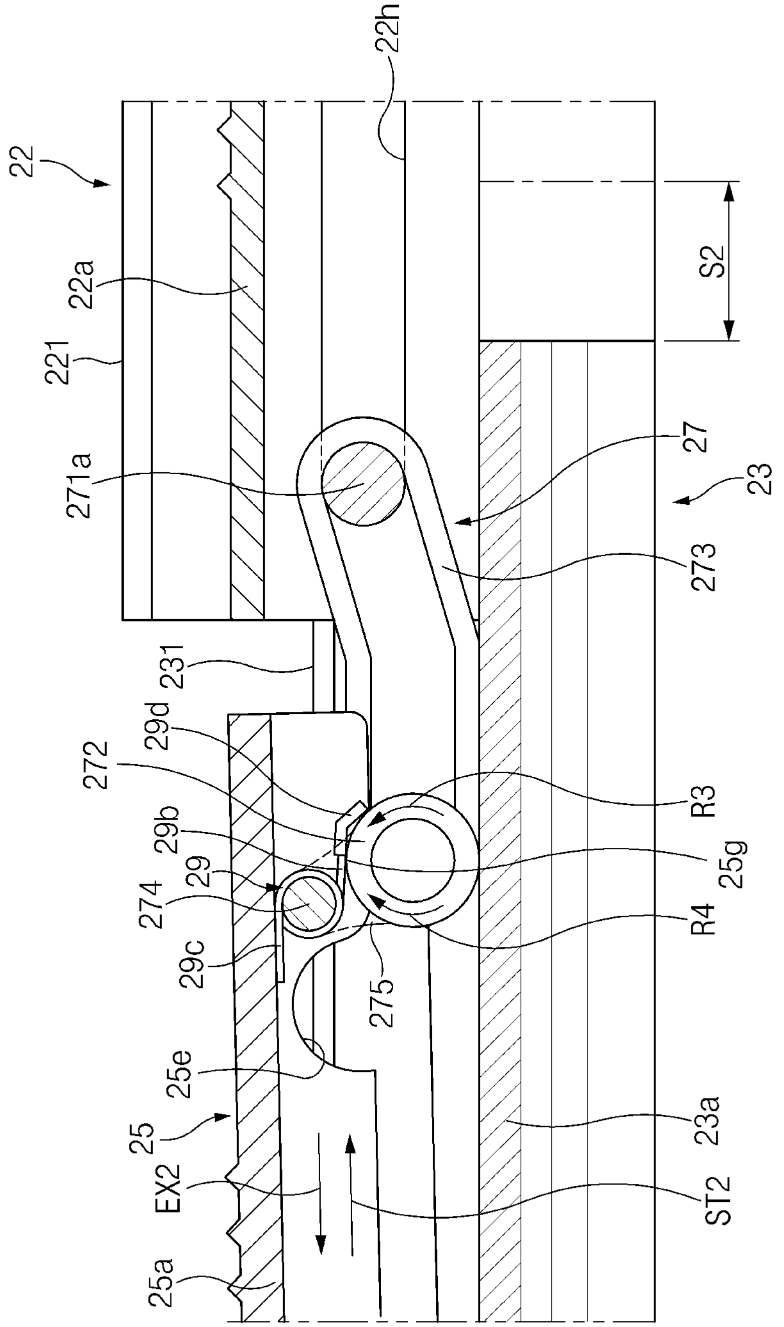
FIG. 41 illustrates a state in which a lower sub-platform is extended out from a second ramp platform and the lower sub-platform is in an inclined position in a ramp apparatus for a vehicle according to exemplary embodiments of the present disclosure.

Referring to FIGS. 39 to 41, the lower sub-platform 25 may pivot upwardly and downwardly on the bent portion 25*c* with respect to the third ramp plate 23*a* of the third ramp platform 23 by the lower link assembly 27 so that the lower sub-platform 25 may pivot between an inclined position and a parallel position. The inclined position refers to a position in which the lower sub-platform 25 is inclined with respect to the third ramp plate 23*a* of the third ramp platform 23 at a predetermined angle so that the lower sub-platform 25 may be aligned with the second ramp plate 22*a* of the second ramp platform 22. The parallel position refers to a position in which the lower sub-platform 25 is substantially parallel to the third ramp plate 23*a* of the third ramp platform 23.

Referring to FIG. 31, the lower link assembly 27 may include a guide shaft 271, a rolling shaft 272 parallel to the guide shaft 271, a pair of main links 273 connecting the guide shaft 271 and the rolling shaft 272, a sub-shaft 274 parallel to the rolling shaft 272, and a pair of sub-links 275 connecting the rolling shaft 272 and the sub-shaft 274.

The guide shaft 271 may extend along a width direction of the second ramp platform 22, and the guide shaft 271 may include a pair of opposing guide end portions 271*a* and a pair of opposing guide heads 271*b*. Referring to FIG. 29, the guide shaft 271 may be configured to move along the guide slots 22*h* of the second ramp platform 22. Each guide end portion 271*a* of the guide shaft 271 may be guided along the corresponding guide slot 22*h* of the second ramp platform 22. The guide head 271*b* may prevent the guide end portion 271*a* of the guide shaft 271 from being released from the guide slot 22*h*.

The rolling shaft 272 may extend along a width direction of the lower sub-platform 25, and an axis of the rolling shaft 272 may be parallel to an axis of the guide shaft 271. Referring to FIG. 29, the rolling shaft 272 may be rotatably mounted on the pair of main links 273, and accordingly the rolling shaft 272 may be configured to roll along the top surface of the third ramp platform 23.

The pair of main links 273 may be configured to connect the guide shaft 271 and the rolling shaft 272. Referring to FIG. 29, each main link 273 may connect each guide end portion 271*a* of the guide shaft 271 and a corresponding end portion of the rolling shaft 272. Each end portion of the rolling shaft 272 may be rotatably mounted on a leading end portion of the corresponding main link 273, and each guide end portion 271*a* of the guide shaft 271 may be mounted on a trailing end portion of the corresponding main link 273.

The sub-shaft 274 may extend along the width direction of the lower sub-platform 25, and an axis of the sub-shaft 274 may be parallel to the axis of the rolling shaft 272. Referring to FIG. 29, the sub-shaft 274 may be rotatably mounted on the side walls 25*b* of the lower sub-platform 25. Each side wall 25*b* of the lower sub-platform 25 may have a through hole 25*f*, and each end portion of the sub-shaft 274 may be rotatably mounted in the corresponding through hole 25*f* of the lower sub-platform 25.

The pair of sub-links 275 may be configured to connect the rolling shaft 272 and the sub-shaft 274. Each sub-link 275 may connect the corresponding rolling shaft 272 and the corresponding sub-shaft 274. As the rolling shaft 272 rolls along the top surface of the third ramp platform 23, each sub-link 275 may pivot around the axis of the rolling shaft 272. As the sub-link 275 pivots around the axis of the rolling shaft 272, the lower sub-platform 25 may pivot on the bent portion 25*c*, and the sub-shaft 274 may move forward or rearward of the rolling shaft 272.

The lower sub-platform 25 may have a front stop recess 25*e* and a rear stop recess 25*g* formed in each side wall 25*b* and each reinforcing rib 25*h*. The rear stop recess 25*g* may be close to the trailing end portion of the lower sub-platform 25, and the front stop recess 25*e* may be located in front of the rear stop recess 25*g*. The front stop recess 25*e* may be a semicircular recess having the same radius as that of the rolling shaft 272, and the rear stop recess 25*g* may be an arc-shaped recess having the same radius as that of the rolling shaft 272. A depth of the front stop recess 25*e* may be greater than a depth of the rear stop recess 25*g*. As the sub-link 275 pivots, the rolling shaft 272 may be selectively received in any one of the front stop recess 25*e* and the rear stop recess 25*g*. When the sub-link 275 pivots toward the leading end portion of the second ramp platform 22, the rolling shaft 272 may be received in the front stop recess 25*e*, and accordingly the lower sub-platform 25 may be in the parallel position (see FIGS. 39 and 40). When the sub-link 275 pivots toward the third ramp platform 23, the rolling shaft 272 may be received in the rear stop recess 25*g*, and accordingly the lower sub-platform 25 may be in the inclined position (see FIG. 41).

Referring to FIGS. 39 to 41, the lower sub-platform 25 may be biased toward the parallel position by a biasing member 29. That is, the biasing member 29 may provide a biasing force to the lower sub-platform 25 so that the lower sub-platform 25 may move to the parallel position. According to an exemplary embodiment, the biasing member 29 may include a coil portion 29*a* disposed around the sub-shaft 274, a first leg 29*b* extending from the coil portion 29*a* and supported to the rolling shaft 272, and a second leg 29*c* extending from the coil portion 29*a* and supported to the lower sub-plate 25*a* of the lower sub-platform 25. A rubber member 29*d* may be mounted on the first leg 29*b*, and the rubber member 29*d* may be directly supported to the rolling shaft 272. The second leg 29*c* may be supported to the lower sub-plate 25*a*, and the first leg 29*b* may be supported to the rolling shaft 272 through the rubber member 29*d* so that the second leg 29*c* of the biasing member 29 may transmit a torque to allow the lower sub-platform 25 to move toward the trailing end portion of the third ramp platform 23. Accordingly, the lower sub-platform 25 may pivot downwardly on the bent portion 25*c* so that the lower sub-platform 25 may be biased toward the parallel position.

FIGS. 39 to 41 illustrate the operation of the lower sub-platform 25 when the third ramp platform 23 moves with respect to the second ramp platform 22. FIG. 39 illustrates a state in which the trailing end portion of the lower sub-platform 25 is located in the cavity of the second ramp platform 22, FIG. 40 illustrates a state in which the trailing end portion of the lower sub-platform 25 is close to the leading end portion of the first ramp platform 21 within the cavity of the second ramp platform 22, and FIG. 41 illustrates a state in which the lower sub-platform 25 is extended out from the second ramp platform 22, and the lower sub-platform 25 is in the inclined position.

Referring to FIG. 39, when the third ramp platform 23 moves from the stowed position in which the third ramp platform 23 is stowed in the cavity of the second ramp platform 22 to the extended position in which the third ramp platform 23 is extended out from the cavity of the second ramp platform 22, the third ramp platform 23 and the lower sub-platform 25 may move along an extended direction (see direction indicated by arrow EX2). The rolling shaft 272 of the lower link assembly 27 may be received in the front stop recess 25*e* of the lower sub-platform 25 and rotate in a first rotation direction R3. Referring to FIG. 40, when the lower sub-platform 25 moves along the extended direction (see the direction indicated by arrow EX2), the guide end portion 271*a* of the guide shaft 271 of the lower link assembly 27 may be caught in the leading end portion of the corresponding guide slot 22*h* of the second ramp platform 22 so that the movement of the guide shaft 271 may be stopped. Referring to FIG. 41, after the guide end portion 271*a* of the guide shaft 271 of the lower link assembly 27 is stopped by the leading end portion of the guide slot 22*h* of the second ramp platform 22, the third ramp platform 23 may move further by a predetermined stroke S2 (for example, 10 mm) in the extended direction (see the direction indicated by arrow EX2) so that the third ramp platform 23 may pull the bent portion 25*c* of the lower sub-platform 25 in the extended direction (see the direction indicated by arrow EX2). Accordingly, the lower sub-platform 25 together with the third ramp platform 23 may move along the extended direction (see the direction indicated by arrow EX2), and the lower sub-platform 25 may pull the sub-link 275 of the lower link assembly 27 toward the leading end portion of the lower sub-platform 25 so that the sub-link 275 may pivot toward the leading end portion of the lower sub-platform 25. Here, since an external force (pulling force) acting on the lower sub-platform 25 overcomes the biasing force provided by the biasing member 29, the lower sub-platform 25 may be fully extended out from the cavity of the second ramp platform 22, and at the same time, the lower sub-platform 25 may pivot upwardly on the bent portion 25*c*. The rolling shaft 272 may be received in the rear stop recess 25*g* of the lower sub-platform 25, and accordingly the lower sub-platform 25 may be in the inclined position. As the rear stop recess 25*g* of the lower sub-platform 25 is supported to the rolling shaft 272, the lower sub-platform 25 may be stably kept in the inclined position.

Referring to FIG. 41, when the third ramp platform 23 moves from the extended position in which the third ramp platform 23 is extended out from the cavity of the second ramp platform 22 to the stowed position in which the third ramp platform 23 is stowed in the cavity of the second ramp platform 22, the third ramp platform 23 and the lower sub-platform 25 may 25 may move along a stowed direction (see direction indicated by arrow ST2), and the rolling shaft 272 may rotate in a second rotation direction R4. Referring to FIG. 40, as the rolling shaft 272 rotates in the second rotation direction R4, the sub-link 275 may pivot toward the trailing end portion of the lower sub-platform 25, the lower sub-platform 25 may be biased toward the parallel position by the biasing member 29, and the rolling shaft 272 may be received in the front stop recess 25*e* of the lower sub-platform 25. As illustrated in FIG. 39, as the lower sub-platform 25 moves along the stowed direction (see the direction indicated by arrow ST2), the lower sub-platform 25 may be easily stowed in the cavity of the second ramp platform 22.

As set forth above, the ramp apparatus for a vehicle according to exemplary embodiments of the present disclosure may be designed to move telescopically from the vehicle body to the ground or vice versa. The ramp assembly may be designed to allow the ramp platforms to be deployed/extended or retracted so that the overall deployment length of the ramp assembly may be relatively increased, and accordingly the slope of the ramp assembly may be significantly reduced.

According to exemplary embodiments of the present disclosure, when the second ramp platform is extended out from the first ramp platform, the upper sub-platform may move to the inclined position so as to be aligned with the first ramp platform, and accordingly the upper sub-platform may remove a height difference between the first ramp platform and the second ramp platform.

According to exemplary embodiments of the present disclosure, when the third ramp platform is extended out from the second ramp platform, the lower sub-platform may move to the inclined position so as to be aligned with the second ramp platform, and accordingly the lower sub-platform may remove a height difference between the second ramp platform and the third ramp platform.

According to exemplary embodiments of the present disclosure, the ramp assembly may be designed to be deployed from or stowed in the housing mounted on the vehicle body so that the storage space (stowage) of the ramp assembly may be optimized. By making the ramp apparatus compact, a sufficient battery mounting space may be secured.

According to exemplary embodiments of the present disclosure, the ramp assembly may be deployed from and stowed in the housing by the moving mechanism, and the telescopic ramp platforms may be extended and retracted by the drive mechanism so that the operation speed of the ramp apparatus may be significantly increased when the ramp platforms are extended and retracted.

According to exemplary embodiments of the present disclosure, the deployment length of the ramp assembly may be adjusted according to selective operations of the moving mechanism and the drive mechanism so that the ramp apparatus may be used for various purposes. For example, when only the moving mechanism and the hinge mechanism operate, the ramp assembly may be in the retracted state so that the length of the ramp assembly may be minimized, which allows the ramp assembly to be used in a state of being deployed short.

According to exemplary embodiments of the present disclosure, the motor of the moving mechanism, the motor of the hinge drive unit, and the motor of the drive mechanism may be controlled in an on/off manner so that the operation of the ramp apparatus may be performed very efficiently.

According to exemplary embodiments of the present disclosure, the first side rail of the first ramp platform may have the channel-shaped cross section which is open to the second ramp platform and the third ramp platform, and the second side rail of the second ramp platform may have the channel-shaped cross section which is open to the third ramp platform so that a foreign object may be prevented from being stuck between the first side rail of the first ramp platform, the second side rail of the second ramp platform, and the third side rail of the third ramp platform.

According to exemplary embodiments of the present disclosure, the first ramp plate of the first ramp platform and the second ramp plate of the second ramp platform may be spaced apart from each other by a predetermined gap, and the second ramp plate of the second ramp platform and the third ramp plate of the third ramp platform may be spaced apart from each other by a predetermined gap. Accordingly, even when at least one of the first ramp plate, the second ramp plate, and the third ramp plate is deformed, the deformation may not affect the movement of the first ramp platform, the movement of the second ramp platform, and the movement of the third ramp platform.

According to exemplary embodiments of the present disclosure, the linear light indicator may be mounted on at least one of the first side rail of the first ramp platform, the second side rail of the second ramp platform, and the third side rail of the third ramp platform, so it can be easily recognized that the first ramp platform, the second ramp platform, and/or the third ramp platform are extended out.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A ramp apparatus for a vehicle, the ramp apparatus comprising:

a housing mounted on a vehicle body;

a first ramp platform telescopically moving with respect to the housing;

a second ramp platform telescopically moving with respect to the first ramp platform; and an upper sub-platform pivotally mounted between the first ramp platform and the second ramp platform, wherein the upper sub-platform is movably connected to the first ramp platform through an upper link assembly, and wherein the upper link assembly includes a guide shaft movable along guide slots of the first ramp platform, a rolling shaft parallel to the guide shaft, a pair of main links connecting the guide shaft and the rolling shaft, a sub-shaft rotatably mounted on the upper sub-platform, and a pair of sub-links connecting the rolling shaft and the sub-shaft.

2. The ramp apparatus according to claim 1, wherein the upper sub-platform includes an upper sub-plate, a bent portion provided on a leading end portion of the upper sub-plate, and a support edge extending from the bent portion, wherein the second ramp platform has a mounting hole in which the bent portion is received, wherein the upper sub-plate is located above the second ramp platform, and wherein the support edge is located below the second ramp platform.

3. The ramp apparatus according to claim 1, wherein the rolling shaft rolls along a top surface of the second ramp platform.

4. The ramp apparatus according to claim 1, wherein the upper sub-platform has a front stop recess and a rear stop recess located behind the front stop recess, and wherein the rolling shaft is selectively received in any one of the front stop recess and the rear stop recess.

5. The ramp apparatus according to claim 4, wherein a depth of the front stop recess is greater than a depth of the rear stop recess.

6. The ramp apparatus according to claim 1, wherein the upper sub-platform is configured to move between an inclined position in which the upper sub-platform is inclined with respect to the second ramp platform at a predetermined angle and a parallel position in which the upper sub-platform is substantially parallel to the second ramp platform.

7. The ramp apparatus according to claim 6, further comprising a biasing member allowing the upper sub-platform to be biased toward the parallel position.

8. The ramp apparatus according to claim 1, further comprising a hinge mechanism configured to move the first ramp platform between a stowed position and a deployed position, and allow the first ramp platform to pivot with respect to the housing when the first ramp platform is in the deployed position.

9. The ramp apparatus according to claim 1, further comprising a third ramp platform telescopically moving with respect to the second ramp platform.

10. The ramp apparatus according to claim 9, further comprising a lower sub-platform pivotally mounted between the second ramp platform and the third ramp platform.

11. The ramp apparatus according to claim 10, wherein the lower sub-platform includes a lower sub-plate, a bent portion provided on a leading end portion of the lower sub-plate, and a support edge extending from the bent portion, wherein the third ramp platform has a mounting hole in which the bent portion is received, wherein the lower sub-plate is located above the third ramp platform, and wherein the support edge is located below the third ramp platform.

12. The ramp apparatus according to claim 10, wherein the lower sub-platform is movably connected to the second ramp platform through a lower link assembly.

13. A ramp apparatus for a vehicle, the ramp apparatus comprising:

a housing mounted on a vehicle body;

a first ramp platform telescopically moving with respect to the housing;

a second ramp platform telescopically moving with respect to the first ramp platform;

a third ramp platform telescopically moving with respect to the second ramp platform;

an upper sub-platform pivotally mounted between the first ramp platform and the second ramp platform; and a lower sub-platform pivotally mounted between the second ramp platform and the third ramp platform, wherein the lower sub-platform includes a lower sub-plate, a bent portion provided on a leading end portion of the lower sub-plate, and a support edge extending from the bent portion, wherein the third ramp platform has a mounting hole in which the bent portion is received, wherein the lower sub-plate is located above the third ramp platform, and wherein the support edge is located below the third ramp platform.

14. The ramp apparatus according to claim 13, wherein the lower sub-platform is movably connected to the second ramp platform through a lower link assembly.

15. The ramp apparatus according to claim 14, wherein the lower link assembly includes a guide shaft moving along guide slots of the second ramp platform, a rolling shaft parallel to the guide shaft, a pair of main links connecting the guide shaft and the rolling shaft, a sub-shaft rotatably mounted on the lower sub-platform, and a pair of sub-links connecting the rolling shaft and the sub-shaft.

16. The ramp apparatus according to claim 15, wherein the rolling shaft rolls along a top surface of the third ramp platform.

17. The ramp apparatus according to claim 15, wherein the lower sub-platform has a front stop recess and a rear stop recess located behind the front stop recess, and wherein the rolling shaft is selectively received in any one of the front stop recess and the rear stop recess of the lower sub-platform.

18. The ramp apparatus according to claim 17, wherein a depth of the front stop recess is greater than a depth of the rear stop recess.

19. The ramp apparatus according to claim 13, wherein the lower sub-platform is configured to move between an inclined position in which the lower sub-platform is inclined with respect to the third ramp platform at a predetermined angle and a parallel position in which the lower sub-platform is substantially parallel to the third ramp platform.

20. The ramp apparatus according to claim 19, further comprising a biasing member allowing the lower sub-platform to be biased toward the parallel position.

* * * * *